US007132619B2

(12) United States Patent
Conway et al.

(10) Patent No.: US 7,132,619 B2
(45) Date of Patent: *Nov. 7, 2006

(54) PLASMA ARC TORCH ELECTRODE

(75) Inventors: Christopher J. Conway, Wilmot, NH (US); Darrin H. MacKenzie, Windsor, VT (US); Milind G. Kelkar, Pune (IN); Geoffery H. Putnam, Topsham, VT (US)

(73) Assignee: Thermal Dynamics Corporation, West Lebanon, NH (US)

(*) Notice: Subject to any disclaimer, the term of this patent is extended or adjusted under 35 U.S.C. 154(b) by 133 days.
This patent is subject to a terminal disclaimer.

(21) Appl. No.: 10/760,177

(22) Filed: Jan. 16, 2004

(65) Prior Publication Data

US 2004/0195219 A1 Oct. 7, 2004

Related U.S. Application Data

(63) Continuation-in-part of application No. 10/409,633, filed on Apr. 7, 2003.

(51) Int. Cl.
*B23K 10/00* (2006.01)

(52) U.S. Cl. .......................... 219/121.52; 219/121.51; 219/121.49; 219/119

(58) Field of Classification Search .......... 219/121.49, 219/121.52, 75, 44, 121.48, 121.5, 121.51
See application file for complete search history.

(56) References Cited

U.S. PATENT DOCUMENTS

| | | | | |
|---|---|---|---|---|
| 4,140,892 | A * | 2/1979 | Muller | 219/121.47 |
| 4,954,683 | A * | 9/1990 | Hatch | 219/121.5 |
| 5,965,040 | A * | 10/1999 | Luo et al. | 219/121.5 |
| 6,362,450 | B1 * | 3/2002 | Severance, Jr. | 219/121.5 |
| 6,403,915 | B1 * | 6/2002 | Cook et al. | 219/121.52 |
| 2003/0034333 | A1 * | 2/2003 | Horner-Richardson et al. | 219/121.51 |

* cited by examiner

*Primary Examiner*—Mark Paschall
(74) *Attorney, Agent, or Firm*—Harness, Dickey & Pierce P.L.C.

(57) ABSTRACT

A variety of electrodes for use in a plasma arc torch are provided that improve cooling between the electrode and an adjacent cathodic element such as a cathode. At least one passageway is formed between the electrode and the cathode for the flow of a fluid, e.g. cooling fluid, wherein the flow of the fluid is proximate, or through an adjacent vicinity of, electrical contact between the cathode and the electrode. The passageway is formed through the electrode, through the cathode, between the electrode and the cathode, and through a third element in the various forms of the present invention. Further, methods of operating a plasma arc torch using the electrodes according to the various forms of the invention are also provided.

22 Claims, 66 Drawing Sheets

(GAS PASSAGEWAYS)

(COOLING FLUID PASSAGEWAYS)

(COOLING FLUID PASSAGEWAYS)

(GAS PASSAGEWAYS)

(GAS PASSAGEWAYS)

(COOLING FLUID PASSAGEWAYS)

(CONNECTED)

(DISCONNECTED)

(COOLING FLUID FLOW)

(PLASMA GAS FLOW)

(SECONDARY GAS FLOW)

PLASMA ARC TORCH ELECTRODE

CROSS-REFERENCE TO RELATED APPLICATIONS

This application is a continuation in part of U.S. patent application Ser. No. 10/409,633 entitled "Plasma Arc Torch Electrode," filed 7 Apr. 2003, the contents of which are incorporated herein by reference in their entirety and continued preservation of which is requested.

FIELD OF THE INVENTION

The present invention relates generally to plasma arc torches and more particularly to electrodes and methods of use for automated, high current plasma arc torches.

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Further, the ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

In automated plasma arc torch applications, the plasma arc torch operates at current levels between approximately 30 amps and 1,000 amps or more. At the higher current levels, the torch correspondingly operates at relatively high temperatures. Accordingly, torch components and consumable components must be properly cooled in order to prevent damage or malfunction and to increase the operating life and cutting accuracy of the plasma arc torch. To provide such cooling, high current plasma arc torches are generally water cooled, although additional cooling fluids may be employed, wherein coolant supply and return tubes are provided to cycle the flow of cooling fluid through the torch. Additionally, a variety of cooling and gas passageways are provided throughout various torch components for proper operation of the plasma arc torch. However, the flow of cooling fluids in plasma arc torches of the known art have been relatively limited due to the positioning and configuration of internal cooling passageways.

With automated plasma arc torches of the known art, concentricity of components within the torch, such as the electrode and the tip, or nozzle, is critical in order to maintain accuracy when cutting a workpiece. Further, the electrode and the tip are commonly known as consumable components, which must replaced after a certain period of operation due to wear and/or damage that occurs during operation. Accordingly, concentricity of such consumable components must be maintained throughout the many replacements that occur over the life of a plasma arc torch.

Additionally, when the consumable components are replaced, tools are often required for removal due to the type of connection between the consumable components and a torch head. For example, the consumable components may be threaded into the torch head and tightened with a wrench or other tool. As a result, the replacement of consumable components is often time consuming and cumbersome for a plasma arc torch operator. Moreover, each of the consumable components are typically replaced on an individual basis, rather than all at once, thereby making removal and installation of several different consumable components at different even more time consuming and cumbersome.

Accordingly, a need remains in the art for a plasma arc torch and associated methods that improve cutting efficiency and accuracy. A further need exists for such a plasma arc torch and methods that provide for relatively quick and efficient replacement of consumable components, (e.g., electrode, tip), disposed therein.

SUMMARY OF THE INVENTION

Generally, the present invention provides a plasma arc torch that comprises a set of torch consumable components secured to a torch head. The torch head comprises an anode body that is in electrical communication with the positive side of a power supply and a cathode that is in electrical communication with the negative side of the power supply. The cathode is further surrounded by a central insulator to insulate the cathode from the anode body, and similarly, the anode body is surrounded by an outer insulator to insulate the anode body from a housing, which encapsulates and protects the torch head and its components from the surrounding environment during operation. The torch head is further adjoined with a coolant supply tube, a plasma gas tube, a coolant return tube, and a secondary gas tube, wherein plasma gas and secondary gas are supplied and cooling fluid is supplied and returned for operation of the plasma arc torch. Furthermore, a negative lead connection is provided through the plasma gas tube or a liquid tube to the cathode, and a pilot signal connection is provided through the anode body to a torch cap.

The torch consumable components comprise an electrode, a tip, a spacer, a distal anode member, a central anode member, a baffle, a secondary cap, a shield cap, and a secondary spacer, which are housed by a cartridge body in one form of the present invention. The tip, central anode member, and distal anode member are anodic elements that comprise a portion of the positive side of the power supply, whereas the electrode is a cathodic element that comprises a portion of the negative side of the power supply. Accordingly, the spacer is disposed between the electrode and the tip and provides electrical separation between the anodic and cathodic sides of the power supply, in addition to certain gas distributing functions as described in greater detail below. The baffle is disposed between the distal anode member and the shield cap and provides for cooling fluid distribution during operation. The secondary cap is disposed distally from the tip and provides for secondary gas distribution, and the secondary spacer provides spacing between the tip and the secondary cap. Additionally, the shield cap surrounds the other consumable components and is secured to a torch head using a locking ring or other attachment member as described in greater detail below.

In another form of the present invention, the consumable components further comprise a coolant seal and guide disposed between the tip and the secondary cap to direct and control the flow of cooling fluid. The electrode is centrally disposed within the cartridge body and is in electrical contact with the cathode along an interior portion of the electrode. The electrode and cathode are configured such that a passageway is formed therebetween for the passage of a cooling fluid proximate, or through an adjacent vicinity of, the electrical contact. The electrode further defines a central cavity that is in fluid communication with the coolant tube such that the cathode and electrode, along with other torch components, are properly cooled during operation. Further, the cartridge body generally distributes cooling fluid, plasma gas, and secondary gas, while providing separation or dielectric between various torch components as described in the detailed description that follows. Moreover, the fluid (cooling, plasma, secondary) is distributed in a coaxial flow between various torch components, which increases the total amount of flow and cooling within the plasma arc torch.

As used herein, the term "coaxial" shall be construed to mean a flow that is annular and that flows in the same direction at any given radial location from the central longitudinal axis of the plasma arc torch. Additionally, the term "annular" shall be construed to mean a flow that is distributed circumferentially about the central longitudinal axis of the plasma arc torch (although not necessarily continuously). Therefore, coaxial flow is a flow that is distributed circumferentially about the central longitudinal axis of the torch and that is flowing in the same direction at any radial location from the central longitudinal axis. For example, a flow that crosses over the central longitudinal axis of the plasma arc torch such as that described in U.S. Pat. Nos. 5,396,043 and 5,653,896, incorporated herein by reference) is not a coaxial flow. Coaxial flow is shown and described in greater detail in the detailed description that follows.

The tip is disposed distally from the electrode and is separated therefrom by the spacer. Similarly, the secondary cap is disposed distally from the tip and is separated therefrom by the secondary spacer. The distal anode member is generally disposed around the tip and is in electrical contact with both the tip and the central anode member. The tip and distal anode member are configured such that a passageway is formed therebetween for the passage of a cooling fluid proximate, or through an adjacent vicinity of, the electrical contact. Further, the central anode member is in electrical contact with the anode body within the torch head for electrical continuity within the positive, or anodic side of the power supply. Additionally, the baffle is disposed around the distal anode member, and the shield cap is disposed around the baffle. Accordingly, passageways are formed between the cartridge body and the distal anode member, and between the distal anode member and the baffle for cooling fluid flow. Similarly, a passage is formed between the baffle and the shield cap for secondary gas flow.

In other forms, several electrode and tip configurations are provided that improve cooling, provide electrical continuity through the cathode and anode side of the power supply, respectively, and that provide efficient attachment of the electrode and tip to the plasma arc torch. Additionally, configurations for consumable cartridges are provided, wherein a single cartridge containing one or more consumable components is removed and replaced when the one or more consumable components require replacement, rather than replacing individual consumable components one at a time. Moreover, configurations for securing the torch head to adjacent components such as a positioning tube are also provided by other forms of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
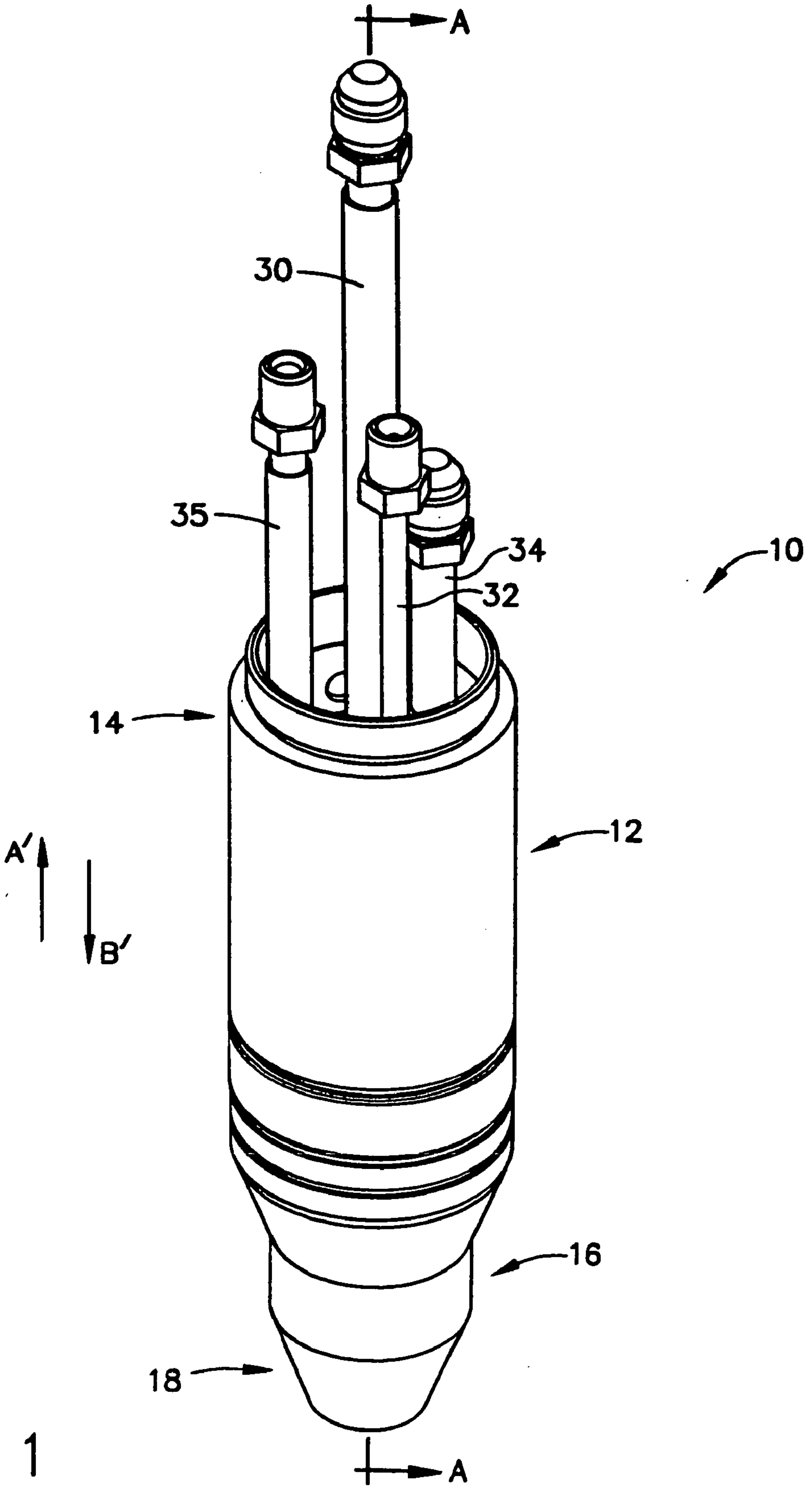
FIG. 1 is a perspective view of a plasma arc torch constructed in accordance with the principles of the present invention.
Figure 2:
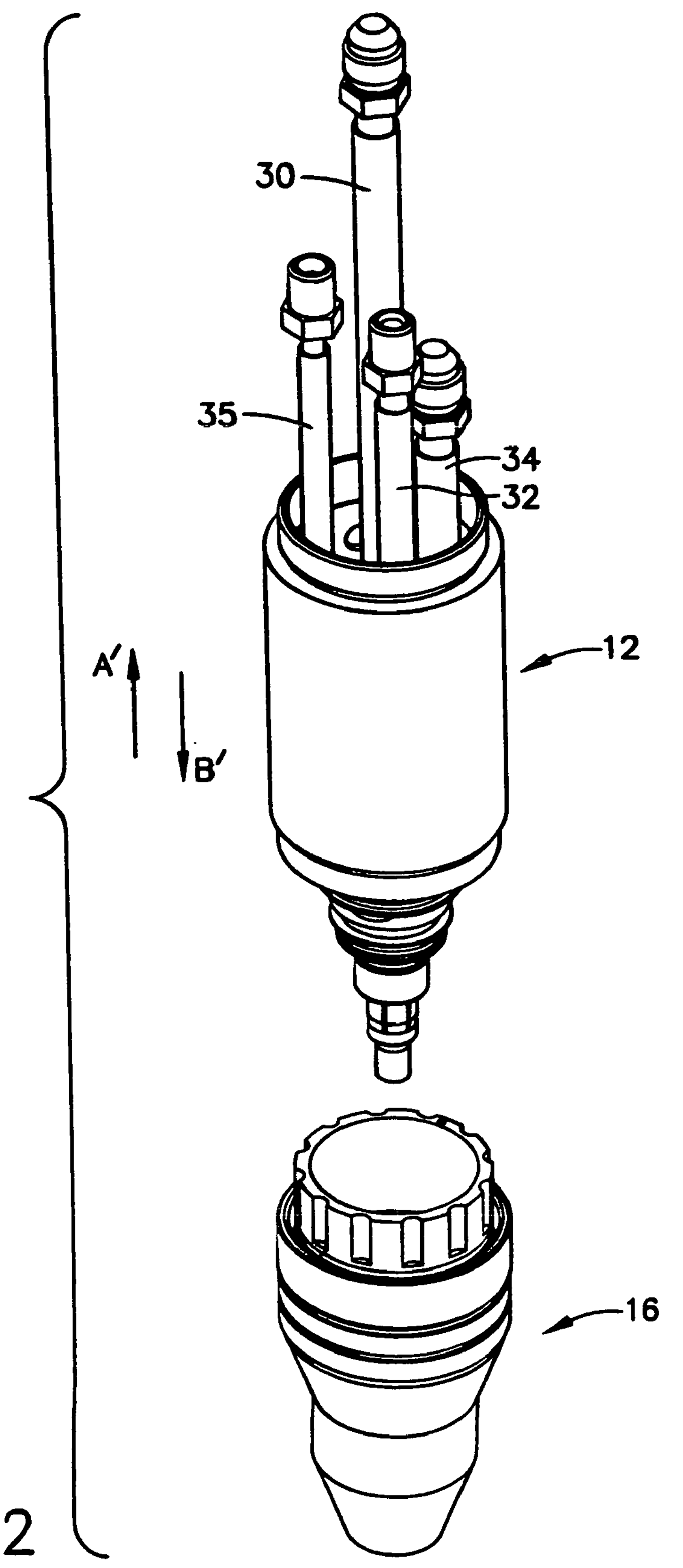
FIG. 2 is an exploded perspective view of a plasma arc torch constructed in accordance with the principles of the present invention.
Figure 3:
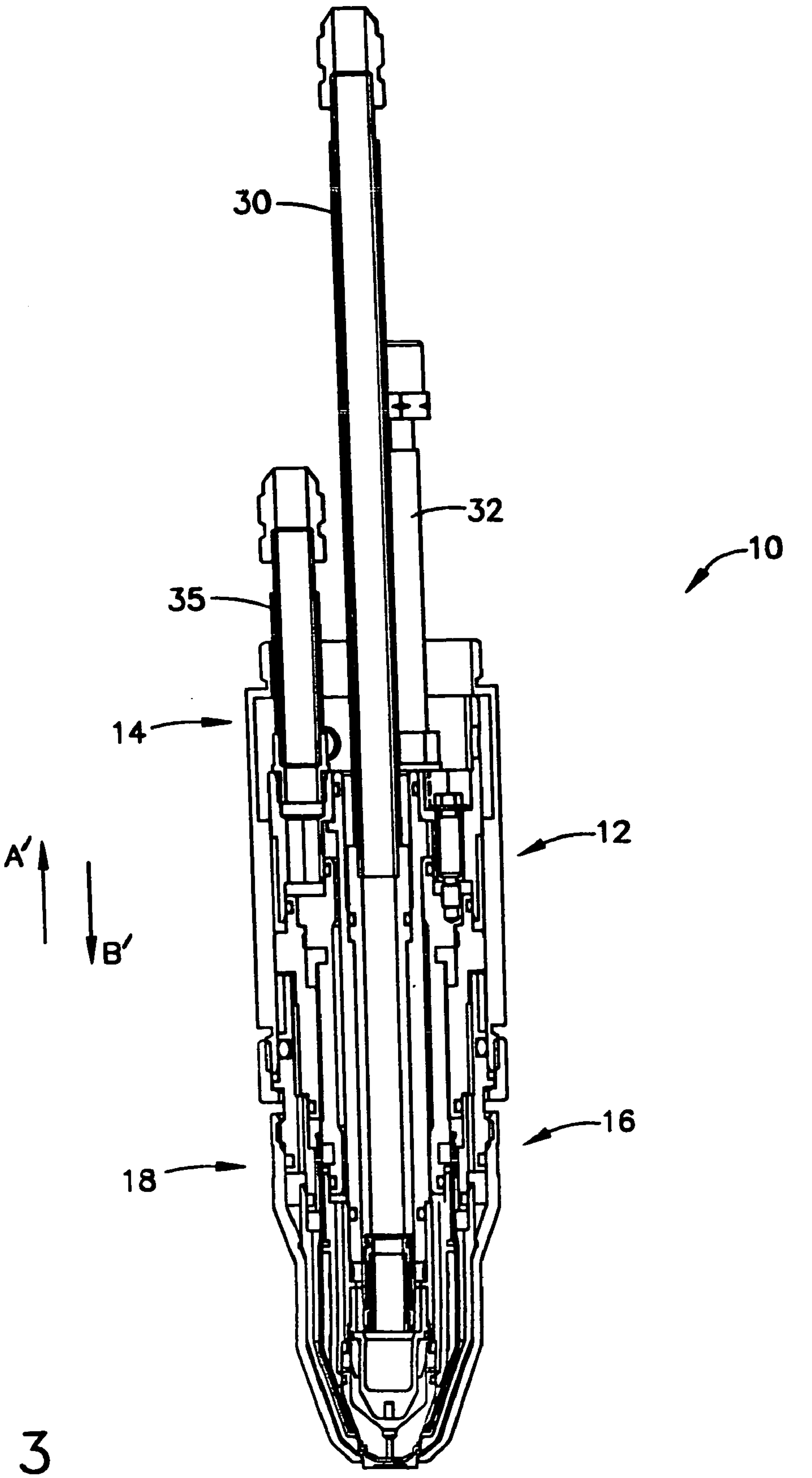
FIG. 3 is a longitudinal cross-sectional view, taken along line A—A of FIG. 1, of the plasma arc torch in accordance with the principles of the present invention.
Figure 4:
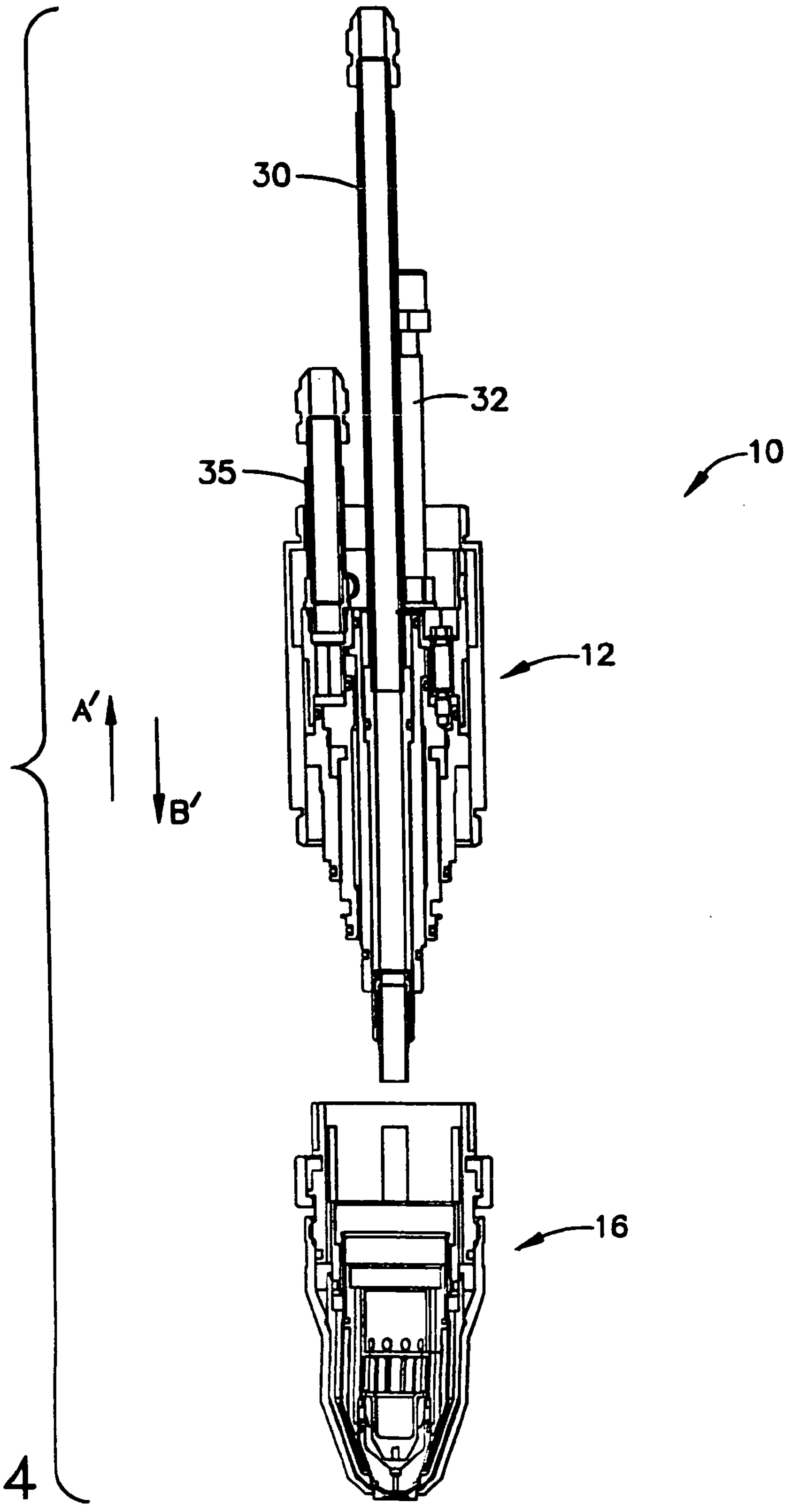
FIG. 4 is an exploded longitudinal cross-sectional view of the plasma arc torch of FIG. 3 in accordance with the principles of the present invention.

The following description of the preferred embodiments is merely exemplary in nature and is in no way intended to limit the invention, its application, or uses.

Referring to the drawings, a plasma arc torch according to the present invention is illustrated and indicated by reference numeral 10 in FIG. 1 through FIG. 6. The plasma arc torch 10 generally comprises a torch head 12 disposed at a proximal end 14 of the plasma arc torch 10 and a plurality of consumable components 16 secured to the torch head 12 and disposed at a distal end 18 of the plasma arc torch 10 as shown.

As used herein, a plasma arc torch should be construed by those skilled in the art to be an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, proximal direction or proximally is the direction towards the torch head 12 from the consumable components 16 as depicted by arrow A', and distal direction or distally is the direction towards the consumable components 16 from the torch head 12 as depicted by arrow B'.

Torch Head

Figure 5:
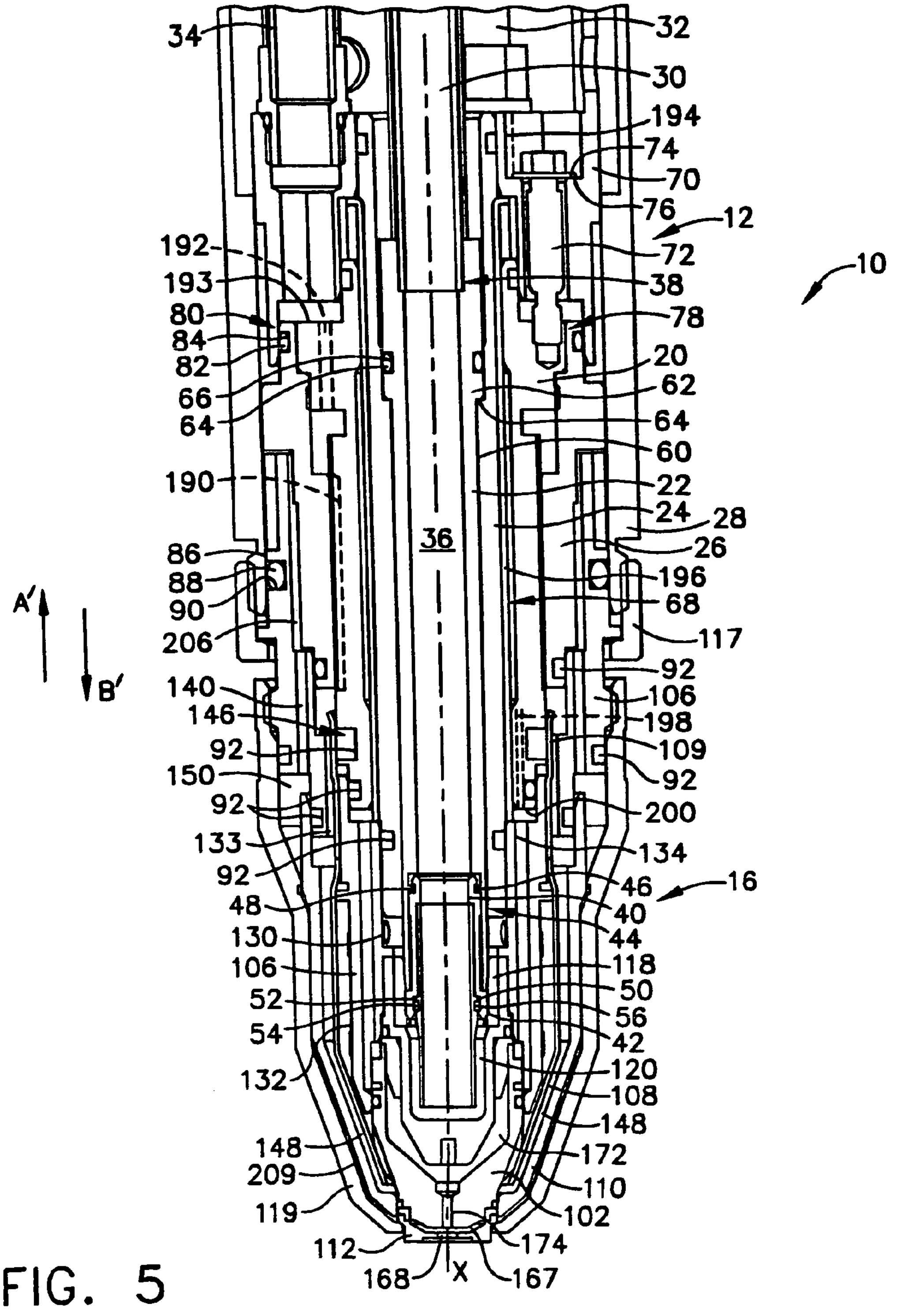
FIG. 5 is an enlarged longitudinal cross-sectional view of a distal portion of the plasma arc torch of FIG. 3 in accordance with the principles of the present invention.

Referring more specifically to FIG. 5, the torch head 12 includes an anode body 20 that is in electrical communication with the positive side of a power supply (not shown), and a cathode 22 that is in electrical communication with the negative side of the power supply. The cathode 22 is further surrounded by a central insulator 24 to insulate the cathode 22 from the anode body 20, and similarly, the anode body 20 is surrounded by an outer insulator 26 to insulate the anode body 20 from a housing 28, which encapsulates and protects the torch head 12 and its components from the surrounding environment during operation. The torch head 12 is further adjoined with a coolant supply tube 30, a plasma gas tube 32, a coolant return tube 34, and a secondary gas tube 35 (shown in their entirety in FIGS. 1 and 2), wherein plasma gas and secondary gas are supplied to and cooling fluid is supplied to and returned from the plasma arc torch 10 during operation as described in greater detail below.

The cathode 22 preferably defines a cylindrical tube having a central bore 36 that is in fluid communication with the coolant supply tube 30 at a proximal portion 38 of the torch head 12. The central bore 36 is also in fluid communication with a cathode cap 40 and a coolant tube 42 disposed at a distal portion 44 of the torch head 12. Generally, the coolant tube 42 serves to distribute the cooling fluid and the cathode cap 40 protects the distal end of the cathode 22 from damage during replacement of the consumable components 16 or other repairs. As further shown, the cathode 22 comprises an internal annular ring 46 that engages a proximal groove 48 formed in the cathode cap 40. As further shown, a flexible collar 49 formed on the cathode cap 40 engages the annular ring 46 such that the cathode cap 40 is properly secured within the cathode 22. To secure the coolant tube 42, the cathode cap 40 defines an internal shoulder 50 against which an annular ring 52 of the coolant tube 42 abuts. Further, the coolant tube 42 defines an o-ring groove 54 that houses an o-ring 56 to seal and retain the interface between the cathode cap 40 and the coolant tube 42. Preferably, the coolant tube 42 is formed of a durable material such as stainless steel, and the cathode cap 40 is insulative and is preferably formed of a material such as Torlon®, or other material known in the art that is also capable of operating at relatively high temperatures (For example, approximately 250° C. to approximately 350° C.).

The central insulator 24 preferably defines a cylindrical tube having an internal bore 60 that houses the cathode 22 as shown. The cathode 22 defines a proximal external shoulder 62 that abuts a proximal internal shoulder 64 of the central insulator 24 to position of the cathode 22 along the central longitudinal axis X of the plasma arc torch 10. Further, the cathode 22 comprises an external o-ring groove 65 that houses an o-ring 66 to seal the interface between the cathode 22 and the central insulator 24. The central insulator 24 is further disposed within the anode body 20 as shown along a central portion 68 and also engages a torch cap 70 that accommodates the coolant supply tube 30, the plasma gas tube 32, and the coolant return tube 34.

Electrical continuity for electric signals such as a pilot return is provided through a contact 72 disposed between the torch cap 70 and the anode body 20. The contact 72 comprises a proximal flange 74 that abuts a recessed shoulder 76 formed in the torch cap 70 and a distal end 78 that engages the anode body 20 as shown. Preferably, the contact 72 is threaded into the anode body 20, however, other attachment methods such as a press fit or soldering may also be used while remaining within the scope of the present invention. Additionally, a distal annular wall 80 of the torch cap 70 abuts an o-ring 82 disposed within an o-ring groove 84 within the outer insulator 26 to seal the interface between the torch cap 70 and the outer insulator 26. Similarly, a distal internal wall 86 of the housing 28 abuts an o-ring 88 disposed within an o-ring groove 90 of the consumable components 16 to seal an interface between the housing 28 and the consumable components 16. Additional o-ring grooves 92 with corresponding o-rings (not shown) are provided between a plurality of interfaces as shown to seal the fluid (plasma gas, secondary gas, cooling fluid) passageways and are not described in further detail herein for purposes of clarity.

Alternately, electrical continuity for the pilot return or other electrical signals may be provided directly through an interface between the torch cap 70 and the anode body 20 using detents engaging a shoulder as shown and described in U.S. Pat. No. 6,163,008, which is commonly assigned with the present application and the contents of which are incorporated herein by reference. The detents may be incorporated on the torch cap 70 or the anode body 20 with a corresponding shoulder and cap on the anode body 20 or torch cap 70, respectively. Further, the detents provide a connection that is relatively simple and easy to engage and disengage. Similarly, other components within the plasma arc torch 10 may also employ the detents and shoulder for their respective connections while remaining within the scope of the present invention.

Consumable Components

Figure 6:
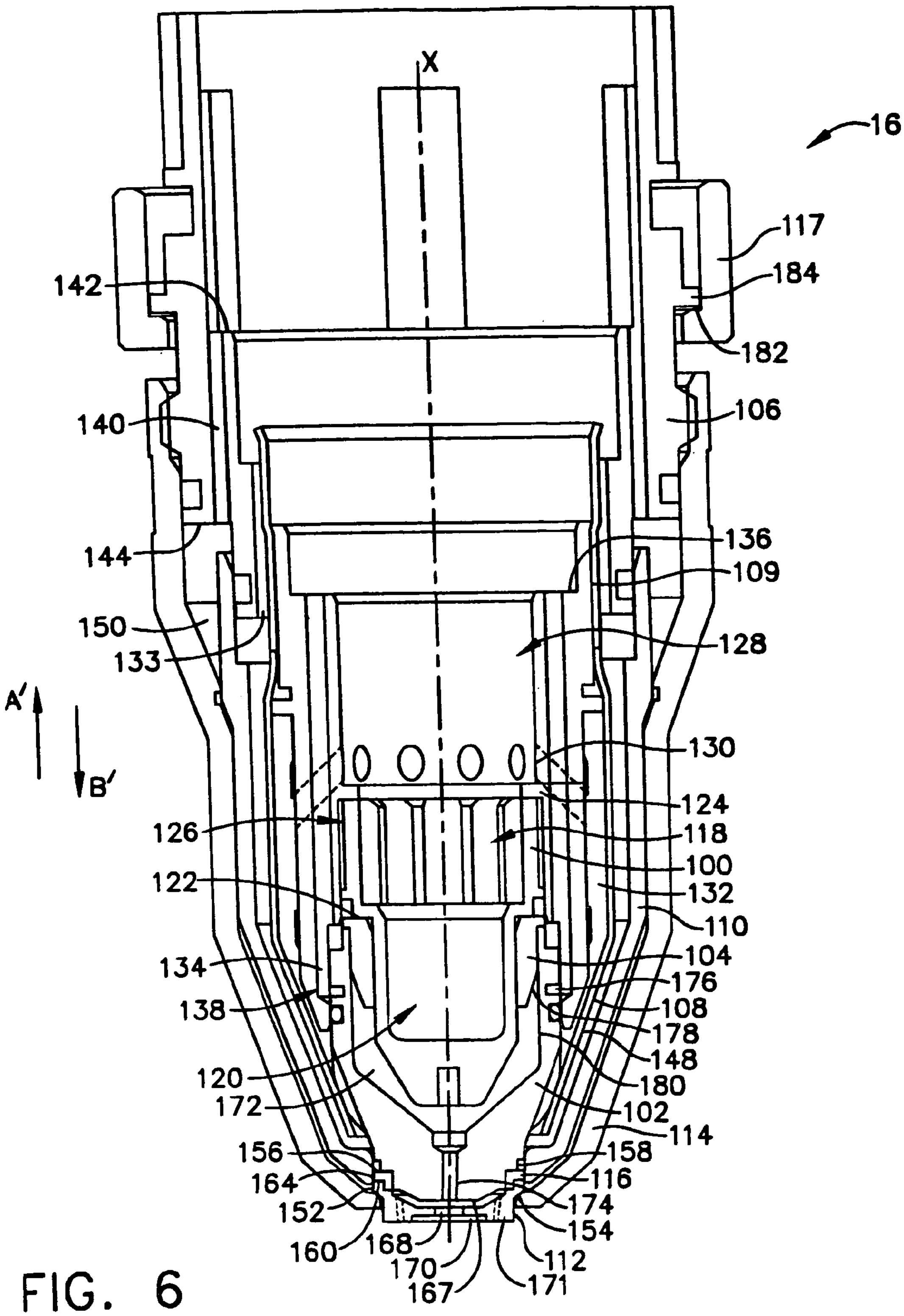
FIG. 6 is a longitudinal cross-sectional view of torch consumable components constructed in accordance with the principles of the present invention.

The consumable components 16, which are shown in greater detail in FIG. 6, comprise an electrode 100, a tip 102, and a spacer 104 disposed between the electrode 100 and the tip 102 as shown. The spacer 104 provides electrical separation between the cathodic electrode 100 and the anodic tip 102, and further provides certain gas distributing functions as described in greater detail below. The consumable components 16 further comprise a cartridge body 106, which generally houses and positions the other consumable components 16. The cartridge body 106 also distributes plasma gas, secondary gas, and cooling fluid during operation of the plasma arc torch 10, which is described in greater detail below. Additionally, the consumable components 16 comprise a distal anode member 108 and a central anode member 109 to form a portion of the anodic side of the power supply by providing electrical continuity to the tip 102. A baffle 110 is also shown disposed between the distal anode member 108 and a shield cap 114, which forms fluid passageways for the flow of a cooling fluid as described in greater detail below. Further, the consumable components 16 comprise a secondary cap 112 for the distribution of the secondary gas and a secondary spacer 116 that separates the secondary cap 112 from the tip 102. A locking ring 117 is shown disposed around the proximal end portion of the consumable components 16, which is used to secure the consumable components 16 to the torch head 12 (not shown).

The electrode 100 is centrally disposed within the cartridge body 106 and is in electrical contact with the cathode 22 (FIG. 5) along an interior portion 118 of the electrode 100 as described in greater detail below. The electrode 100 further defines a distal cavity 120 that is in fluid communication with the coolant tube 42 (FIG. 5) and an external shoulder 122 that abuts the spacer 104 for proper positioning along the central longitudinal axis X of the plasma arc torch 10. The cartridge body 106 further comprises an internal annular ring 124 that abuts a proximal end 126 of the electrode 100 for proper positioning of the electrode 100 along the central longitudinal axis X of the plasma arc torch 10. Additionally, the connection between the cartridge body 106 and the cathode 22 may employ the detents and shoulder as previously described while remaining within the scope of the present invention. In addition to positioning the various consumable components 16, the cartridge body 106 also separates anodic member (e.g., central anode member 109) from cathodic members (e.g., electrode 100). Accordingly, the cartridge body 106 is an insulative material such as PEEK® or other similar material commonly known in the art that is further capable of operating at relatively high temperatures.

For the distribution of cooling fluid as described in greater detail below, the cartridge body 106 defines an upper chamber 128 and a plurality of passageways 130 that extend through the cartridge body 106 and into an inner cooling chamber 132 formed between the cartridge body 106 and the distal anode member 108. Preferably, the passageways 130 (shown dashed) are angled radially outward in the distal direction from the upper chamber 128 (shown dashed) to reduce any amount of dielectric creep that may occur between the electrode 100 and the distal anode member 108. Additionally, outer axial passageways 133 are formed in the cartridge body 106 that provide for a return of the cooling fluid, which is further described below. For the distribution of plasma gas, the cartridge body 106 defines a plurality of distal axial passageways 134 that extend from a proximal face 136 of the cartridge body 106 to a distal end 138 thereof, which are in fluid communication with the plasma gas tube 32 (not shown) and passageways formed in the tip 102 as described in greater detail below. Additionally, a plurality of proximal axial passageways 140 are formed through the cartridge body 106 that extend from a recessed proximal face 142 to a distal outer face 144 for the distribution of a secondary gas, which is also described in greater detail below. Near the distal end of the consumables cartridge 16, an outer fluid passage 148 is formed between the distal anode member 108 and the baffle 110 for the return of cooling fluid as described in greater detail below. Accordingly, the cartridge body 106 performs both cooling fluid distribution functions in addition to plasma gas and secondary gas distribution functions.

As shown in FIGS. 5 and 6, the distal anode member 108 is disposed between the cartridge body 106 and the baffle 110 and is in electrical contact with the tip 102 at a distal portion and with the central anode member 109 at a proximal portion. Further, the central anode member 109 is in electrical contact with a distal portion of the anode body 20. Preferably, a canted coil spring (not shown) is disposed within a groove 146 to provide electrical contact between the central anode member 109 and the anode body 20. Alternately, electrical continuity for the pilot return or other electrical signals may be provided directly through an interface between the central anode member 109 and the anode body 20 using detents engaging a shoulder as shown and described in U.S. Pat. No. 6,163,008, which is commonly assigned with the present application and the contents of which are incorporated herein by reference. The detents may be incorporated on the central anode member 109 or the anode body 20 with a corresponding shoulder and cap on the anode body 20 or central anode member 109, respectively. Accordingly, the anode body 20, the distal anode member 108, the central anode member 109, and the tip 102 form the anode, or positive, potential for the plasma arc torch 10.

Figure 7:
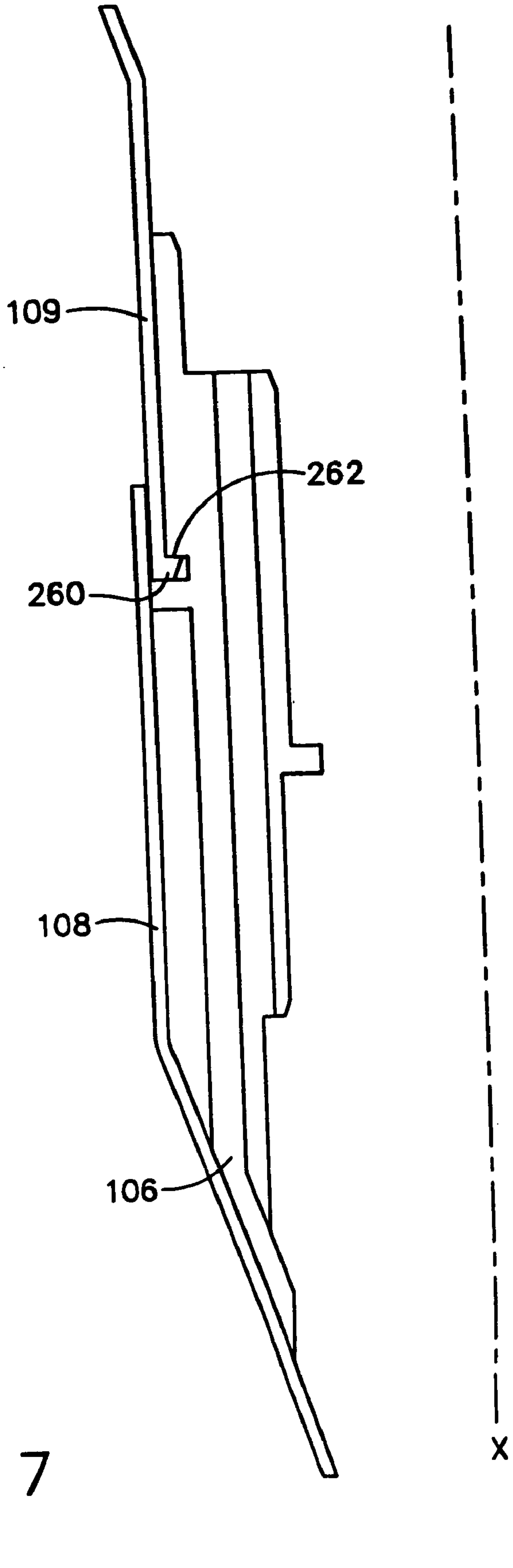
FIG. 7 is a cross-sectional view of anode members constructed in accordance with the principles of the present invention.
Figure 8:
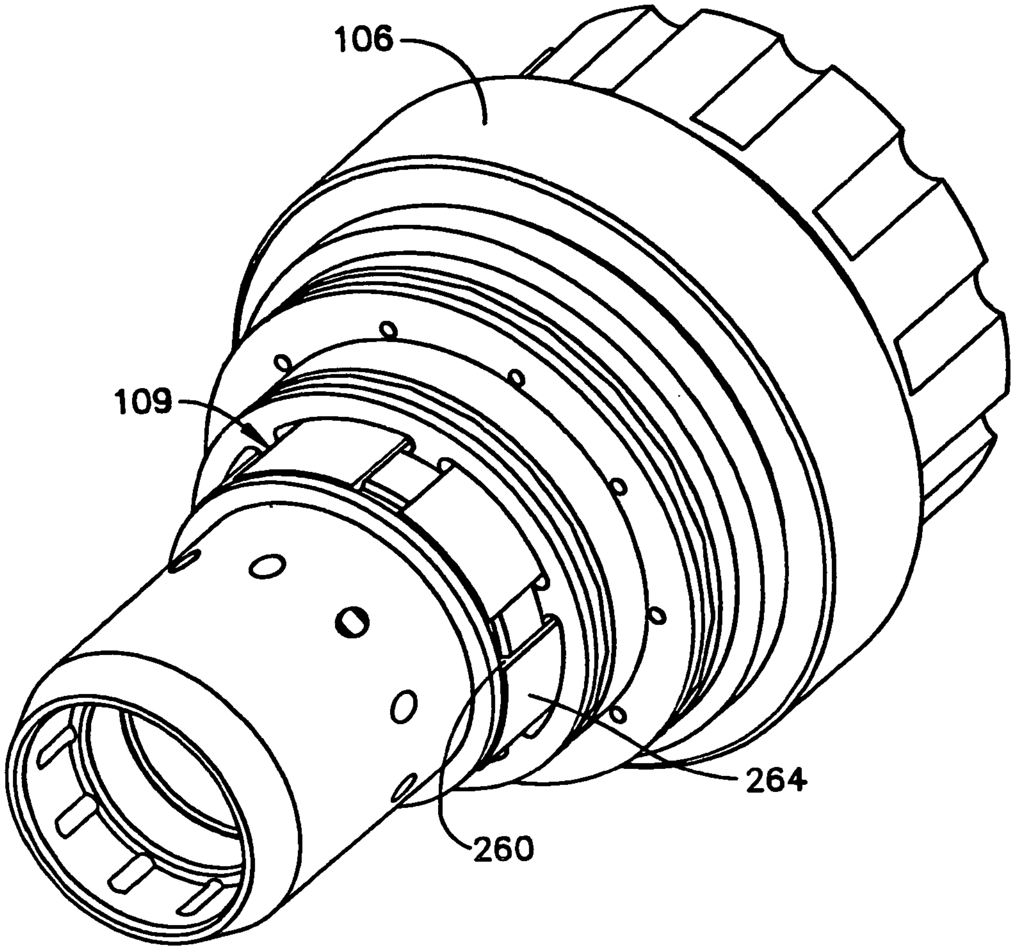
FIG. 8 is a perspective view of a cartridge body illustrating flexible tabs for a central anode member constructed in accordance with the principles of the present invention.

The detents are illustrated in greater detail in FIGS. 7 and 8, wherein the central anode member 109 is preferably secured to the cartridge body 106 using detents 260 as shown. (Certain portions of the plasma arc torch 10 and the cartridge body 106 are omitted for purposes of clarity). The detents 260 extend radially inward to engage a shoulder 262 formed at the proximal end of the cartridge body 106 that extends radially outward as shown. Alternately, the detents 260 may extend radially outward while the shoulder 262 extends radially inward in another form of the present invention. Additionally, the detents 260 are formed in flexible tabs 264 of the central anode member 109 as shown, wherein the tabs 264 provide additionally flexibility for assembly of the central anode member 109 to the cartridge body 106.

Referring again to FIG. 6, the shield cap 114 surrounds the baffle 110 as shown, wherein a secondary gas passage 150 is formed therebetween. Generally, the secondary gas flows from the proximal axial passageways 140 formed in the cartridge body 106 into the secondary gas passage 150 and through the secondary cap 112, as described in greater detail below, to stabilize the plasma stream exiting the secondary cap 112 in operation. The shield cap 114 further positions the secondary cap 112, wherein the secondary cap 112 defines an annular shoulder 152 that engages a conical interior surface 154 of the shield cap 114. Alternately, the shield cap 114 may define a rounded corner (not shown) rather than a conical surface to engage the annular shoulder 152 for an improved fit. Similarly, the secondary cap 112 may alternately define a rounded corner that engages the conical interior surface 154 of the shield cap 114.

The secondary spacer 116 spaces and insulates the secondary cap 112 from the tip 102. Preferably, the secondary spacer 116 comprises a proximal face 156 that abuts an annular shoulder 158 of the tip 102 and a distal face 160 and shoulder 162 that abut an internal shoulder 164 of the secondary cap 112. As further shown, a secondary gas chamber 167 is formed between the tip 102 and the secondary cap 112, wherein the secondary gas is distributed to stabilize the plasma stream, as described in greater detail below. The secondary cap 112 further comprises a central exit orifice 168 through which the plasma stream exits and a recessed face 170 that contributes to controlling the plasma stream. Additionally, bleed passageways 171 may be provided through the secondary cap 112, which are shown as axial holes although other configurations may be employed as described in greater detail below, to bleed off a portion of the secondary gas for additional cooling during operation.

The tip 102 is electrically separated from the electrode 100 by the spacer 104, which results in a plasma chamber 172 being formed between the electrode 100 and the tip 102. The tip 102 further comprises a central exit orifice 174, through which a plasma stream exits during operation of the plasma arc torch 10 as the plasma gas is ionized within the plasma chamber 172. Accordingly, the plasma gas enters the tip 102 through an annular ring 176 and swirl holes 178, which are described in greater detail below, formed through an interior wall 180 of the tip 102 as shown.

As further shown, the locking ring 117 secures the consumable components 16 to the torch head 12 when the plasma arc torch 10 is fully assembled. The locking ring 117 forms an internal shoulder 182 that engages an annular ring 184 formed on the cartridge body 106 and is preferably secured to the torch head 12 through a threaded connection. Alternately, the torch head 12 may be secured to the torch consumable components 16 using a dual pitch locking connector as shown and described in copending application Ser. No. 10/035,534 filed Nov. 9, 2001, which is commonly assigned with the present application and the contents of which are incorporated herein by reference.

Cooling Fluid Flow

Referring again to FIGS. 5 and 6, in operation, the cooling fluid flows distally through the central bore 36 of the cathode 22, through the coolant tube 42, and into the distal cavity 120 of the electrode 100. The cooling fluid then flows proximally through the proximal cavity 118 of the electrode 100 to provide cooling to the electrode 100 and the cathode 22 that are operated at relatively high currents and temperatures. The cooling fluid continues to flow proximally to the radial passageways 130 in the cartridge body 106, wherein the cooling fluid then flows through the passageways 130 and into the inner cooling chamber 132. The cooling fluid then flows distally towards the tip 102, which also operates at relatively high temperatures, in order to provide cooling to the tip 102. As the cooling fluid reaches the distal portion of the distal anode member 108, the cooling fluid reverses direction again and flows proximally through the outer fluid passage 148 and then through the outer axial passageways 133 in the cartridge body 106. The cooling fluid then flows proximally through recessed walls 190 (shown dashed) and axial passageways 192 (shown dashed) formed in the anode body 20. Once the cooling fluid reaches a proximal shoulder 193 of the anode body 20, the fluid flows through the coolant return tube 34 and is recirculated for distribution back through the coolant supply tube 30.

Figure 9A:
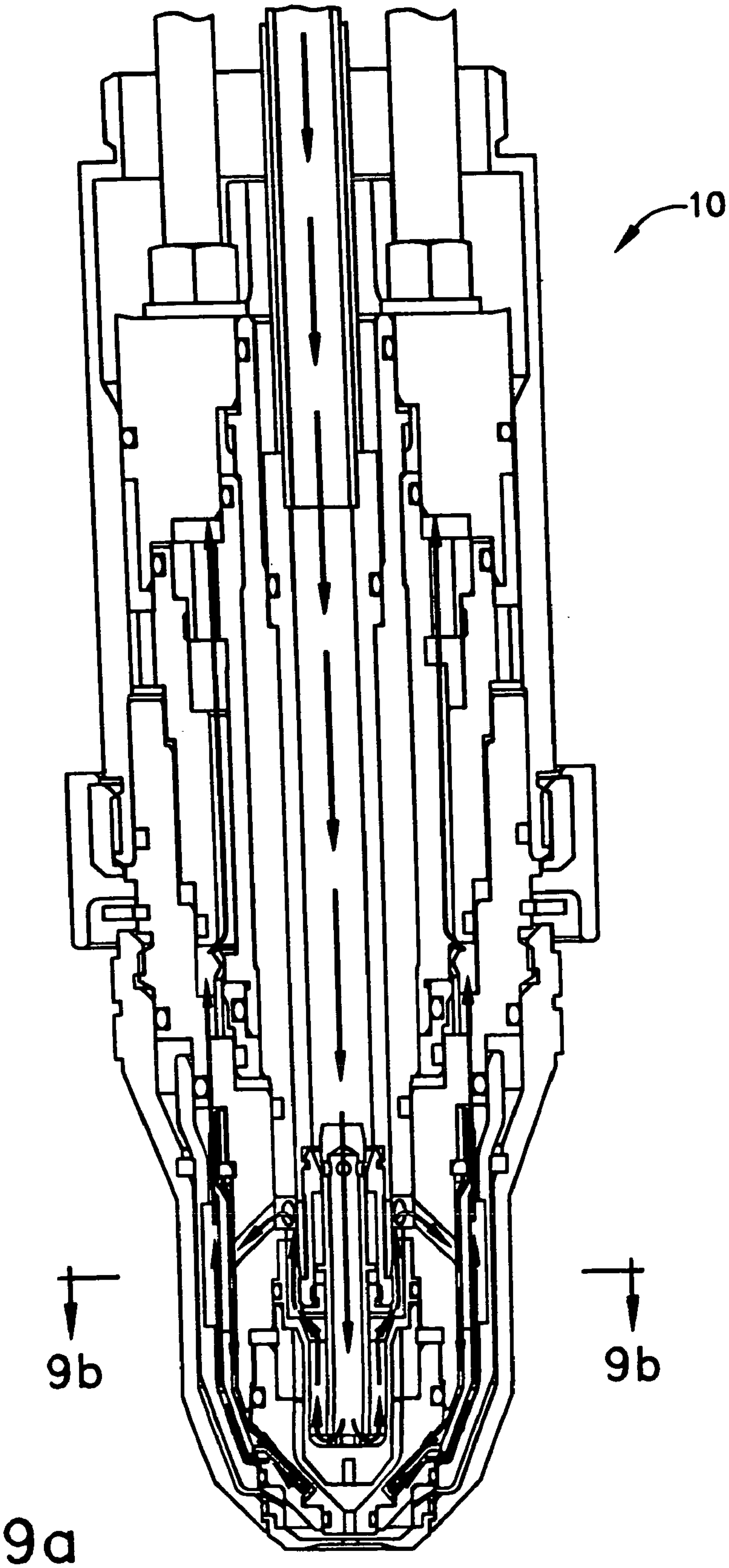
FIG. 9*a* is a longitudinal cross-sectional view of a plasma arc torch illustrating coaxial flow in accordance with the principles of the present invention.
Figure 9B:
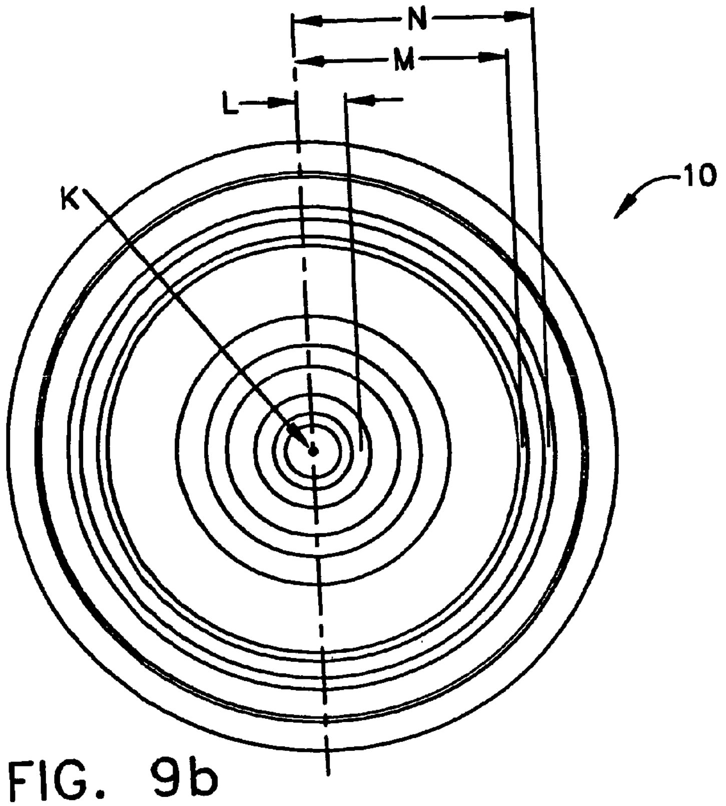
FIG. 9*b* is a lateral cross-sectional view of a plasma arc torch illustrating coaxial flow in accordance with the principles of the present invention.

As a result, the cooling fluid flow is "coaxial," which is illustrated in FIGS. 9*a* and 9*b*, wherein the flow of the cooling fluid is shown by the heavy dark arrows. As shown, the cooling fluid generally flows distally, then proximally, then distally again, and then proximally to return the cooling fluid for recirculation. Additionally, the cooling fluid flows annularly, which is best shown in FIG. 9*b*, wherein the flow is generally annular about the central longitudinal axis X of the plasma arc torch 10. As further shown, the flow is in the same direction (i.e. proximal or distal) at each radial location K, L, M, and N. At radial location K, the cooling fluid is flowing distally; at radial location L, the cooling fluid is flowing proximally; at radial location M, the cooling fluid is flowing distally, and at radial location N, the cooling fluid is flowing proximally again. Also note that the cooling fluid does not flow radially to cross the central longitudinal axis X of the plasma arc torch 10 for fluid return. Rather, the cooling fluid flows coaxially and progressively outwardly to cool components of the plasma arc torch 10 and to return for recirculation.

Therefore, as used herein, the term coaxial flow shall be construed to mean a flow that is annular and that flows in the same direction at any given radial location from the central longitudinal axis X of the plasma arc torch 10. Additionally, the term "annular" shall be construed to mean a flow that is distributed circumferentially about the central longitudinal axis of the plasma arc torch. Therefore, coaxial flow is a flow that is distributed circumferentially about the central longitudinal axis of the torch and that is flowing in the same direction at any radial location from the central longitudinal axis. Accordingly, a coaxial cooling flow is provided by the present invention to efficiently cool components throughout the plasma arc torch 10.

Plasma Gas Flow

Referring to FIGS. 5 and 6, the plasma gas generally flows distally from the plasma gas tube 32, through an axial passage 194 (shown dashed) in the torch cap 70, and into a central cavity 196 formed in the anode body 20. The plasma gas then flows distally through axial passageways 198 formed through an internal distal shoulder 200 of the anode body 20 and into the distal axial passageways 134 formed in the cartridge body 106. The plasma gas then enters the plasma chamber 172 through passageways in the tip 102, which are described in greater detail below, to form a plasma stream as the plasma gas is ionized by the pilot arc.

Secondary Gas Flow

Figure 10:
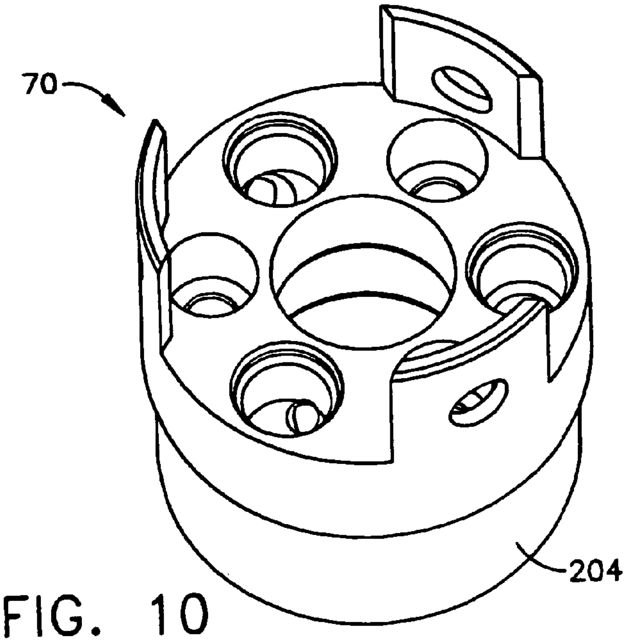
FIG. 10 is a perspective view of a torch cap of a plasma arc torch and constructed in accordance with the principles of the present invention.
Figure 11:
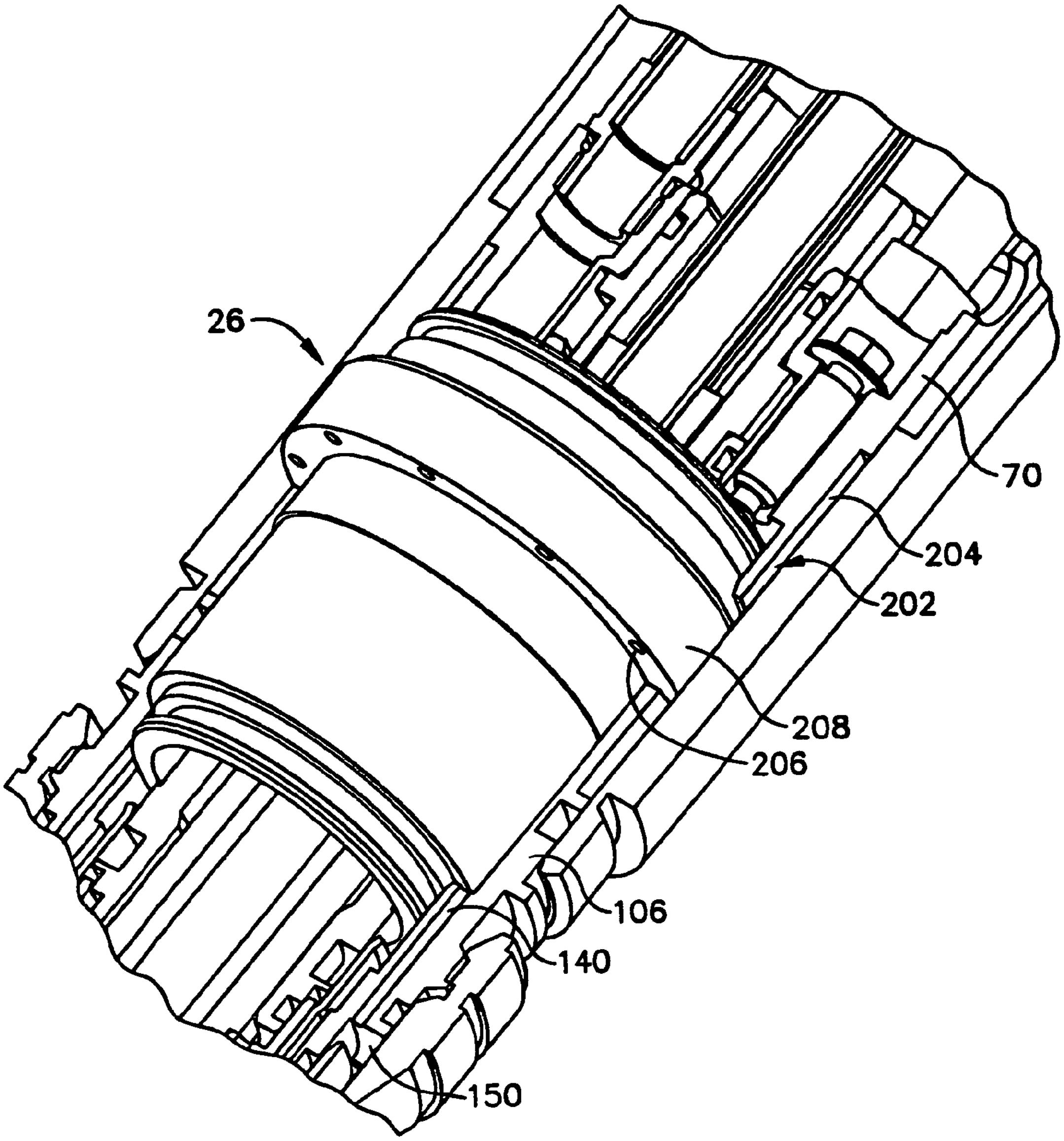
FIG. 11 is a cutaway perspective view of a plasma arc torch illustrating fluid passageways in accordance with the principles of the present invention.

Referring to FIGS. 5, 10, and 11, the secondary gas generally flows distally from the secondary gas tube 35 (shown in FIGS. 1 and 2) and through an axial passage 202 formed between an outer wall 204 of the torch cap 70 and the housing 28. The secondary gas then continues to flow distally through axial passageways 206 formed through an annular extension 208 of the outer insulator 26 and into the proximal axial passageways 140 of the cartridge body 106. The secondary gas then enters the secondary gas passage 150 and flows distally between the baffle 110 and the shield cap 114, through the distal secondary gas passage 209. Finally, the secondary gas enters the secondary gas plenum 167 through passageways formed in the secondary cap 112, which are described in greater detail below, to stabilize the plasma stream that exits through the central exit orifice 174 of the tip 102.

Operation

In operation, the cathode or negative potential is carried by the cathode 22 and the electrode 100. The anode or positive potential is carried by the anode body 20, the distal anode member 108, the central anode member 109, and the tip 102. Therefore, when electric power is applied to the plasma arc torch 10, a pilot arc is generated in the gap formed between the electrode 100 and the tip 102, within the plasma chamber 172. As the plasma gas enters the plasma chamber 172, the plasma gas is ionized by the pilot arc, which cause a plasma stream to form within the plasma chamber 172 and flow distally through the central exit orifice 174 of the tip 102. Additionally, the secondary gas flows into the secondary gas plenum 167 and stabilizes the plasma stream upon exiting the central exit orifice 174 of the tip 102. As a result, a highly uniform and stable plasma stream exits the central exit orifice 168 of the secondary cap 112 for high current, high tolerance cutting operations.

Electrode Embodiments

Referring now to FIGS. 12*a* through 18, and FIGS. 52 through 54, the electrode 100 may comprise a variety of configurations for proper cooling, electrical contact with the cathode 22, and attachment to the cartridge body 106. In the embodiments shown and described herein, cooling of the electrode 100 is provided proximate, or through an adjacent vicinity of, the electrical contact between the electrode 100 and the cathode 22, which is further defined in the description that follows.

Figure 12A:
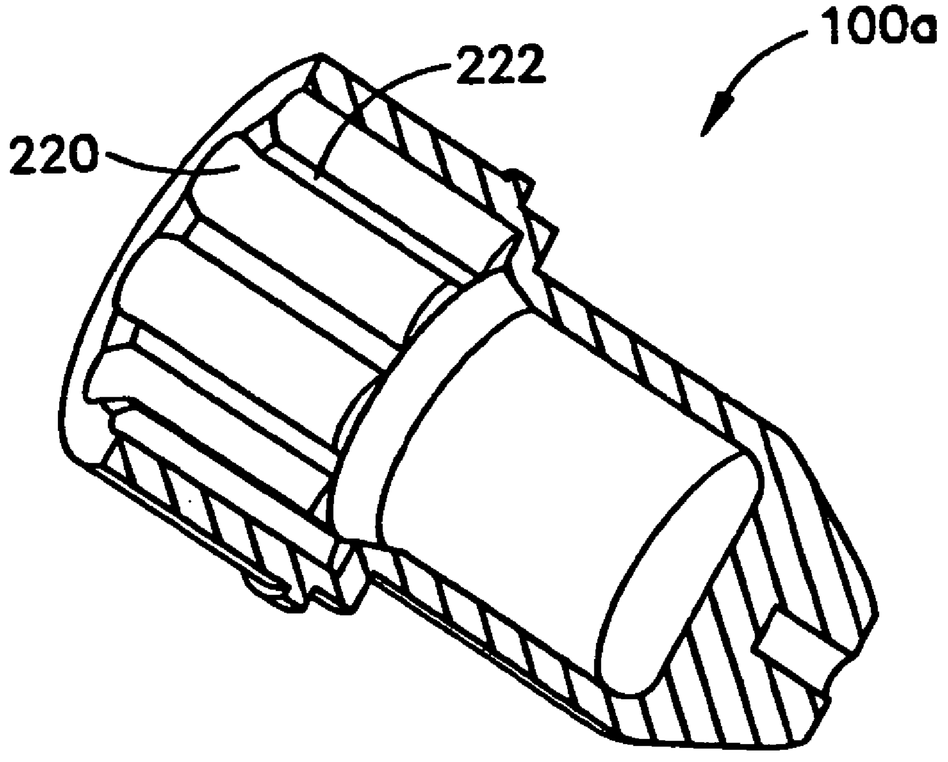
FIG. 12*a* is a cutaway perspective view of an electrode constructed in accordance with the principles of the present invention.
Figure 12B:
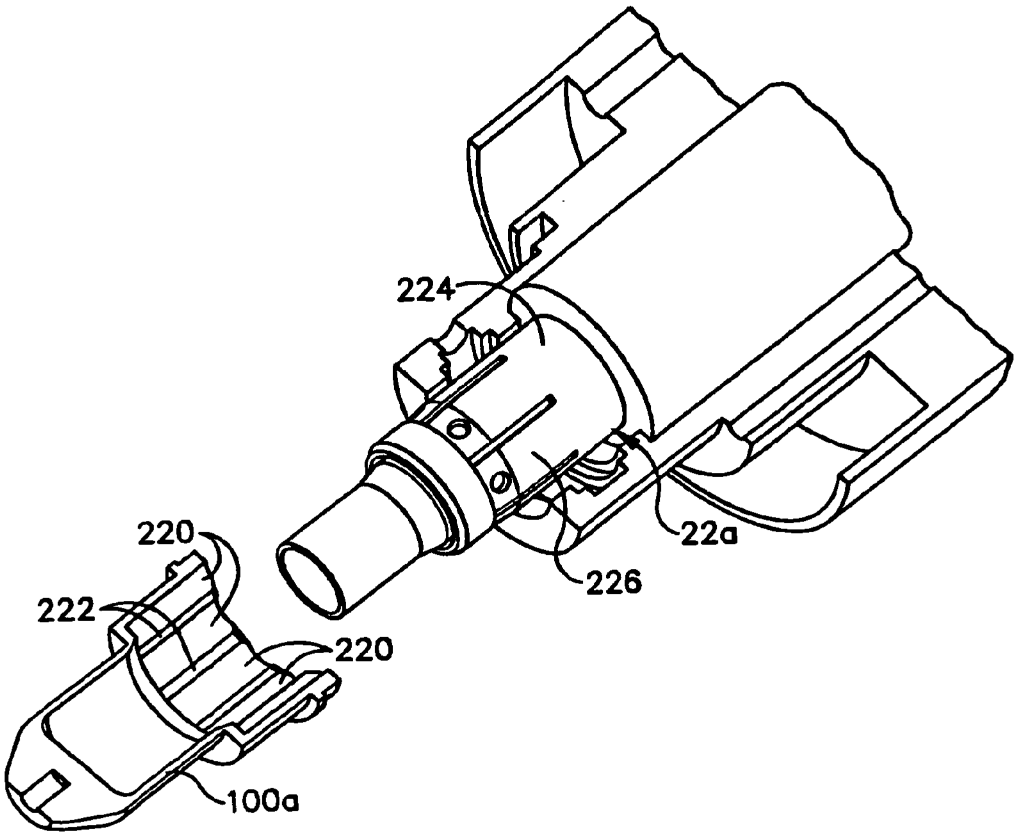
FIG. 12*b* is a perspective cutaway exploded view of a cathode within a torch head and an electrode constructed in accordance with the principles of the present invention.
Figure 12C:
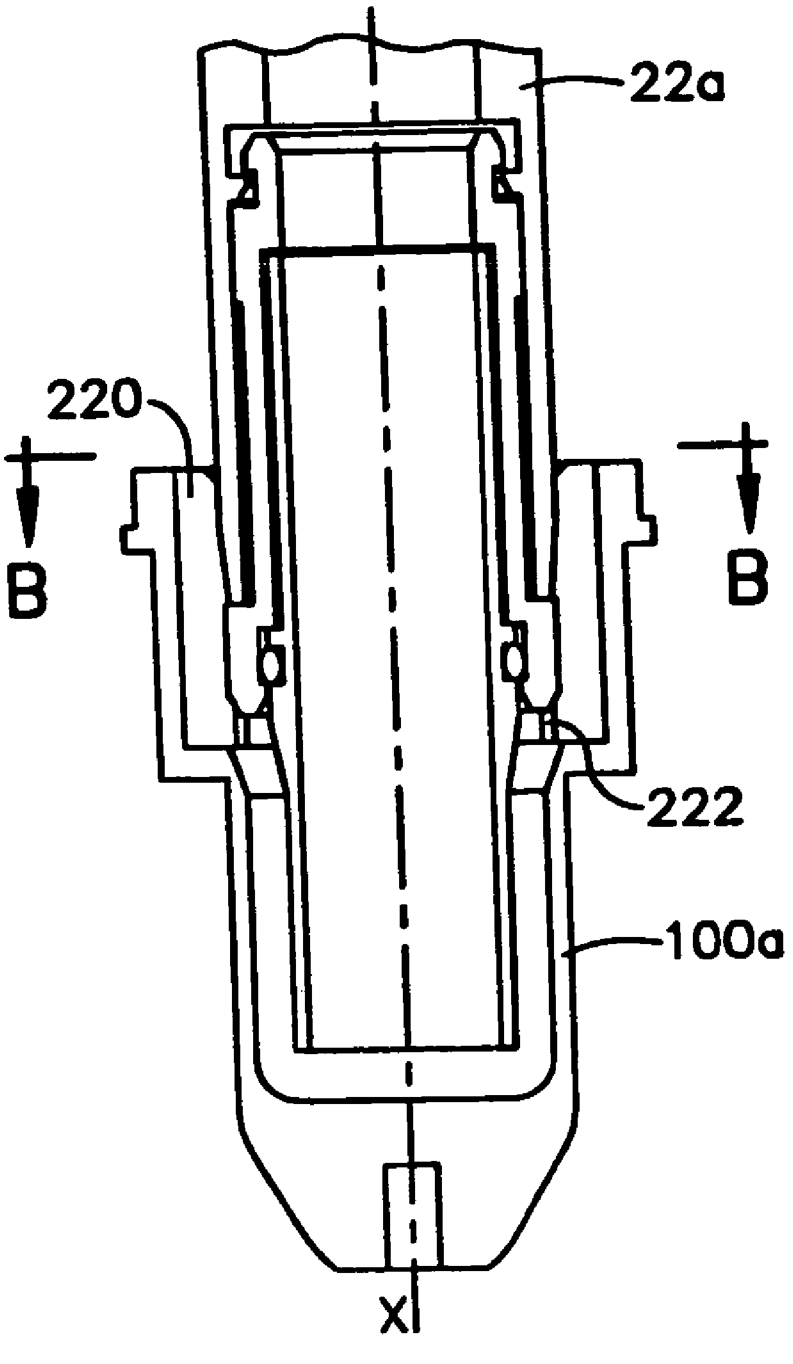
FIG. 12*c* is a cross-sectional view of an electrode disposed around a cathode in accordance with the principles of the present invention.

In a first embodiment as shown in FIGS. 12*a* through 12*d*, the electrode 100*a* defines flutes 220 and raised ribs 222. The flutes 220 form a fluid passageway between the electrode 100*a* and the cathode 22*a* (best shown in FIG. 12*d*) for cooling proximate the electrical contact between the electrode 100*a* and the cathode 22*a*. More specifically, the flutes 220 produce a relatively high velocity flow proximate the interface between the electrode 100*a* and the cathode 22*a*, where cooling is critical. Additionally, the raised ribs 222 are in electrical contact with an outer wall 224 of the cathode 22*a*, which provides electrical continuity between the cathodic members (i.e. cathode, electrode) of the plasma arc torch 10. Preferably, the outer wall 224 defines a plurality of axial tabs 226 as shown in FIG. 12*b* such that the cathode cap 40 and the coolant tube 42 may be more easily assembled within the cathode 22*a*.

Figure 12D:
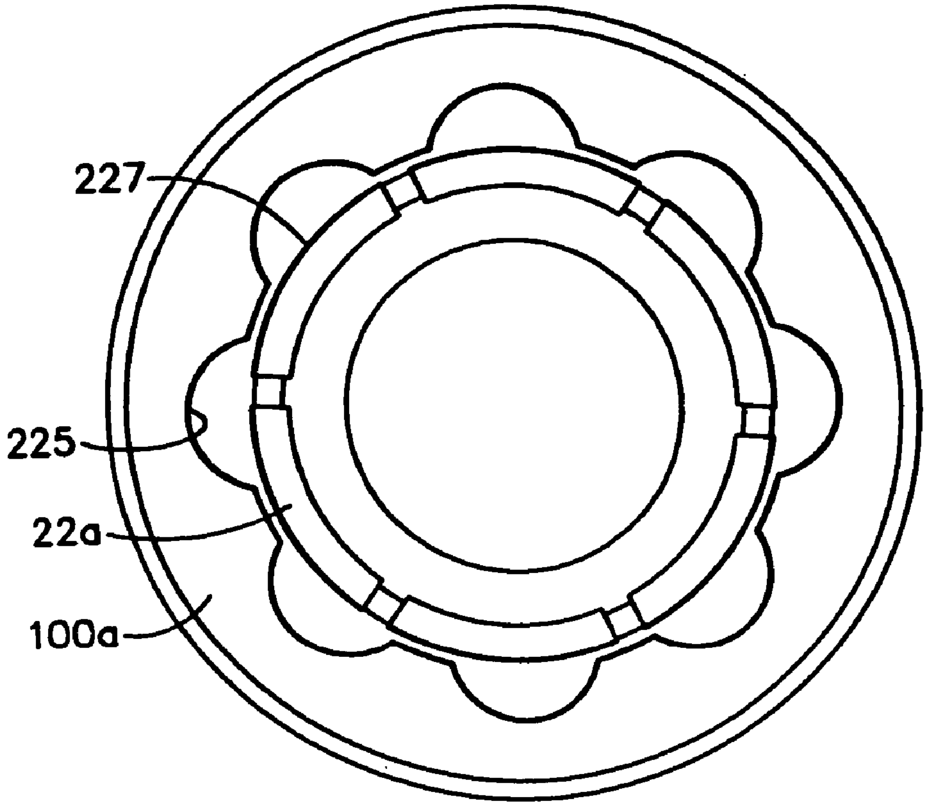
FIG. 12*d* is a lateral cross-sectional view, taken along line B—B of FIG. 12*c*, illustrating adjacent perimeter surfaces between an electrode and a cathode in accordance with the principles of the present invention.

Referring specifically to FIG. 12*d*, which is a view showing the lateral interface between the electrode 100*a* and the cathode 22*a*, the electrode 100*a* defines a perimeter surface 225 and the cathode 22*a* similarly defines a perimeter surface 227. The perimeter surfaces 225 and 227 are thus defined by taking a section cut along a lateral plane through the interface between the electrode 100*a* and the cathode 22*a* or other cathodic element. (The surfaces are shown in FIG. 12*d* with a slight gap for illustration purposes only, and the perimeter surface 225 of the electrode 100*a* physically contacts the perimeter surface 227 of the cathode 22*a* during operation). Accordingly, the perimeter surface 225 of the electrode 100*a* is adjacent the perimeter surface 227 of the cathode 22*a*, wherein the adjacent perimeter surfaces 225 and 227 provide both the electrical contact and the passage of a cooling fluid. Thus, a novel aspect of the present invention is providing both the electrical contact and the passage of the cooling fluid through the adjacent perimeter surfaces. As a result, both cooling and electrical contact are provided proximate, or in an adjacent vicinity to, one another, which provides for more efficient operation of the plasma arc torch 10.

Figure 13B:
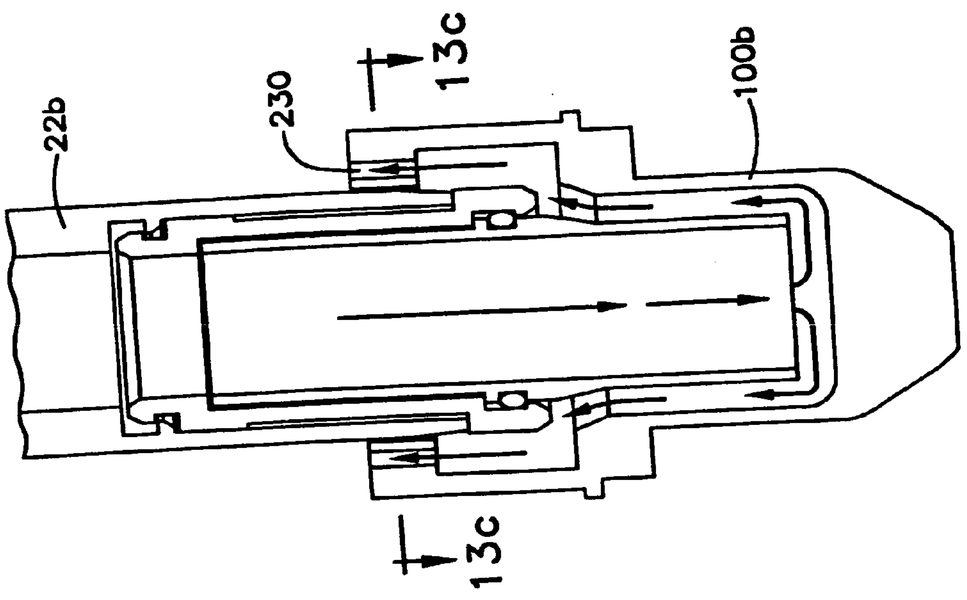
FIG. 13*b* is a longitudinal cross-sectional view of the electrode of the second embodiment secured within a plasma arc torch in accordance with the principles of the present invention.
Figure 13A:
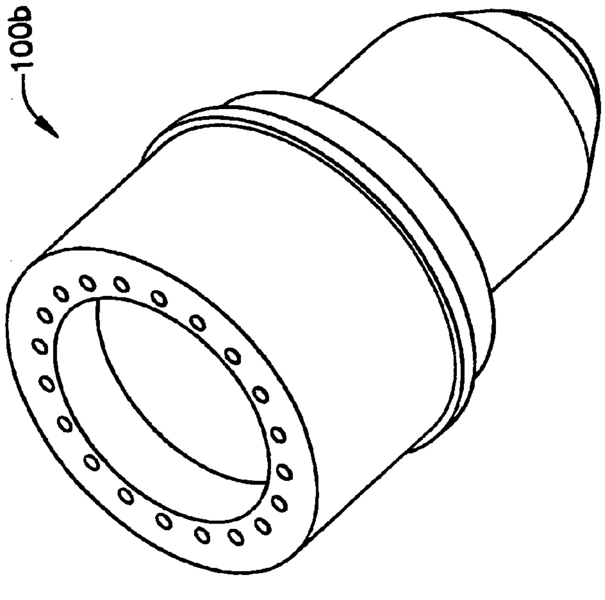
FIG. 13*a* is a perspective view of a second embodiment of an electrode constructed in accordance with the principles of the present invention.
Figure 13C:
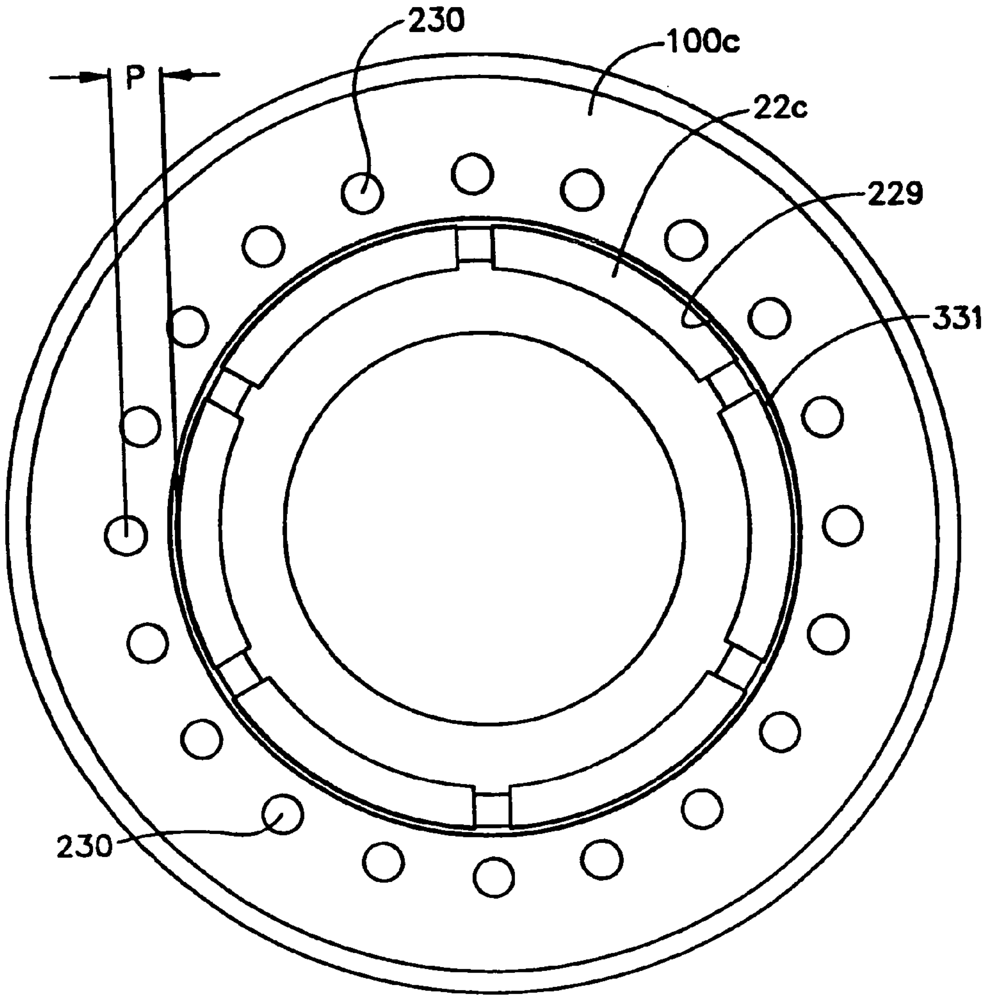
FIG. 13*c* is a lateral cross-sectional view of the electrode of the second embodiment secured within a plasma arc torch in accordance with the principles of the present invention.

As shown in FIGS. 13*a* through 13*c*, a second embodiment of the electrode indicated as 100*b* may alternately define axial passageways 230 rather than the flutes 220, wherein the axial passageways 230 produce the relatively high velocity flow of the cooling fluid that flows proximally therethrough. Accordingly, the cooling fluid flows proximally through the axial passageways 230 to cool the interface between the electrode 100*b* and the cathode 22*b*. For electrical contact, an internal wall 228 is formed within the electrode 100*b* that makes contact with the outer wall 224 of the cathode 22*b*.

Referring to FIG. 13*c*, which is a lateral view through the interface between the electrode 100*b* and the cathode 22*b*, the electrode 100*b* defines a perimeter surface 229 and the cathode 22*b* defines a perimeter surface 331. Accordingly, the perimeter surface 229 of the electrode 100*b* is adjacent the perimeter surface 331 of the cathode 22*b*. (The surfaces are shown in FIG. 13*c* with a slight gap for illustration purposes only, and the perimeter surface 229 of the electrode 100*b* physically contacts the perimeter surface 331 of the cathode 22*b* during operation). Although the adjacent perimeter surfaces 229 and 331 provide only electrical contact in this form of the present invention, the passage of cooling fluid through axial passageways 230 is proximate, or through an adjacent vicinity of the electrical contact as shown such that effective cooling of the interface between the electrode 100*b* and the cathode 22*b* is achieved. For example, the distance P between the axial passageways 230 and the perimeter surface 331 of the cathode 22*c* is up to approximately 0.050 inches to define an adjacent vicinity in one form of the present invention. However, other distances may be employed so long as the electrical interface between the electrode 100*c* and the cathode 22*c* is properly cooled by the cooling fluid flowing through the fluid passageways. Therefore, the terms "proximate" or "adjacent vicinity" as used herein with respect to cooling the interface between the electrode 100 and the cathode 22*b* shall be construed to mean along or within a close distance to the electrical contact such that effective cooling is achieved. Accordingly, the adjacent perimeter surfaces throughout the remaining electrode embodiments shall not be illustrated for purposes of clarity.

Figure 14B:
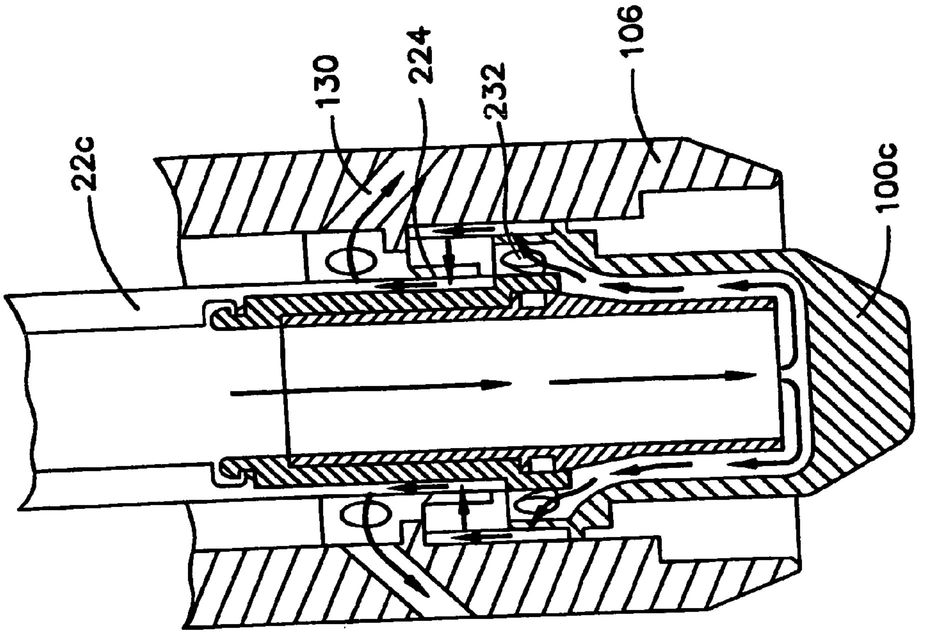
FIG. 14*b* is a longitudinal cross-sectional view of the third electrode embodiment secured within a plasma arc torch in accordance with the principles of the present invention.
Figure 14A:
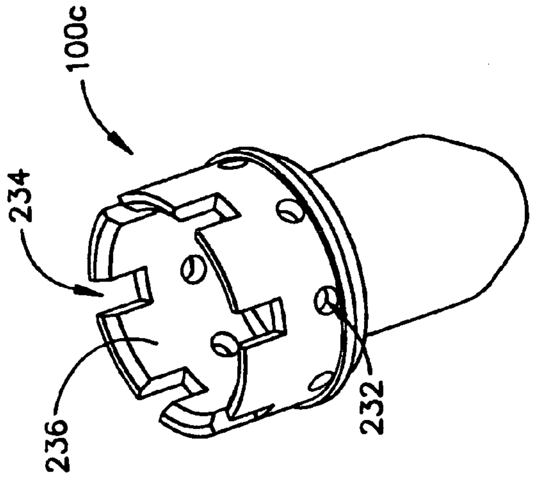
FIG. 14*a* is a perspective view of a third embodiment of an electrode constructed in accordance with the principles of the present invention.

In a third embodiment of the electrode indicated as 100*c* in FIGS. 14*a* and 14*b*, the electrode 100*c* defines radial passageways 232 and axial slots 234 to provide cooling between the electrode 100*c* and the cathode 22*c*. The cooling fluid generally flows proximally to the radial passageways 232 and then proximally to the axial slots 234, wherein the cooling fluid exits the interface between the electrode 100*c* and the cathode 22*c* and proceeds through the passageways 130 as previously described. For electrical contact, an internal wall 236 is similarly formed within the electrode 100*c* that makes contact with the outer wall 224 of the cathode 22*c*. Accordingly, a perimeter surface of the electrode 100*c* is adjacent a perimeter surface of the cathode 22*c* to form a fluid passageway for cooling proximate the electrical contact.

Figure 15:
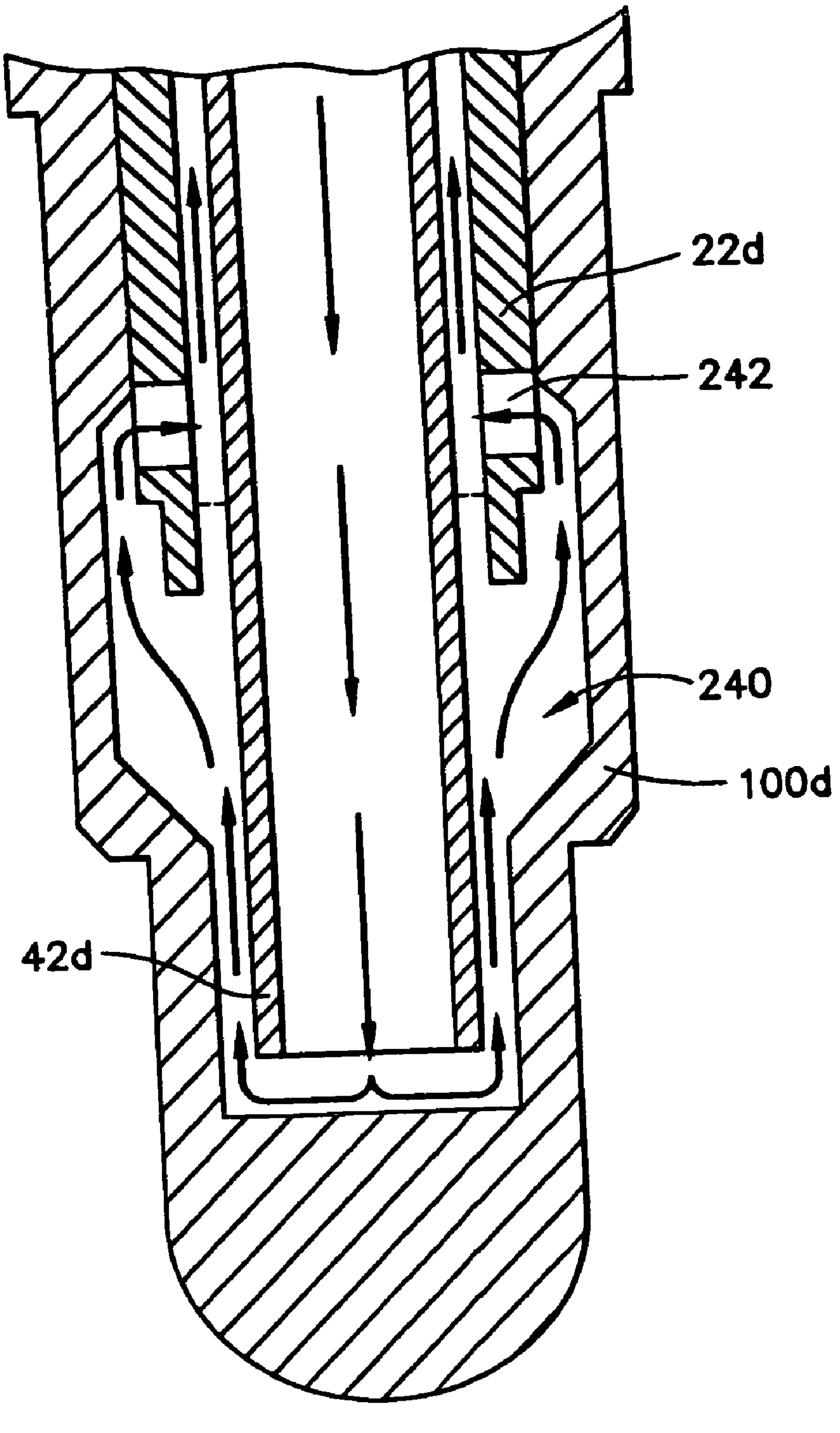
FIG. 15 is a longitudinal cross-sectional view of a fourth embodiment of an electrode secured within a plasma arc torch and constructed in accordance with the principles of the present invention.

Referring now to FIG. 15, a fourth embodiment of the electrode indicated as 100*d* comprises an internal undercut 240 to provide additional cooling of the electrode 100*d* and the interface between the electrode 100*d* and the cathode 22*d*. Additionally, the cathode 22*d* defines radial passageways 242 that provide a return path for the cooling fluid to flow proximally between the coolant tube 42*d* and the cathode 22*d* as shown. Therefore, the cooling fluid flows distally through the coolant tube 42*d*, proximally through the internal under cut 240, then radially inward through the radial passageways 242, and then proximally between the coolant tube 42*d* and the cathode 22*d* for recirculation. Further, electrical contact is provided between an internal wall 244 of the electrode 100*d* and the outer wall 224 of the cathode 22*d*. Accordingly, a fluid passageway is formed such that cooling is provided proximate the electrical contact between the electrode 100*d* and the cathode 22*d*. Alternately, the electrode 100*d* may comprise an external undercut rather than an internal undercut as described herein while remaining within the scope of the present invention.

Figure 16:
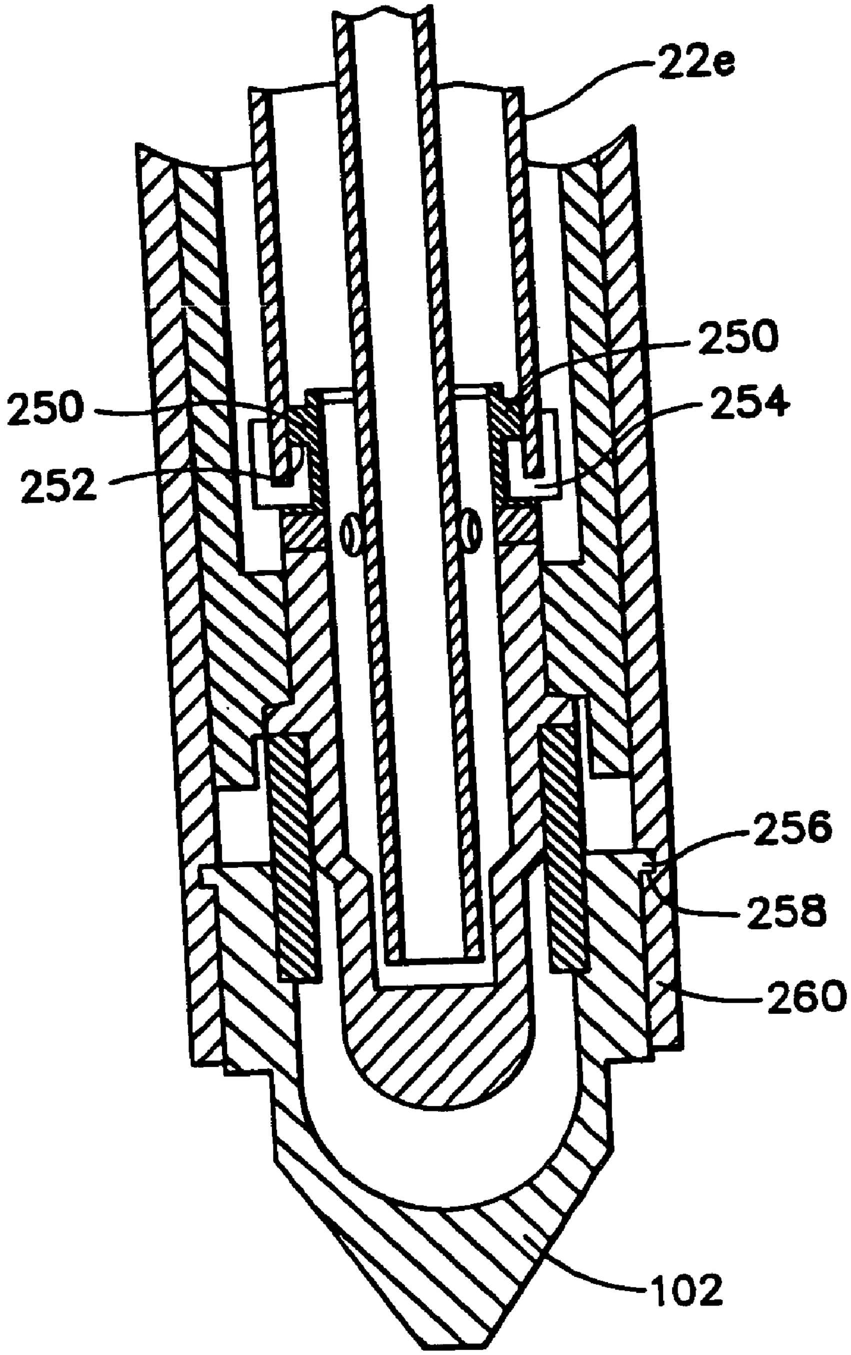
FIG. 16 is a longitudinal cross-sectional view of a fifth embodiment of an electrode secured within a plasma arc torch and constructed in accordance with the principles of the present invention.

As shown in FIG. 16, a fifth embodiment of the electrode indicated as 100*e* is preferably secured within the cathode 22*e* using detents 250 as shown and described in U.S. Pat. No. 6,163,008, which is commonly assigned with the present application and the contents of which are incorporated herein by reference. In the illustrated embodiment, the detents 250 engage a shoulder 252 of a cap 254 secured to a distal end of the cathode 22*e* as shown. Similarly, the tip 102 as shown may also be secured to the cartridge body 106 using detents 256, wherein the detents 256 engage a shoulder 258 of an insulator element 260 secured to a distal end of the cartridge body 106 (not shown). As shown, the detents 250 and 256 extend radially outward to engage the shoulders 252 and 258, respectively. However, the detents 250 and 256 may alternately extend radially inward to engage shoulders (not shown) that extend radially outward in another form of the present invention.

Referring now to FIGS. 17*a* through 17*f*, additional embodiments of the electrode 100 and the cathode 22 are illustrated, wherein cooling is provided proximate or through an adjacent vicinity of the electrical contact between the electrode 100 and the cathode 22 and the cooling fluid flows through at least one fluid passageway formed through the electrode 100 and/or the cathode 10. In each of the following embodiments, the fluid passageway may be formed in either the electrode 100 or the cathode 22, depending on whether the cathode 22 is disposed within the electrode 100 or whether the electrode 100 is disposed around the cathode 22. Accordingly, illustration and discussion of fluid passageways through the electrode 100 shall also be construed to mean fluid passageways through the cathode 22 in alternate forms of the present invention and vice versa.

Figure 17A:
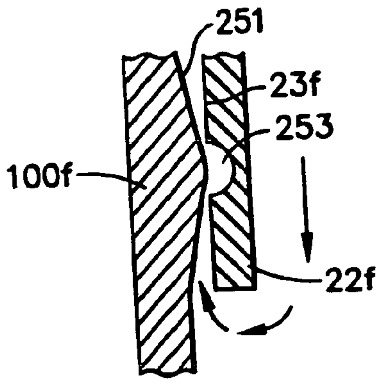
FIG. 17*a* is a longitudinal cross-sectional view of a fluid passageway formed in a cathode adjacent electrical contact with an electrode and constructed in accordance with the teachings of the present invention.
Figure 17B:
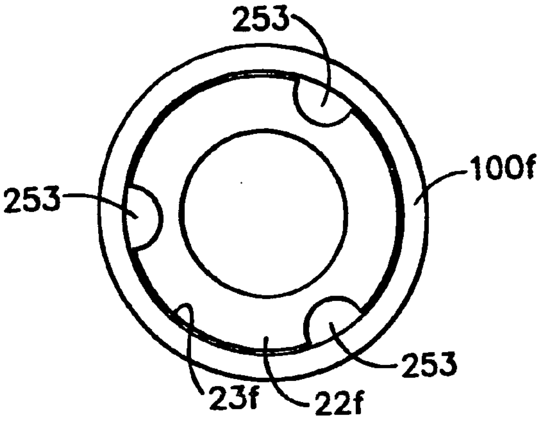
FIG. 17*b* is a lateral cross-sectional view, taken along line C—C of FIG. 17*a*, of the cathode and electrode in accordance with the principles of the present invention.

FIGS. 17*a* and 17*b* illustrate an electrode 100*f* defining an extended inner wall 251 and a cathode 22*f* defining at least one spot recess 253. Accordingly, the cooling fluid flows distally through the cathode 22*f* and then proximally through the spot recesses 253. Since the spot recesses 253 are not continuous around the perimeter of the cathode 22*f*, the extended inner wall 251 of the electrode 100*f* contacts an outer wall 23*f* of the cathode 22*f* as shown for the electrical contact. Therefore, the electrode 100*f* and cathode 22*f* define adjacent perimeter surfaces that provide both cooling and electrical contact as previously described.

Figure 17C:
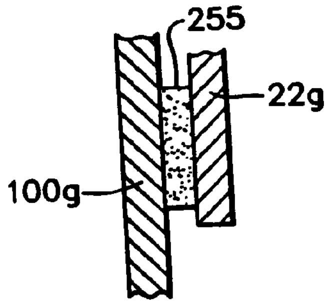
FIG. 17*c* is a longitudinal cross-sectional view of a fluid passageway formed by a third element between a cathode and an electrode in accordance with the principles of the present invention.

FIG. 17*c* illustrates an embodiment of a plasma arc torch 10 wherein a third element 255 is disposed between the cathode 22*g* and the electrode 100*g* to provide both electrical contact and a fluid passageway. The third element 255 is in electrical contact with both the electrode 100*g* and the cathode 22*g*. Accordingly, the third element 255 is conductive and allows the cooling fluid to flow proximally therethrough. For example, the third element 255 may comprise a canted coil spring or a porous, conductive material.

Figure 17D:
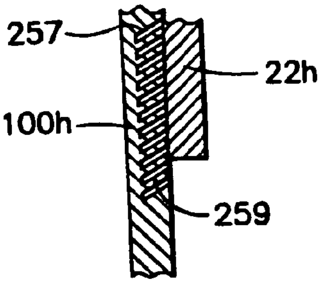
FIG. 17*d* is a longitudinal cross-sectional view of a fluid passageway formed by a helical flute between a cathode and an electrode in accordance with the principles of the present invention.

Referring now to FIG. 17*d*, an electrode 100*h* defines a helical flute 257 for passage of the cooling fluid. The helical flute 257 is formed around and along the interior surface of the electrode 100*h*, which results in a plurality of ribs 259 being formed around the electrode 100*h* to provide the electrical contact between the electrode 100*h* and the cathode 22*h*. Similarly, the helical flute 257 may be formed in the cathode 22*h* rather than the electrode 100*h* as illustrated herein. Accordingly, the fluid passageways comprise the helical flute 257 and the adjacent perimeter surfaces of the electrode 100*h* and the cathode 22*h* provide both cooling and electrical contact as previously described.

Figure 17E:
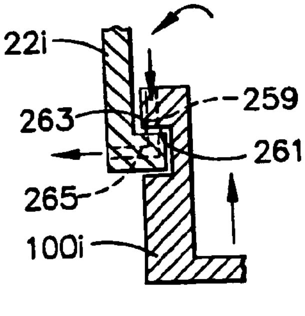
FIG. 17*e* is a longitudinal cross-sectional view of a fluid passageway formed through a cathode and an electrode in accordance with the principles of the present invention.

As shown in another embodiment in FIG. 17*e*, the electrode 100*i* defines axial passageways 259 and an annular face 261 formed in the proximal end portion of the electrode 100*i*. Additionally, the cathode 22*i* defines a proximal annular face 263 and a fluid passageway 265 in fluid communication with the axial passageways 259. Accordingly, the annular face 261 abuts the proximal annular face 263 for the electrical contact and the cooling fluid flows through the axial passageways 259 in the electrode 100*i* and through the fluid passageway 265 in the cathode 100*i* to provide cooling proximate the electrical contact as previously described.

Figure 17F:
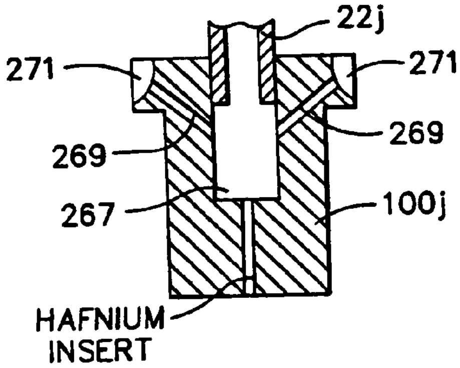
FIG. 17*f* is a longitudinal cross-sectional view of a fluid passageway formed through an electrode in accordance with the principles of the present invention.

Referring now to FIG. 17*f*, another embodiment that provides cooling proximate the electrical contact is illustrated. As shown, the electrode 100*j* defines an internal chamber 267 and canted passageways 269 in fluid communication with the internal chamber 267. The electrode 100*j* further defines cutouts 271 that are in fluid communication with the canted passageways 269. In operation, the cooling fluid flows distally through the cathode 22*j* to the internal chamber 267, then proximally through the canted passageways 269 and the cutouts 271 for distribution to the cartridge body 106 (not shown) as previously described. Accordingly, cooling is provided proximate the electrical contact between the cathode 22*j* and the electrode 100*j*.

Figure 18:
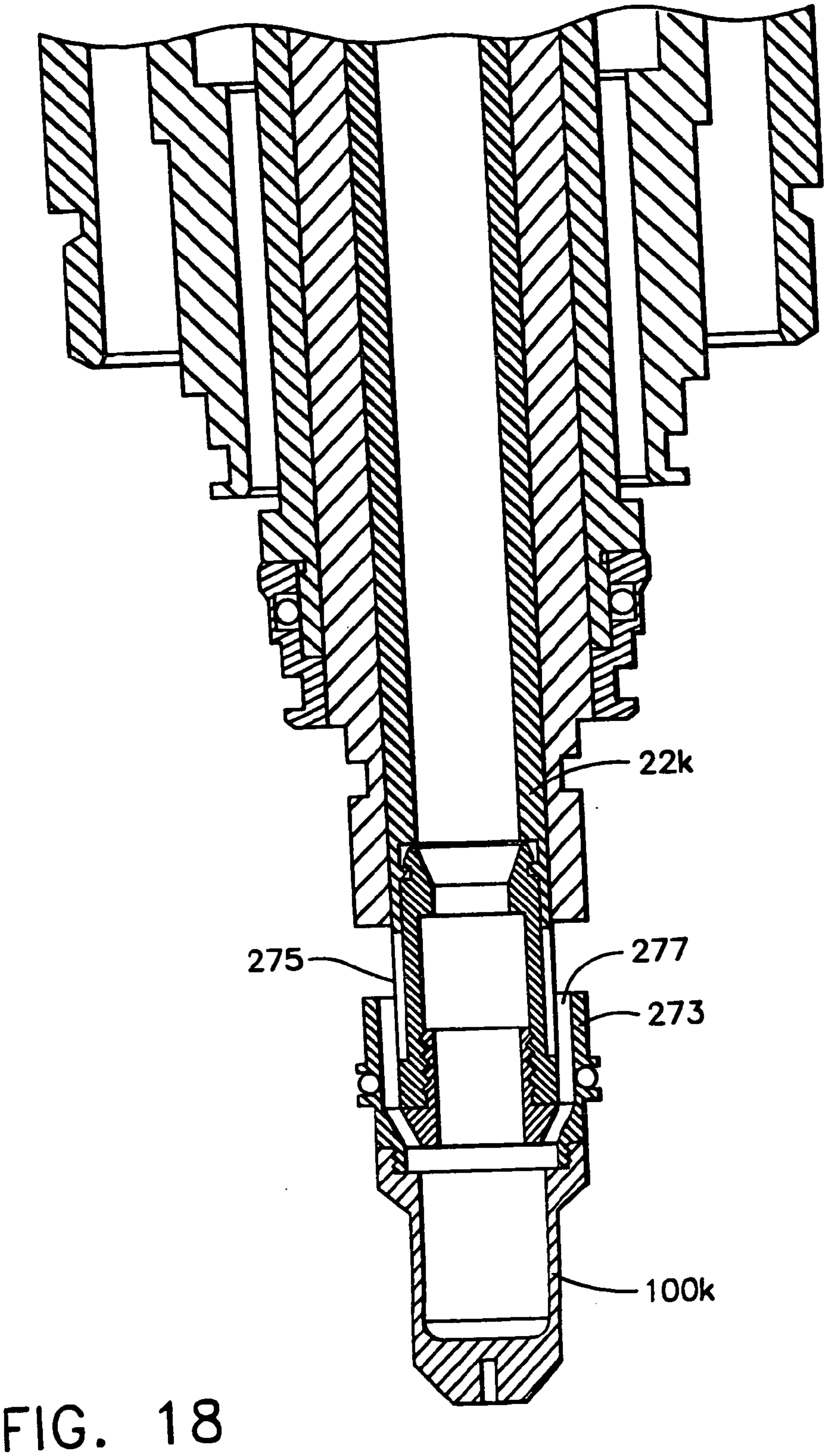
FIG. 18 is a longitudinal cross-sectional view of an electrode holder constructed in accordance with the teachings of the present invention.
Figure 19:
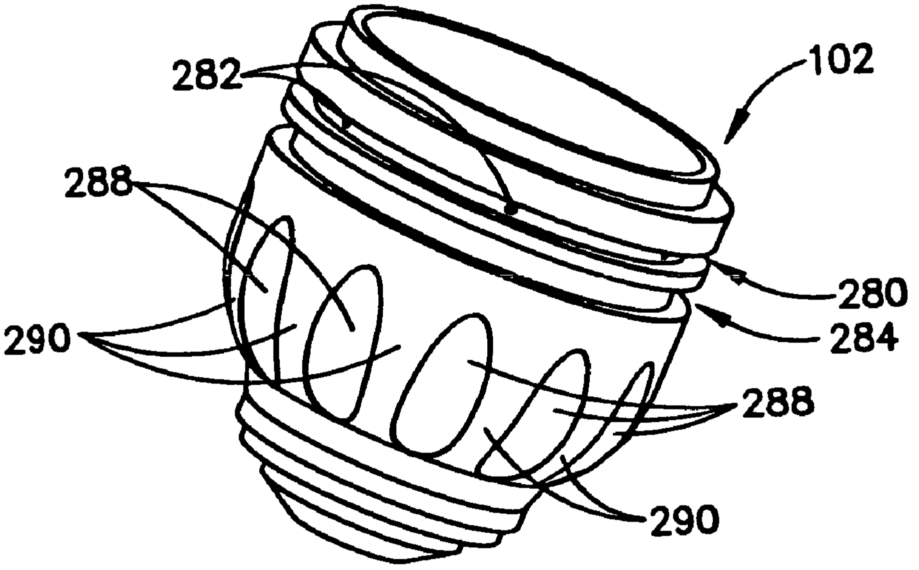
FIG. 19 is a perspective view of a tip constructed in accordance with the principles of the present invention.
Figure 20:
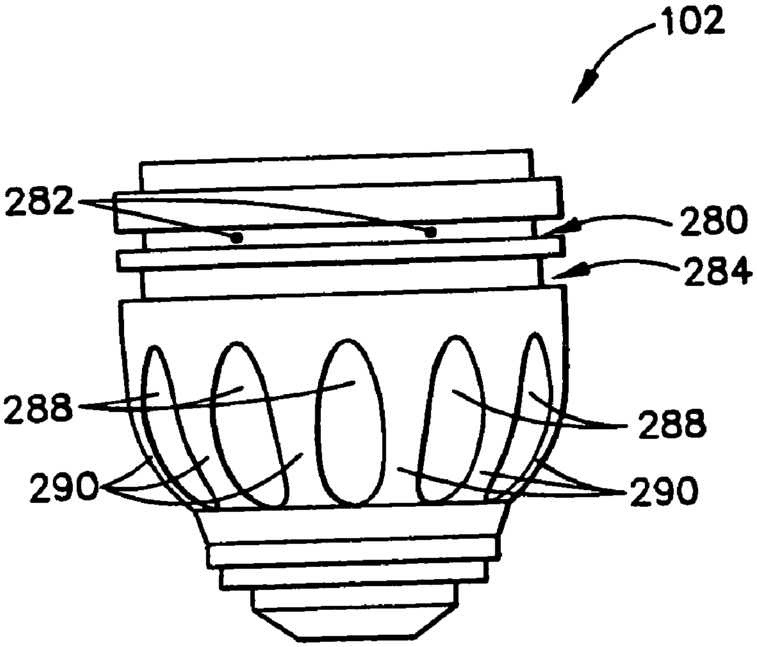
FIG. 20 is a side view of the tip of FIG. 19 in accordance with the principles of the present invention.
Figure 21:
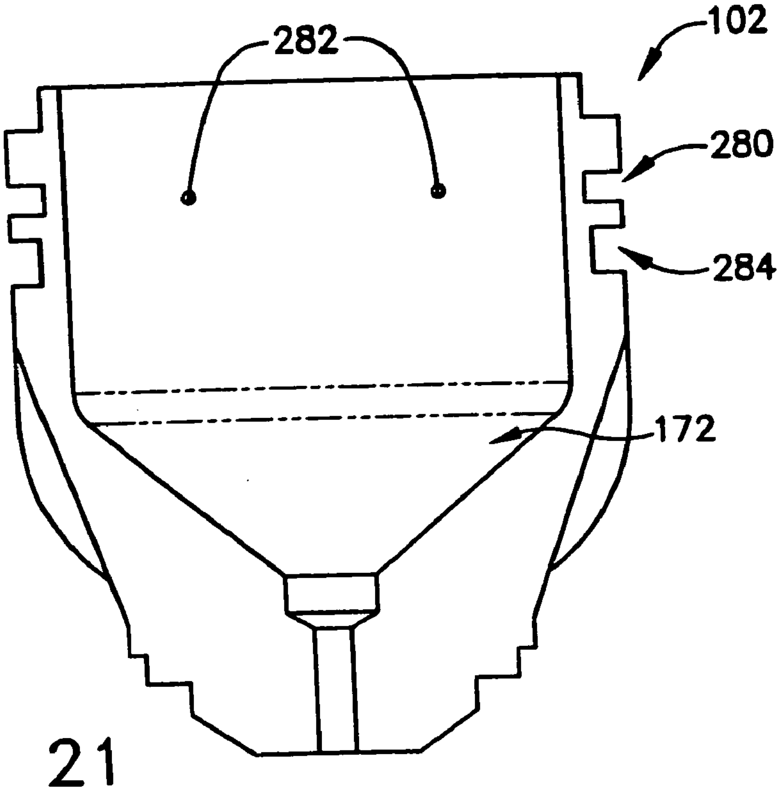
FIG. 21 is a longitudinal cross-sectional view of the tip, taken along line D—D of FIG. 20, in accordance with the principles of the present invention.
Figure 22:
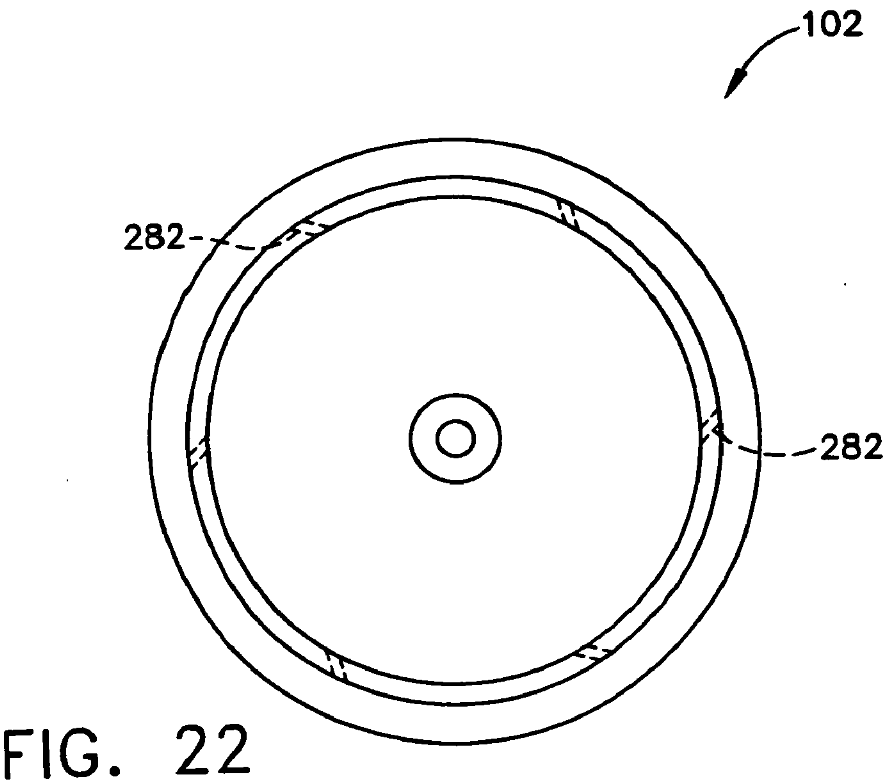
FIG. 22 is a top view of the tip of FIG. 19 in accordance with the principles of the present invention.
Figure 23:
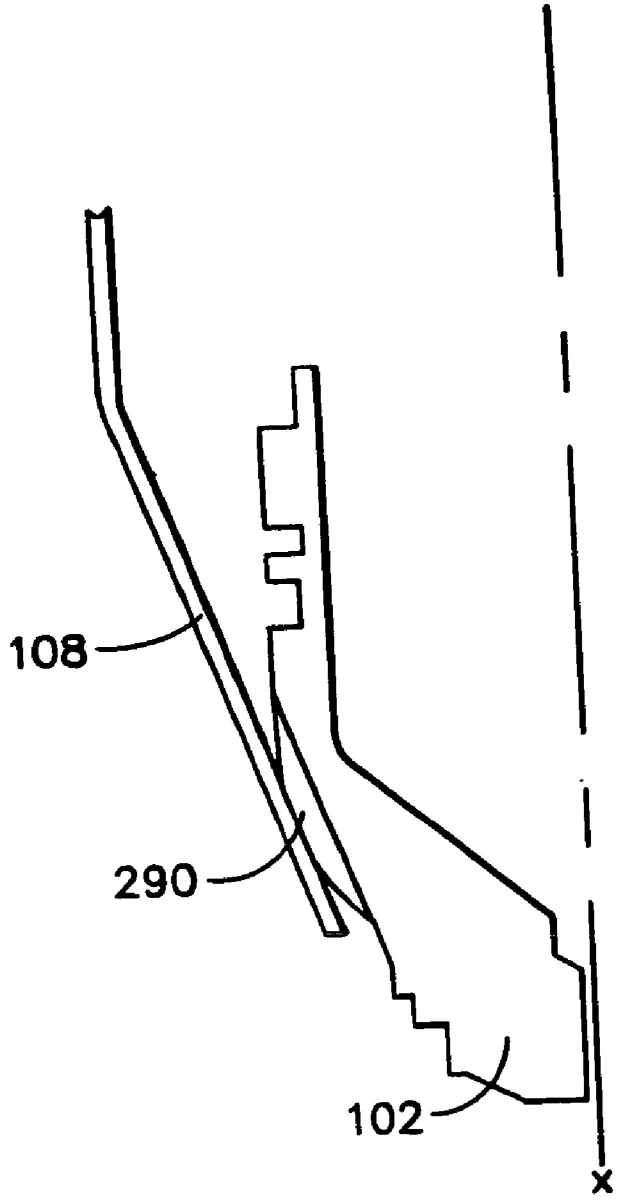
FIG. 23 is a cross-sectional view of the tip disposed adjacent a distal anode member in accordance with the principles of the present invention.

Yet another embodiment of a plasma arc torch 10 that provides cooling proximate the electrical contact is illustrated in FIG. 18. As shown, the electrode 100*k* is secured to the cathode 22*k* through an electrode holder 273. Generally, the electrode holder 273 is conductive and defines the fluid passageways and is in electrical contact with the cathode 22*k*, while the electrode 100*k* is secured to the electrode holder 273 using methods commonly known in the art such as a threaded connection. The electrode holder 273 is shown defining ribs 275 and flutes 277 as previously described, however, any of the fluid passageways as shown and described herein may be incorporated with the electrode holder 273 while remaining within the scope of the present invention. Therefore, cooling is provided proximate the electrical contact between the cathode 22*k* and the electrode holder 273 rather than directly between the cathode 22*k* and the electrode 100*k*.

Figure 52:
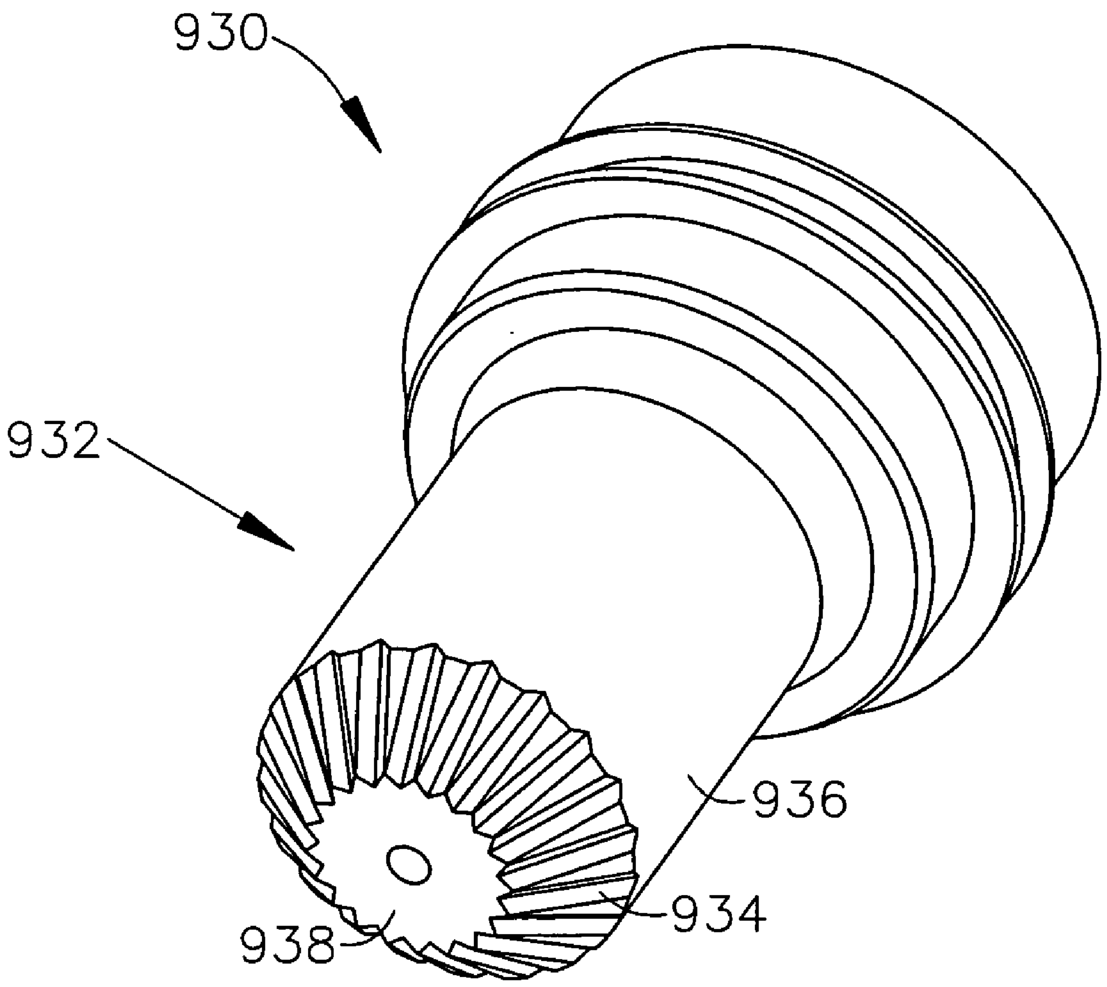
FIG. 52 is a perspective view of another electrode embodiment comprising a textured distal surface and constructed in accordance with the principles of the present invention.

Referring to FIG. 52, another embodiment of an electrode is illustrated and indicated by reference numeral 930. As shown, the electrode 930 comprises a distal end portion 932 that defines a textured outer surface 934 extending between a cylindrical outer wall 936 and a distal face 938. Preferably, the textured outer surface 934 is knurled in one form of the present invention as shown, however, other forms of a textured surface may also be employed such as those disclosed in co-pending application Ser. No. 09/821,868, titled "Plasma Arc Torch and Method for Improved Life of Plasma Arc Torch Consumable Parts," which is commonly assigned with the present application and the contents of which are incorporated by reference herein in their entirety. The textured outer surface 934 generally improves the reliability of the pilot arc by lowering the voltage required to generate a pilot arc and reducing the variation in this amount of voltage throughout multiple start sequences. As a result, the life of the electrode 930 is substantially increased with the use of the textured outer surface 934. Moreover, the electrode 930 is employed with any one of the embodiments shown and described herein that provides cooling proximate the electrical contact.

Figure 53:
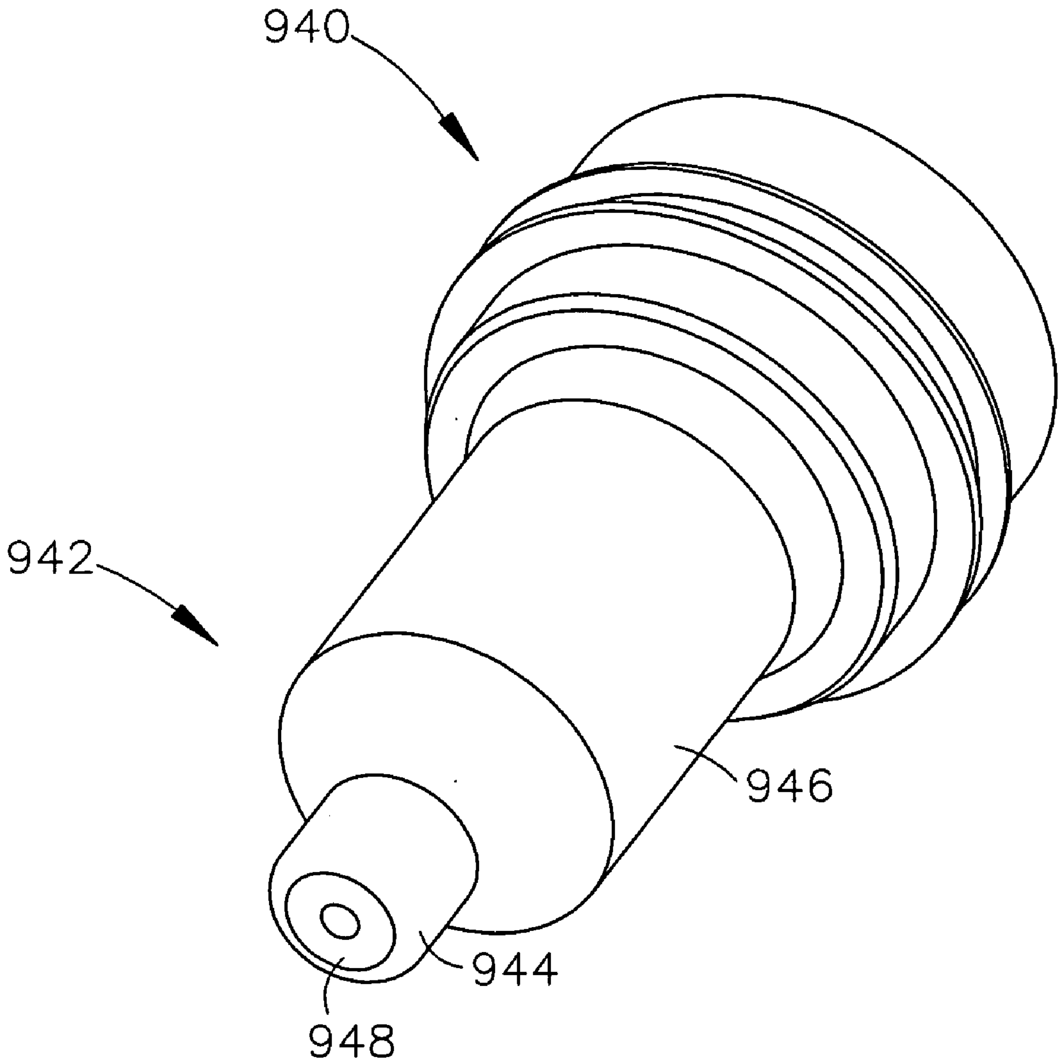
FIG. 53 is a perspective view of another electrode embodiment comprising a reduced diameter distal end portion and constructed in accordance with the principles of the present invention.
Figure 54:
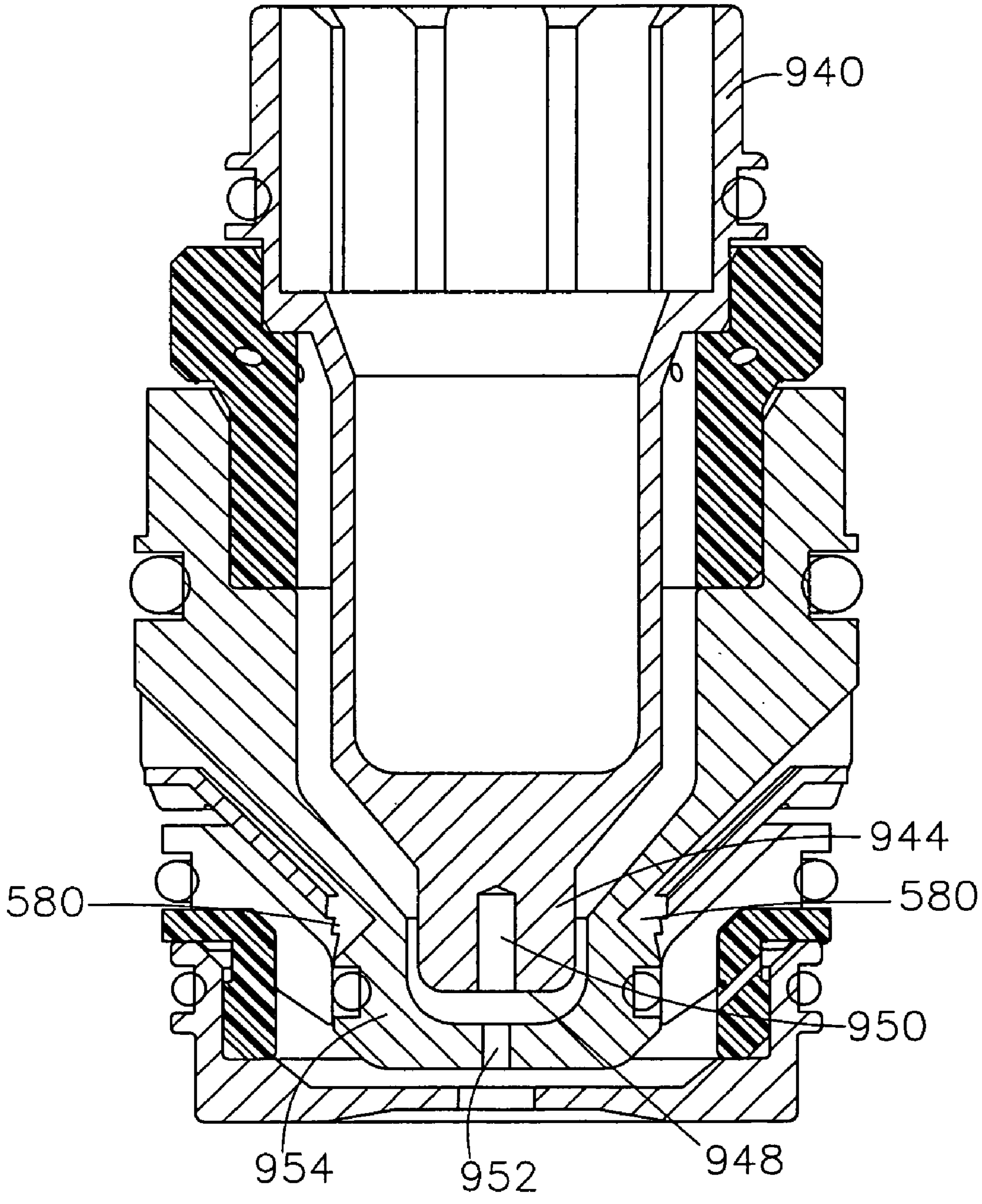
FIG. 54 is a cross-sectional view illustrating the electrode embodiment of FIG. 53 within a plasma chamber in accordance with the teachings of the present invention.

Yet another electrode embodiment is illustrated in FIGS. 53 and 54, wherein an electrode 940 comprises a distal end portion 942 that defines a distal extension 944 extending between a cylindrical outer wall 946 and a distal face 948. As shown in FIG. 54, the distal extension 944 positions the distal face 948 and the emissive insert 950 closer to the exit orifice 952 of the tip 954. In certain applications, it is desirous to position the distal face 948 and the emissive insert 950 closer to the exit orifice 952 of the tip 954 such that the electrode to tip spacing is reduced. Accordingly, the distal extension 944 provides such reduced spacing, which results in improved performance of the plasma arc torch. Additionally, the electrode 940 is employed with any one of the electrode embodiments shown and described herein that provides cooling proximate the electrical contact.

Tip Embodiments

The tip 102 may also comprise a variety of configurations for proper fluid flow, electrical contact, and attachment as shown in FIGS. 19 through 24*f*. Similar to the electrode 100 and the cathode 22 as previously described, cooling of the tip 102 is provided proximate the electrical contact between the tip 102 and the distal anode member 108, or an adjacent anodic element. Therefore, the terms adjacent perimeter surface, proximate, and adjacent vicinity as used in relation to the electrical contact and cooling of the tip 102 to distal anode member 108 interface shall be construed similarly as the terms used above in connection with the electrode 100 and cathode 22.

As shown in FIGS. 19–23, one form of the tip 102*a* comprises a proximal annular recess 280 having swirl holes 282 offset from a center of the tip 102*a* and formed through the proximal annular recess 280. Accordingly, the plasma gas flows through the annular recess 280 and the swirl holes 282 to enter the plasma chamber 172 as previously described. Additionally, the tip 102*a* comprises a distal annular recess 284 that houses an o-ring (not shown), which seals an interface between the tip 102*a* and the cartridge body 106 (not shown).

As shown, the tip 102*a* further comprises a plurality of flutes 288 and raised ridges 290 disposed between the flutes 288 that provide for cooling fluid passage and electrical contact with the distal anode member 108, respectively. The cooling fluid that flows distally along the tip 102*a* flows through the flutes 288, which produce a relatively high velocity flow proximate the interface between the tip 102*a* and the distal anode member 108 for improved cooling. Additionally, the raised ridges 290 contact the distal anode member 108 to provide electrical continuity through the anodic members (i.e., tip 102*a*, distal anode member 108, central anode member 109) of the plasma arc torch. Accordingly, the tip 102*a* and the distal anode member 108 define adjacent perimeter surfaces as previously described, wherein both cooling and electrical contact are provided.

Referring to FIGS. 24*a*–24*d*, additional embodiments of the tip 102 and the distal anode member 108 are illustrated, wherein cooling is provided proximate or through an adjacent vicinity of the electrical contact between the tip 102 and the distal anode member 108 and the cooling fluid flows through at least one fluid passageway formed through the tip 102 and/or the distal anode member 108. In each of the following embodiments, the fluid passageway may be formed in either the tip 102 and/or the distal anode member 108. Accordingly, illustration and discussion of fluid passageways through the tip 102 shall also be construed to mean fluid passageways through the distal anode member 108 in alternate forms of the present invention and vice versa.

Figure 24A:
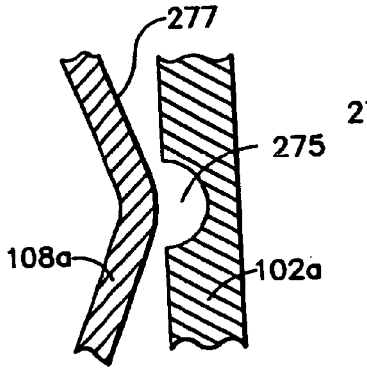
FIG. 24*a* is a cross-sectional view of a fluid passageway formed in a tip adjacent electrical contact with the distal anode member in accordance with the principles of the present invention.
Figure 24B:
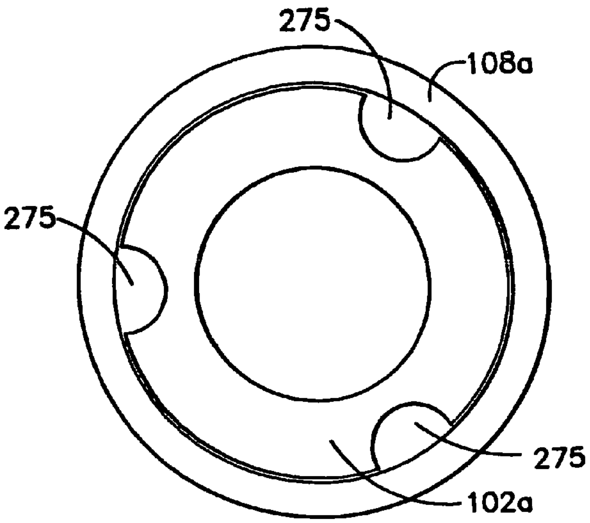
FIG. 24*b* is a cross-sectional view, taken along line E—E of FIG. 24*a*, of the tip and distal anode member in accordance with the principles of the present invention.

FIGS. 24*a* and 24*b* illustrate a tip 102*a* defining at least one spot recess 275 and a distal anode member 108*a* defining an extended inner wall 277. Accordingly, the cooling fluid flows distally through the spot recesses 275 since the spot recesses 275 are not continuous around the perimeter of the tip 102*b*. Additionally, the extended inner wall 277 of the distal anode member 108*b* contacts the tip 102*a* as shown for the electrical contact. Therefore, the tip 102*a* and distal anode member 108*a* define adjacent perimeter surfaces that provide both cooling and electrical contact as previously described.

Figure 24C:
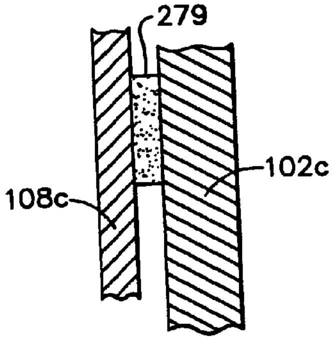
FIG. 24*c* is a cross-sectional view of a fluid passageway formed by a third member disposed between a tip and a distal anode member in accordance with the principles of the present invention.

FIG. 24*c* illustrates an embodiment of a plasma arc torch 10 wherein a third element 279 is disposed between the tip 102*c* and the distal anode member 108*c* to provide both electrical contact and a fluid passageway. The third element 279 is in electrical contact with both the tip 102*c* and the distal anode member 108*c*. Accordingly, the third element 279 is conductive and allows the cooling fluid to flow proximally therethrough. For example, the third element 279 may comprise a canted coil spring or a porous, conductive material.

Figure 24D:
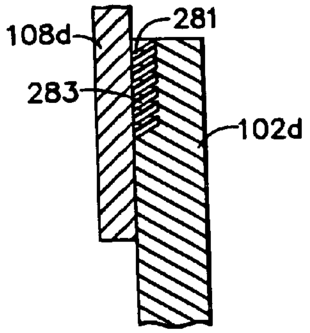
FIG. 24*d* is a cross-sectional view of a fluid passageway formed between by a helical flute between a tip and a distal anode member in accordance with the principles of the present invention.

Referring now to FIG. 24*d*, a tip 102*c* defines a helical flute 281 for passage of the cooling fluid. The helical flute 281 is formed around and along the exterior surface of the tip 102*c*, which results in a plurality of ribs 283 being formed around the tip 102*c* to provide the electrical contact. Similarly, the helical flute 281 may be formed in the distal anode member 108*c* rather than the tip 102*c* as illustrated herein. Accordingly, the fluid passageways comprise the helical flute 281 and the adjacent perimeter surfaces of the tip 102*c* and the distal anode member 108*c* provide cooling proximate the electrical contact as previously described.

Additionally, a tip holder may also be employed as previously described with the electrode holder while remaining within the scope of the present invention, wherein the tip holder includes passageways for the passage of cooling fluid proximate the electrical contact with the distal anode member 108. Accordingly, the tip holder is an adjacent anodic element that is in electrical contact with the distal anode member 108.

Secondary Cap and Spacer

Figure 25A:
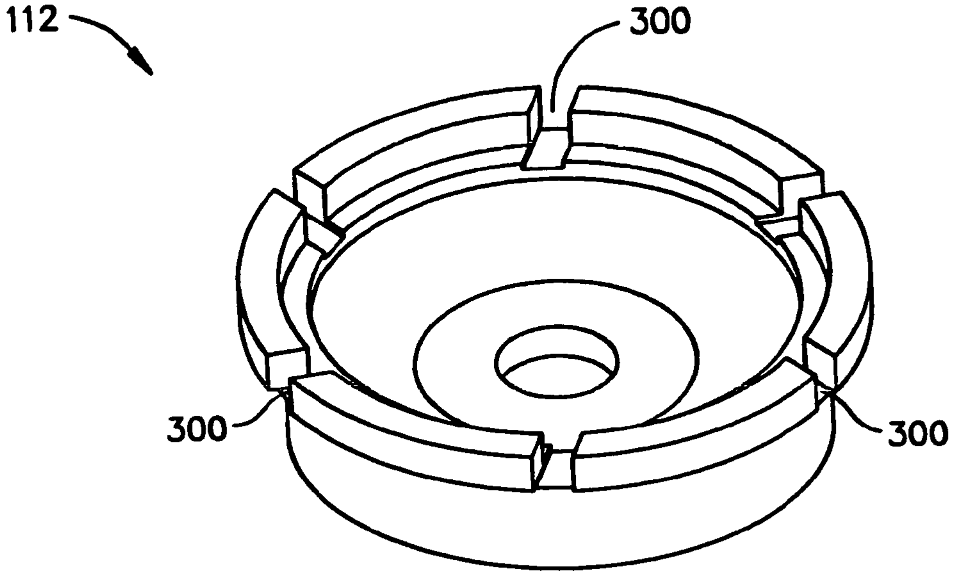
FIG. 25*a* is a perspective view of a secondary cap constructed in accordance with the principles of the present invention.
Figure 25B:
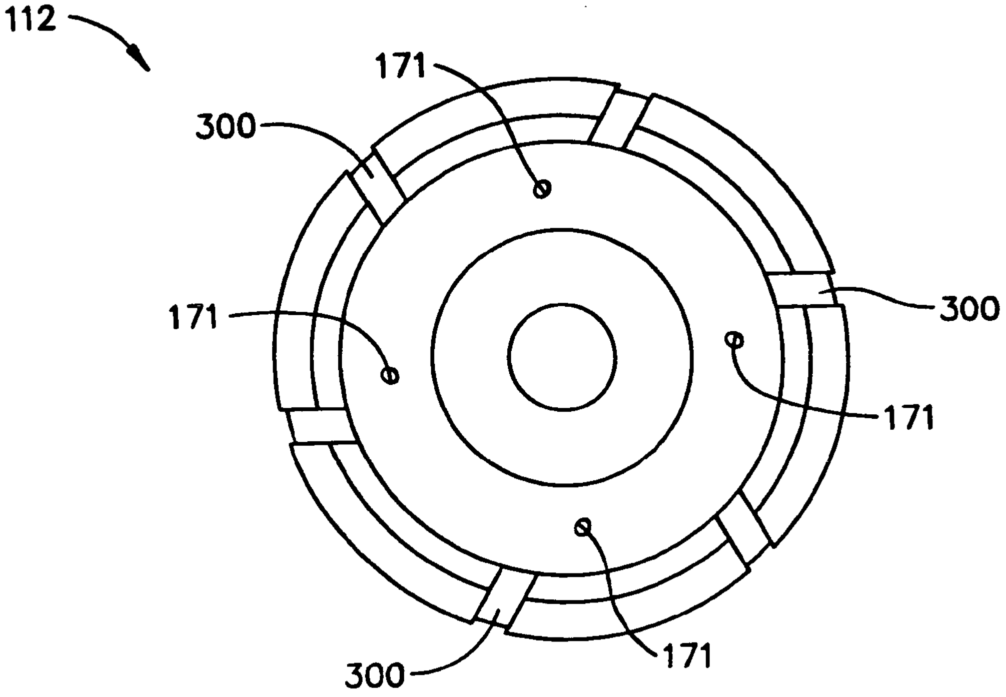
FIG. 25*b* is a top view of a secondary cap constructed in accordance with the principles of the present invention.

Referring now to FIGS. 25*a* and 25*b*, flow of the secondary gas through the secondary cap 112 in one form of the present invention is swirled through the use of swirl passageways 300 formed in the secondary cap 112. Preferably, the swirl passageways 300 are offset from a center of the secondary cap 112 as shown in FIG. 13*b* and form a passage for secondary gas flow between the secondary cap 112 and the shield cap 114 (not shown). Alternately, the swirl passageways 300 may be formed directly through the secondary cap 112 as best shown in FIG. 25*b* and are similarly offset from a center of the secondary cap 112. Additionally, the secondary bleed passageways 171 are illustrated as axial holes in the embodiment as shown.

Figure 26A:
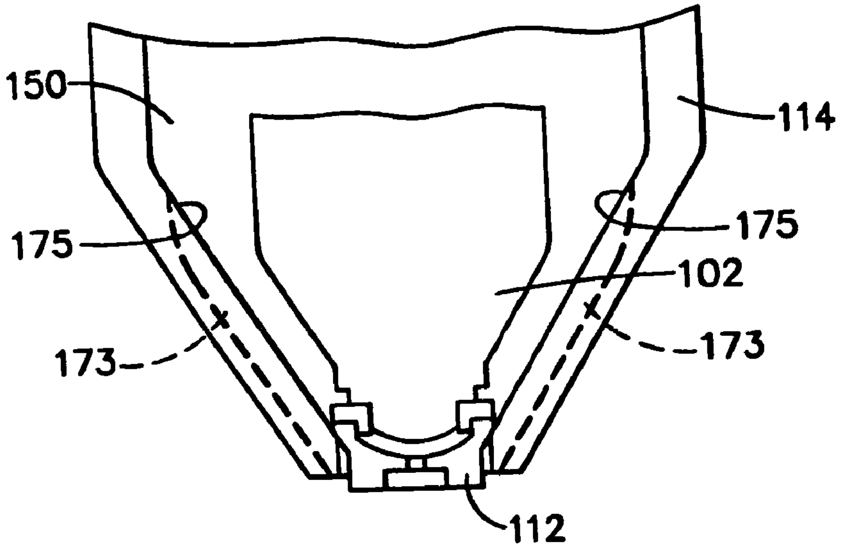
FIG. 26*a* is a longitudinal side cross-sectional view of secondary gas bleed passageways constructed in accordance with the principles of the present invention.
Figure 26B:
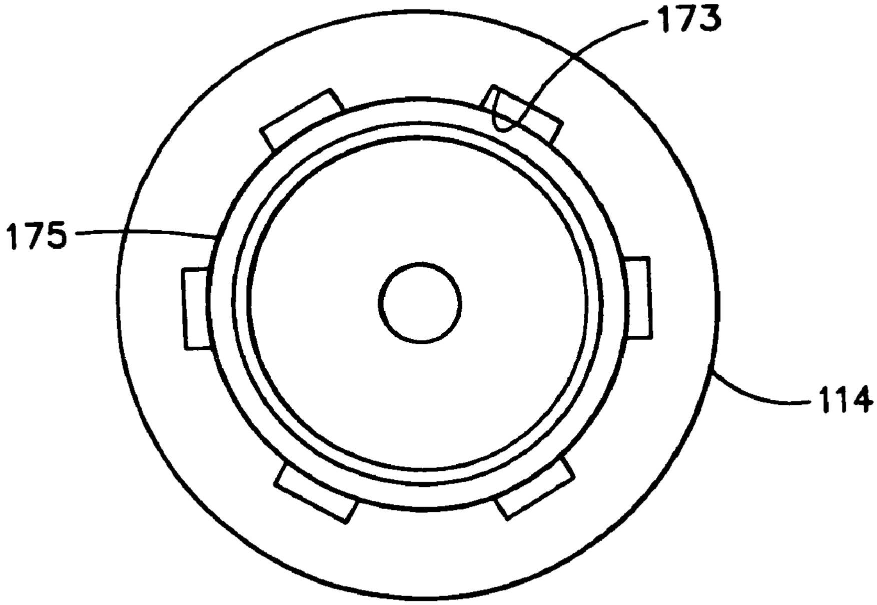
FIG. 26*b* is a top view of a shield cap comprising secondary gas bleed passageways and constructed in accordance with the principles of the present invention.
Figure 26C:
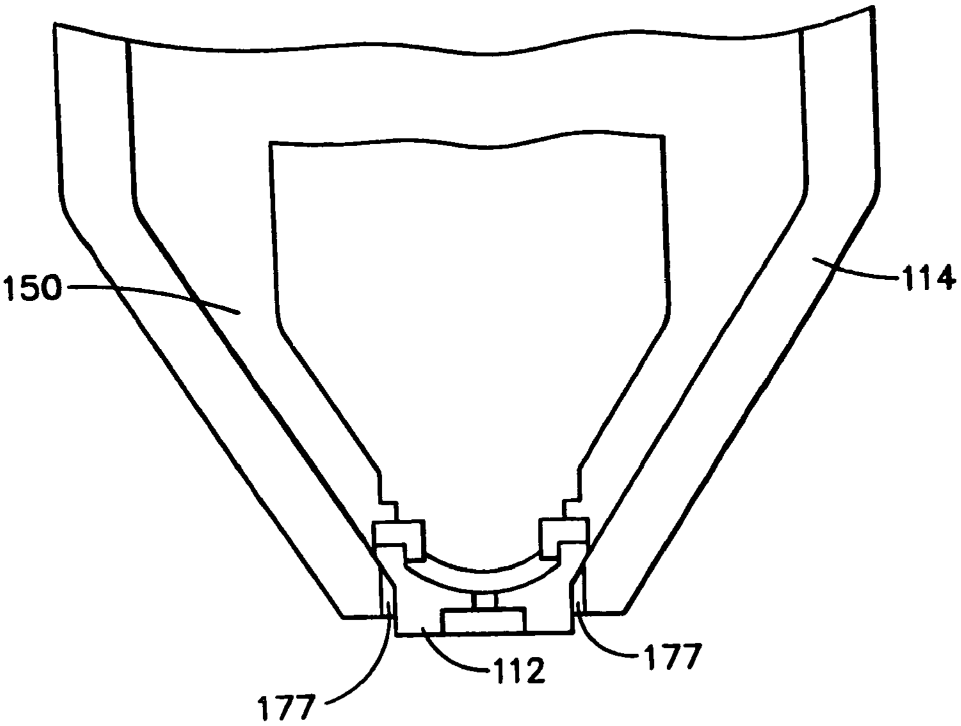
FIG. 26*c* is a longitudinal side cross-sectional view of an alternate torch embodiment for bleeding secondary gas and constructed in accordance with the principles of the present invention.

Alternately, bleed passageways may be formed in the shield cap 114 or between the shield cap 114 and the secondary cap 112 as shown in FIGS. 26*a* through 26*c*. As shown in FIGS. 26*a* and 26*b*, secondary gas bleed passageways 173 are preferably formed along a sidewall 175 of the shield cap 114 and guide a portion of the secondary gas from the distal secondary gas passage 209 along the outside of the secondary cap 112. Accordingly, the secondary gas bleed passageways 173 provide additional cooling during operation of the plasma arc torch 10. Alternately, a secondary gas bleed passage 177 may be provided between the shield cap 114 and the secondary cap 112 as shown in FIG. 26*c*. Similarly, the secondary gas bleed passage 177 guides a portion of the secondary gas from the distal secondary gas passage 209 along the outside of the secondary cap 112 to provide additional cooling.

Figure 27A:
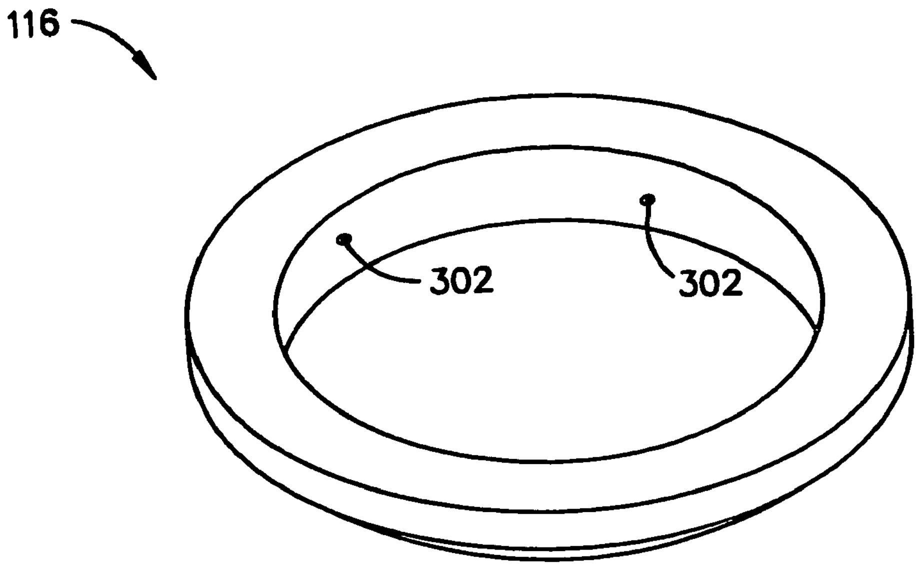
FIG. 27*a* is a perspective view of a secondary cap spacer constructed in accordance with the principles of the present invention.
Figure 27B:
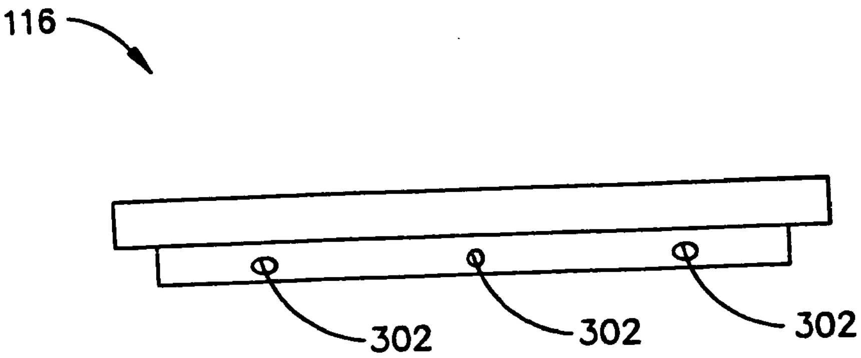
FIG. 27*b* is a side view of the secondary spacer constructed in accordance with the principles of the present invention.

Referring now to FIGS. 27*a* and 27*b*, the swirl passageways 302 may alternately be formed through the secondary spacer 116 as shown rather than through the secondary cap 112. The swirl passageways 302 are formed through a sidewall 303 of the secondary spacer 116 as shown. Further, the swirl passageways are preferably offset from a center of the secondary spacer 116 as previously described, although other configurations such as passageways formed normal through the secondary spacer 116 may be employed to swirl the secondary gas.

Consumables Cartridge

Figure 28B:
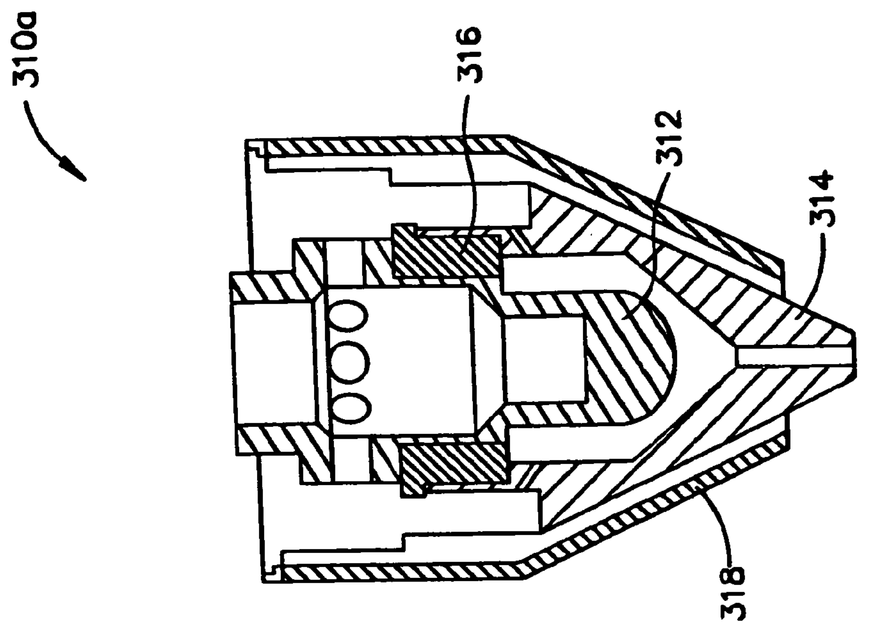
FIG. 28*b* is a longitudinal cross-sectional view of the consumables cartridge, taken along line E—E of FIG. 28*a*, in accordance with the principles of the present invention.
Figure 28A:
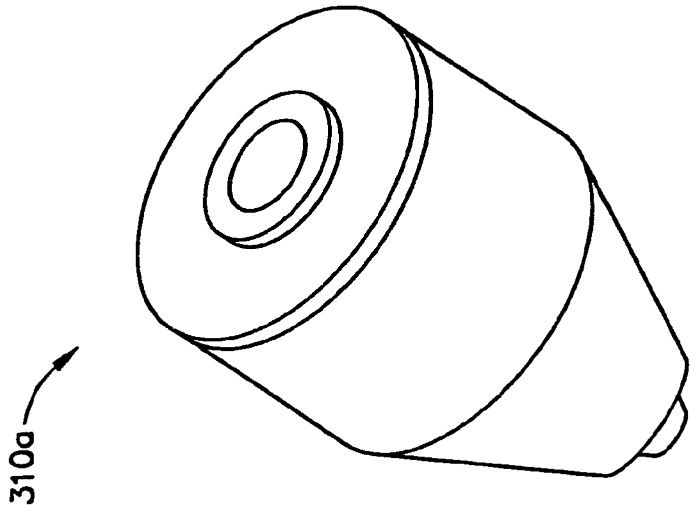
FIG. 28*a* is a perspective view of a consumables cartridge constructed in accordance with the principles of the present invention.

In yet another form of the present invention, a consumables cartridge 310*a* is provided for efficiency and ease of replacement during operation as shown in FIGS. 28*a* and 28*b*. In one form, the consumables cartridge 310*a* comprises an electrode 312, a tip 314, a spacer 316 disposed between the electrode 312 and the tip 314, a cartridge body 316, and an anode member 318, which are assembled and provided as a single unit.

Figure 29:
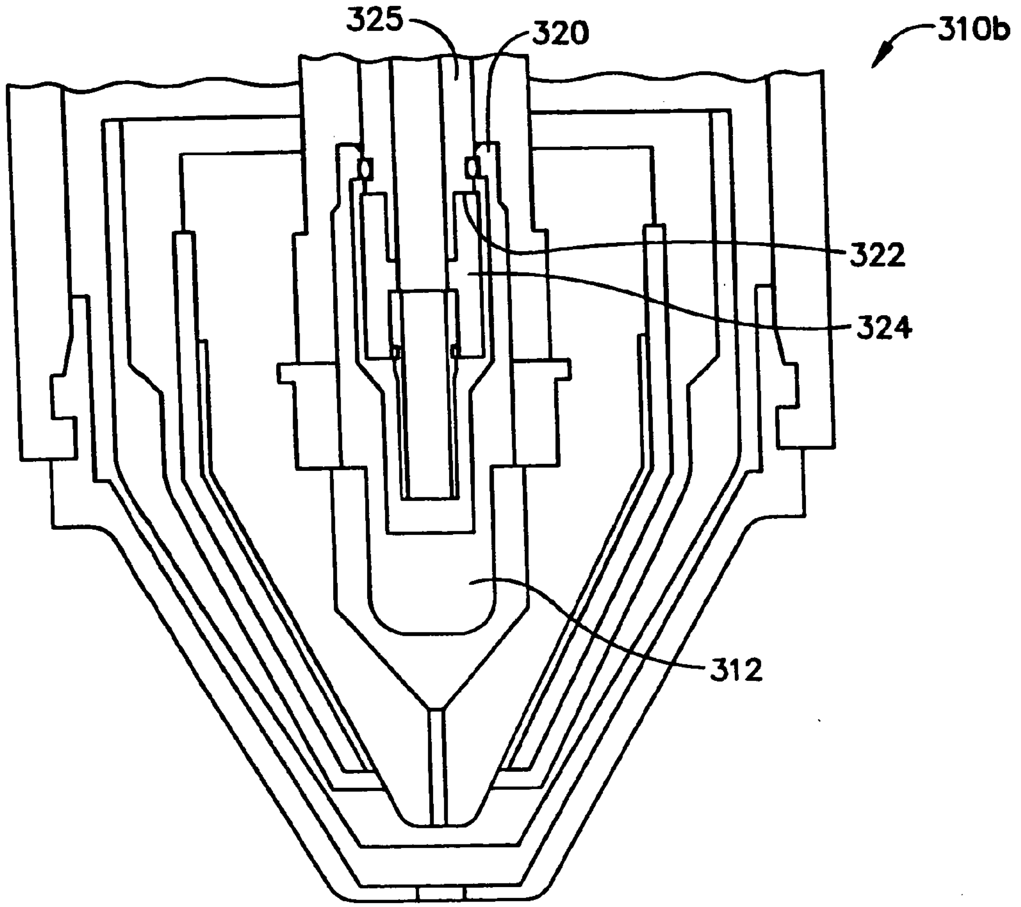
FIG. 29 is a longitudinal cross-sectional view of a second embodiment of a consumables cartridge constructed in accordance with the principles of the present invention.
Figure 31:
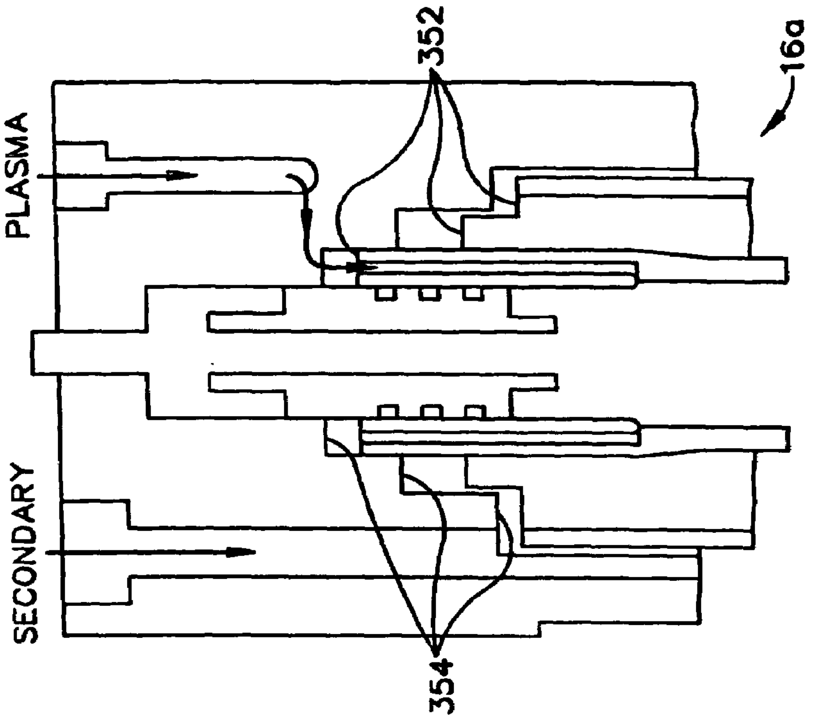
FIG. 31 is a longitudinal cross-sectional view of a stepped cartridge attachment illustrating gas passageways and constructed in accordance with the principles of the present invention.

Referring to FIG. 29, a second embodiment of the consumables cartridge 310*b* is preferably secured to the plasma arc torch 10 using detents 320 formed in the electrode 312 as previously described, which engage a shoulder 322 formed in an insulating cap 324. The insulating cap 324 is secured to the distal end portion of a cathode 325, and the detents 320 of the electrode 312 contact the cathode 325 as shown to form a portion of the cathodic, or negative side of the power supply. Accordingly, the consumables cartridge

310*b* is easily installed and removed from the plasma arc torch 10. Alternately, the consumables cartridge 310*b* may be secured to the torch 10 using a canted coil spring (not shown) as previously described in relation to other connections such as between the central anode member 109 (not shown) and the anode body 20 (not shown).

Torch Head Connections

Figure 30:
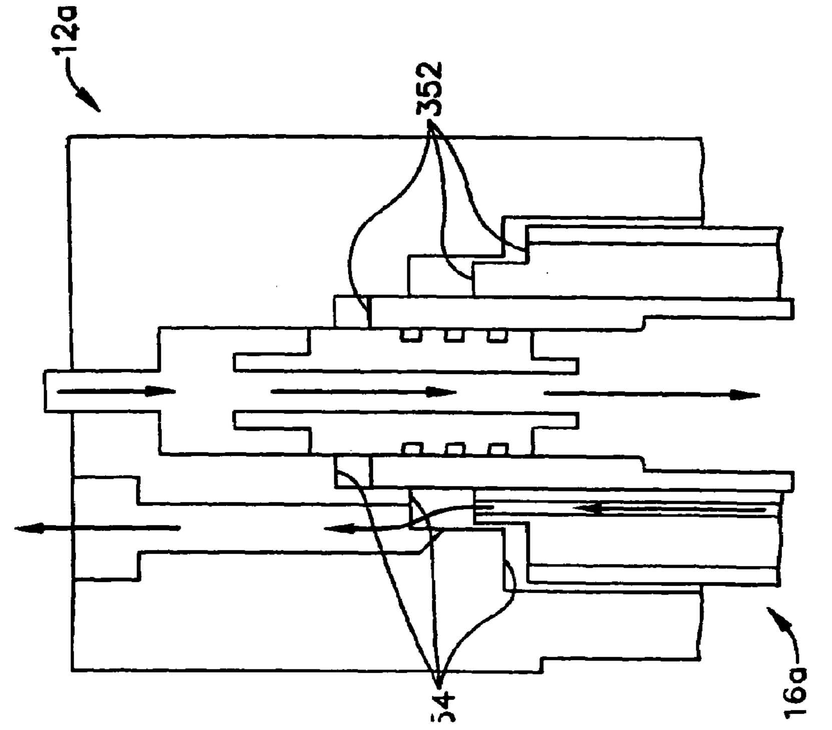
FIG. 30 is a longitudinal cross-sectional view of a stepped cartridge attachment illustrating cooling fluid passageways and constructed in accordance with the principles of the present invention.
Figure 32A:
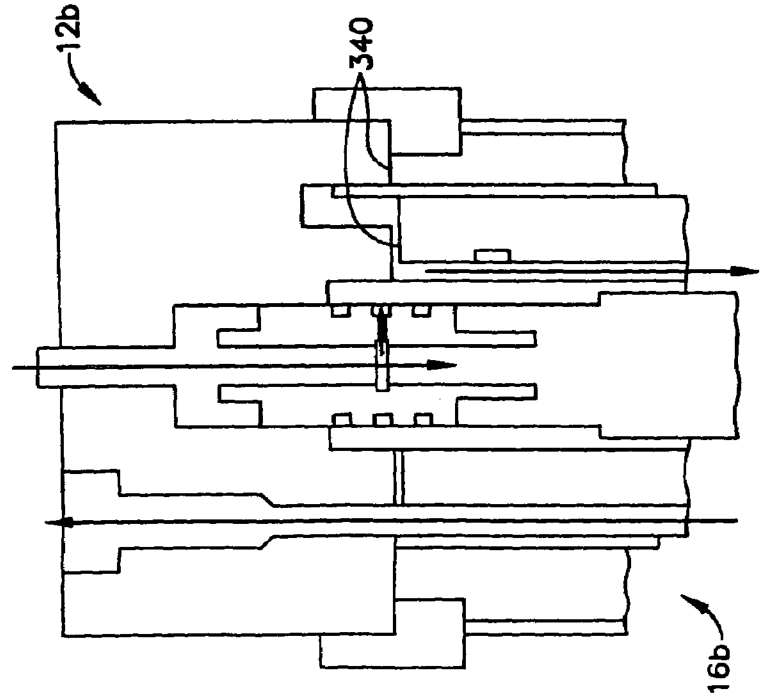
FIG. 32*a* is a longitudinal cross-sectional view of a face seal cartridge attachment illustrating cooling fluid passageways and constructed in accordance with the principles of the present invention.
Figure 32B:
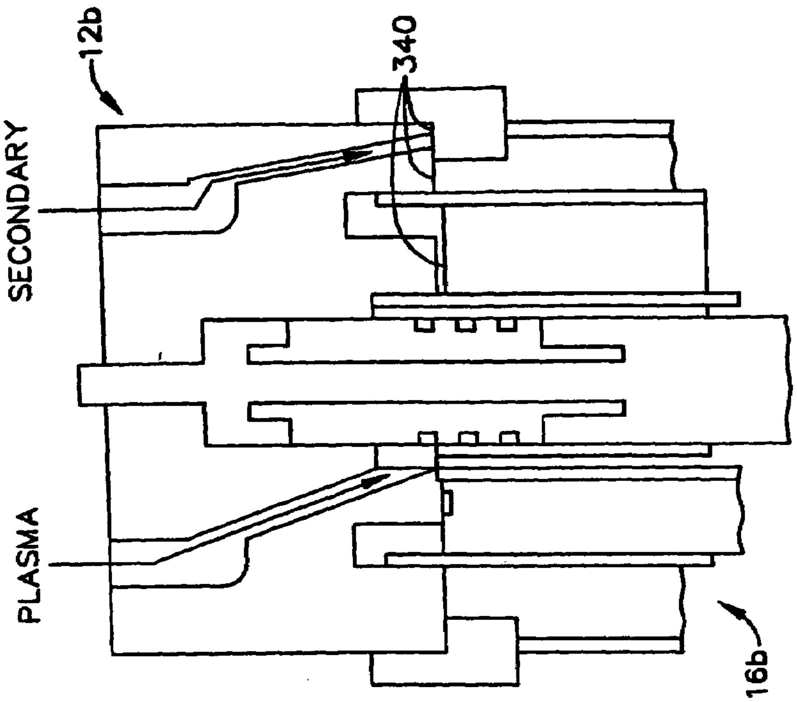
FIG. 32*b* is a longitudinal cross-sectional view of a face seal cartridge attachment illustrating gas passageways and constructed in accordance with the principles of the present invention.
Figure 33B:
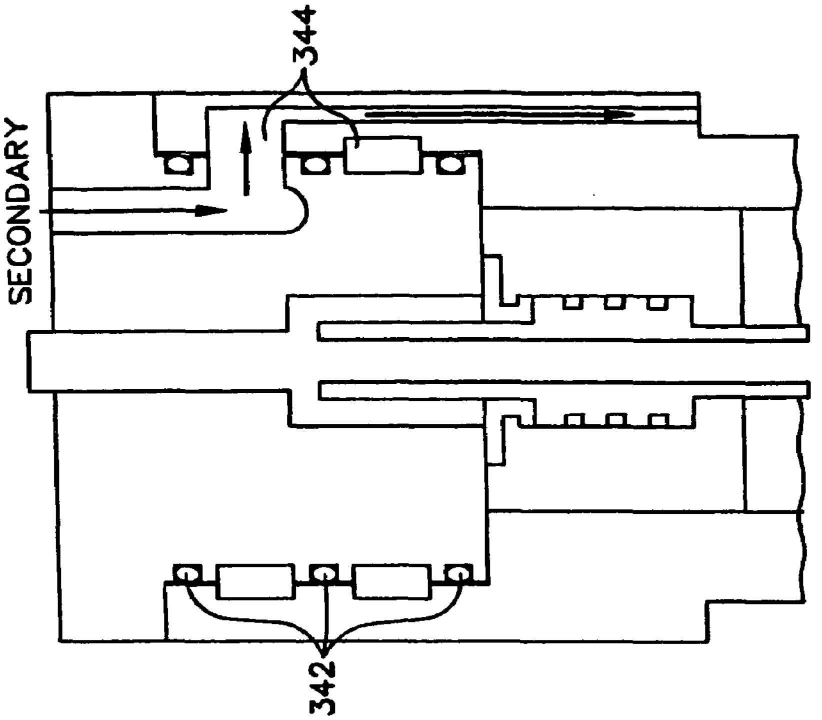
FIG. 33*b* is a longitudinal cross-sectional view of a straight cartridge attachment illustrating gas passageways and constructed in accordance with the principles of the present invention.
Figure 33A:
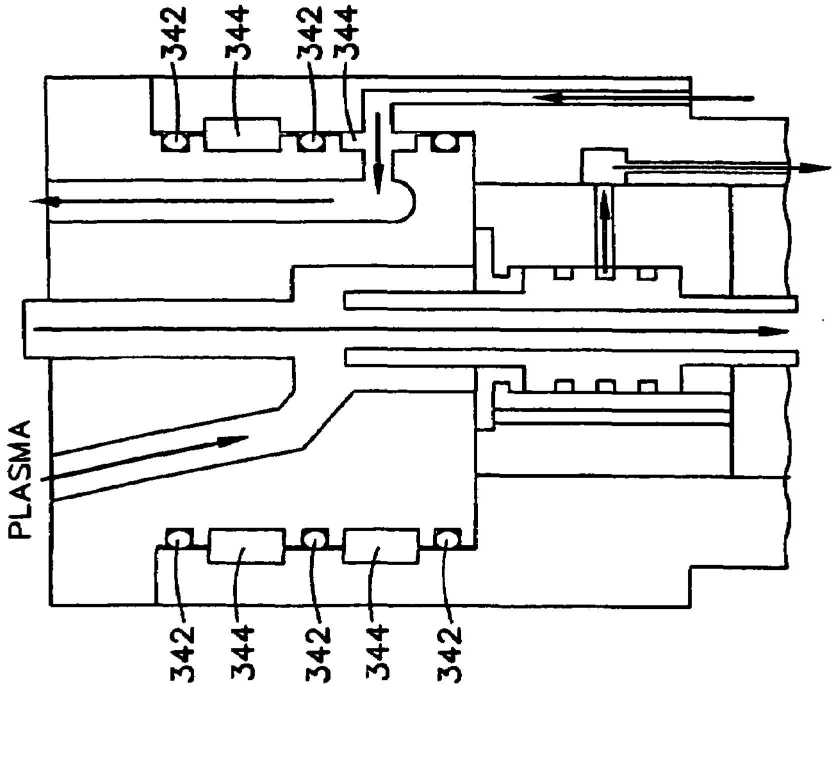
FIG. 33*a* is a longitudinal cross-sectional view of a straight cartridge attachment illustrating cooling fluid passageways and constructed in accordance with the principles of the present invention.

With reference to FIGS. 30 through 33*b*, the consumables cartridge 16 is secured to an adjacent torch head 12 using either a stepped cartridge design (FIGS. 30, 31), a face seal design (FIGS. 32*a,b*), or a straight cartridge design (FIGS. 33*a,b*). As shown in FIGS. 30 (showing cooling fluid passageways) and 31 (showing gas passageways), a consumable cartridge 16*a* defines a plurality of steps 352 that face proximally to mate with a corresponding set of steps 354 that face distally on the torch head 12*a*. Additionally, four (4) o-rings (not shown) seal the interface between the consumables cartridge 16*a* and the torch head 12. As a result, no rotational alignment is required between the consumables cartridge 16*a* and the torch head 12*a*, while ease of separation is provided with minimum o-ring engagement.

Referring to FIGS. 32*a* (showing cooling fluid passageways) and 32*b* (showing gas passageways), a face seal design is alternately employed between a consumables cartridge 16*b* and the torch head 12*b*, wherein o-rings 340 are disposed between proximal faces of the consumables cartridge 16*b* and distal faces of the torch head 12*b* as shown. Accordingly, a relatively compact torch head 12*b* may be provided. In yet another form as shown in FIGS. 33*a* (showing cooling fluid passageways) and 33*b* (showing gas passageways), a straight cartridge design is provided wherein a series of o-rings 342 are disposed annularly between the torch head 12*c* and the consumables cartridge 16*c*, wherein fluid passageways 344 are disposed between the o-rings 342 as shown.

Figure 34A:
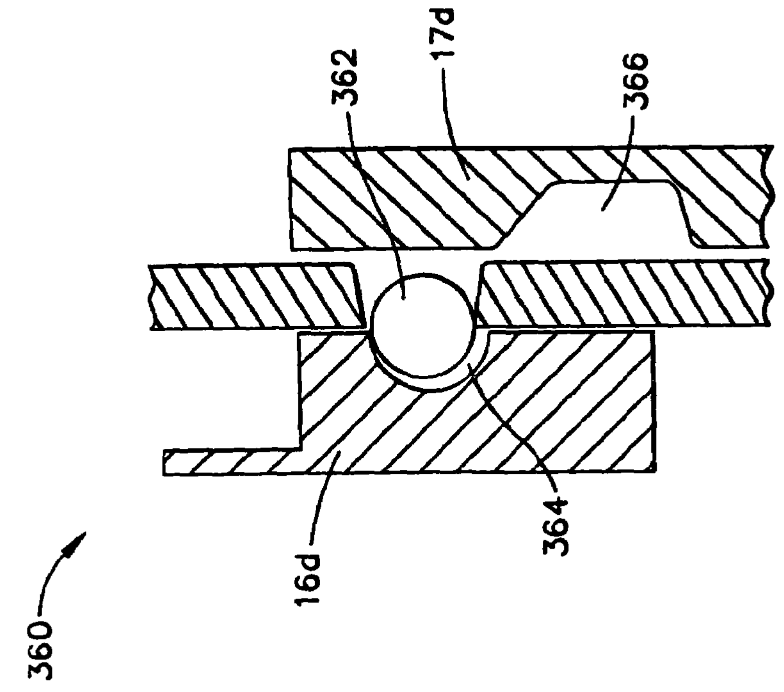
FIG. 34*a* is an enlarged longitudinal cross-sectional view of a ball-lock mechanism connected and constructed in accordance with the principles of the present invention.
Figure 34B:
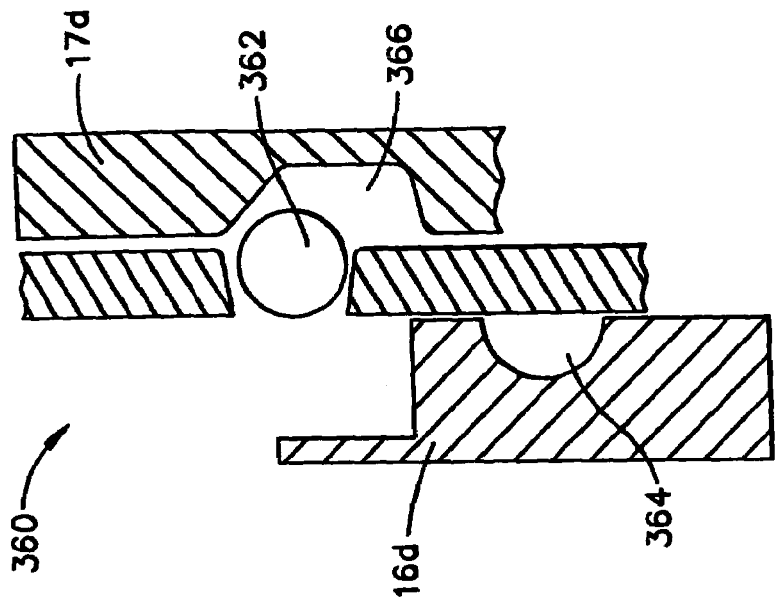
FIG. 34*b* is an enlarged longitudinal cross-sectional view of a ball-lock mechanism disconnected and constructed in accordance with the principles of the present invention.

In another form, consumable components are secured to a torch head using a ball lock mechanism 360 disposed within a locking ring 17*d*, which is shown in greater detail in FIGS. 34*a* (connected) and 34*b* (disconnected). The ball lock mechanism 360 comprises a ball 362 disposed within a recess 364 when the consumable components 16*d* are connected. To disconnect the consumable components 16*d*, the locking ring 17*d* is moved proximally and the consumable components 16*d* are moved distally relative to the torch head such that the ball 362 moves radially outward into a locking ring recess 366. Accordingly, the consumable components 16*d* may be removed from the torch head by employing the ball lock mechanism 160 into a locking ring 17*d*.

Figure 35B:
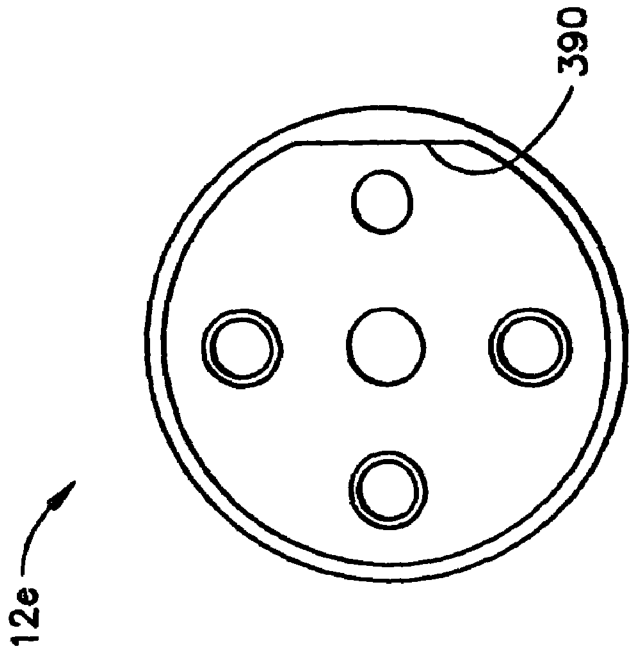
FIG. 35*b* is a top view of a torch head having alignment geometry and constructed in accordance with the principles of the present invention.
Figure 35A:
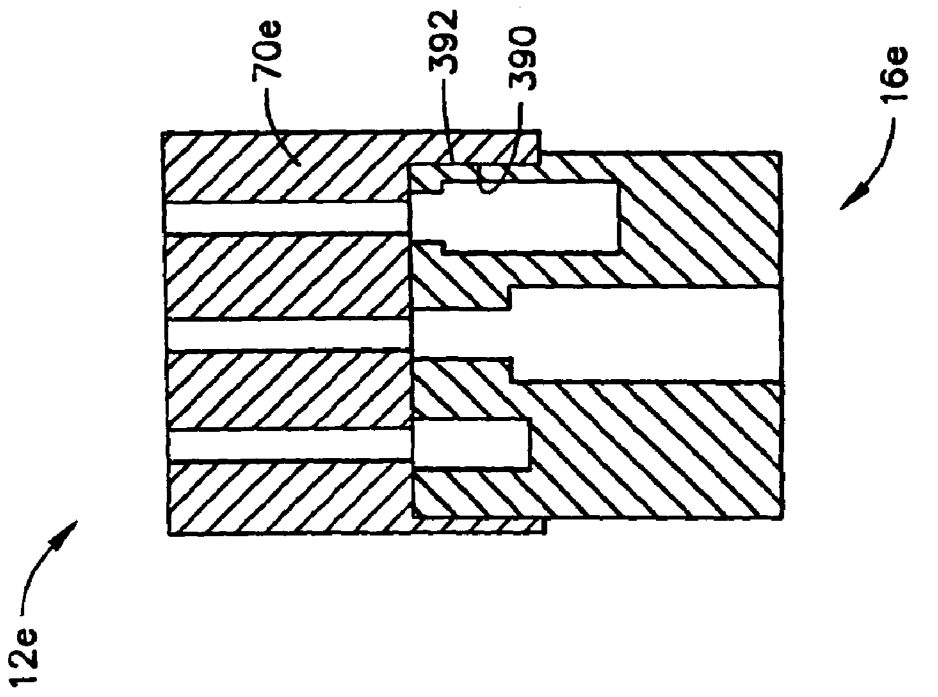
FIG. 35*a* is a longitudinal cross-sectional view of a torch head having alignment geometry and constructed in accordance with the principles of the present invention.

As shown in FIGS. 35*a* and 35*b*, the torch head 12*e* in another form defines an alignment wall 390 to properly align the consumable components 16*e* with the supply of cooling fluid, plasma gas, and secondary gas. The torch cap 70*e* also defines a corresponding alignment wall 392 that interfaces with the torch head alignment wall 390 to properly position the torch head 12*e* and consumable components 16*e* for operation.

The gases used for plasma and secondary vary according to the workpiece properties such as material type and thickness, and may include, by way of example $N_2$ as the plasma gas and $H_2O$ as the secondary gas. Alternately, a mixture of Ar, $H_2$, and $N_2$ may be used for the plasma gas with $N_2$ as the secondary gas. Additionally, the cooling fluid is preferably an $H_2O$-ethylene glycol mixture or an $H_2O$-propylene glycol mixture.

Alternate Plasma Arc Torch Embodiment

Figure 36:
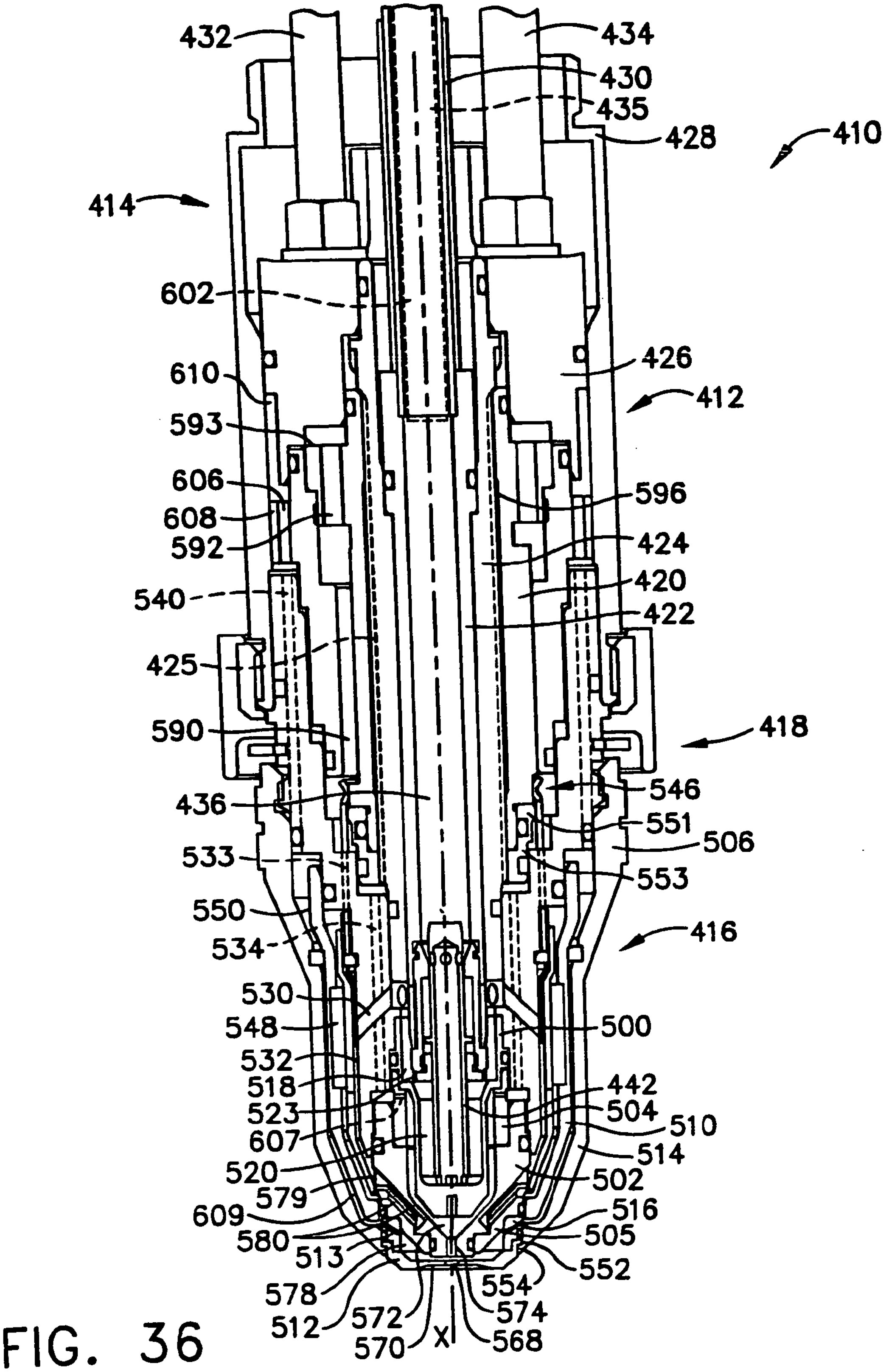
FIG. 36 is a longitudinal cross-sectional view of a second plasma arc torch embodiment constructed in accordance with the teachings of the present invention.
Figure 37:
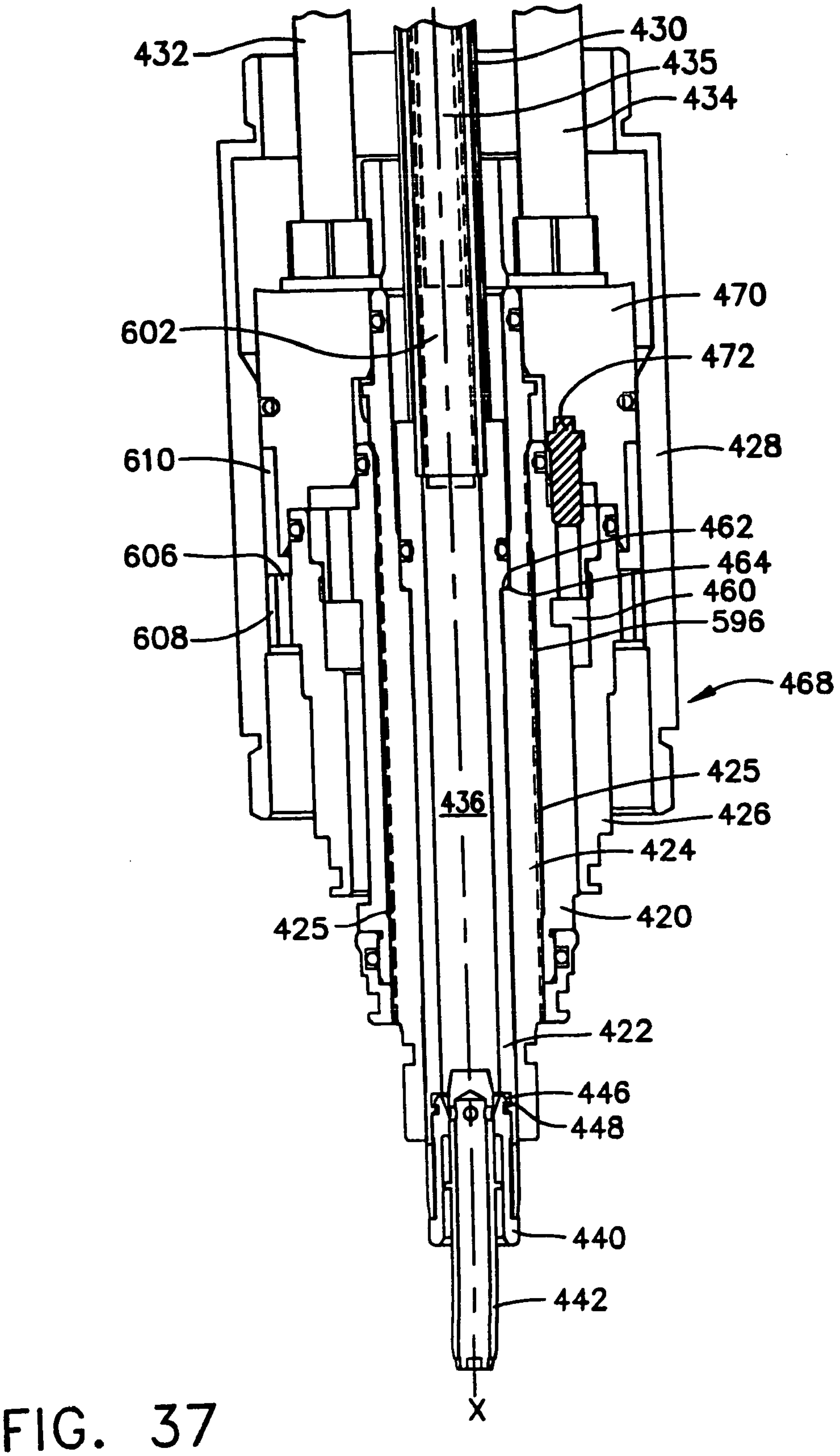
FIG. 37 is a longitudinal cross-sectional view of a torch head of the second plasma arc torch embodiment in accordance with the principles of the present invention.
Figure 38:
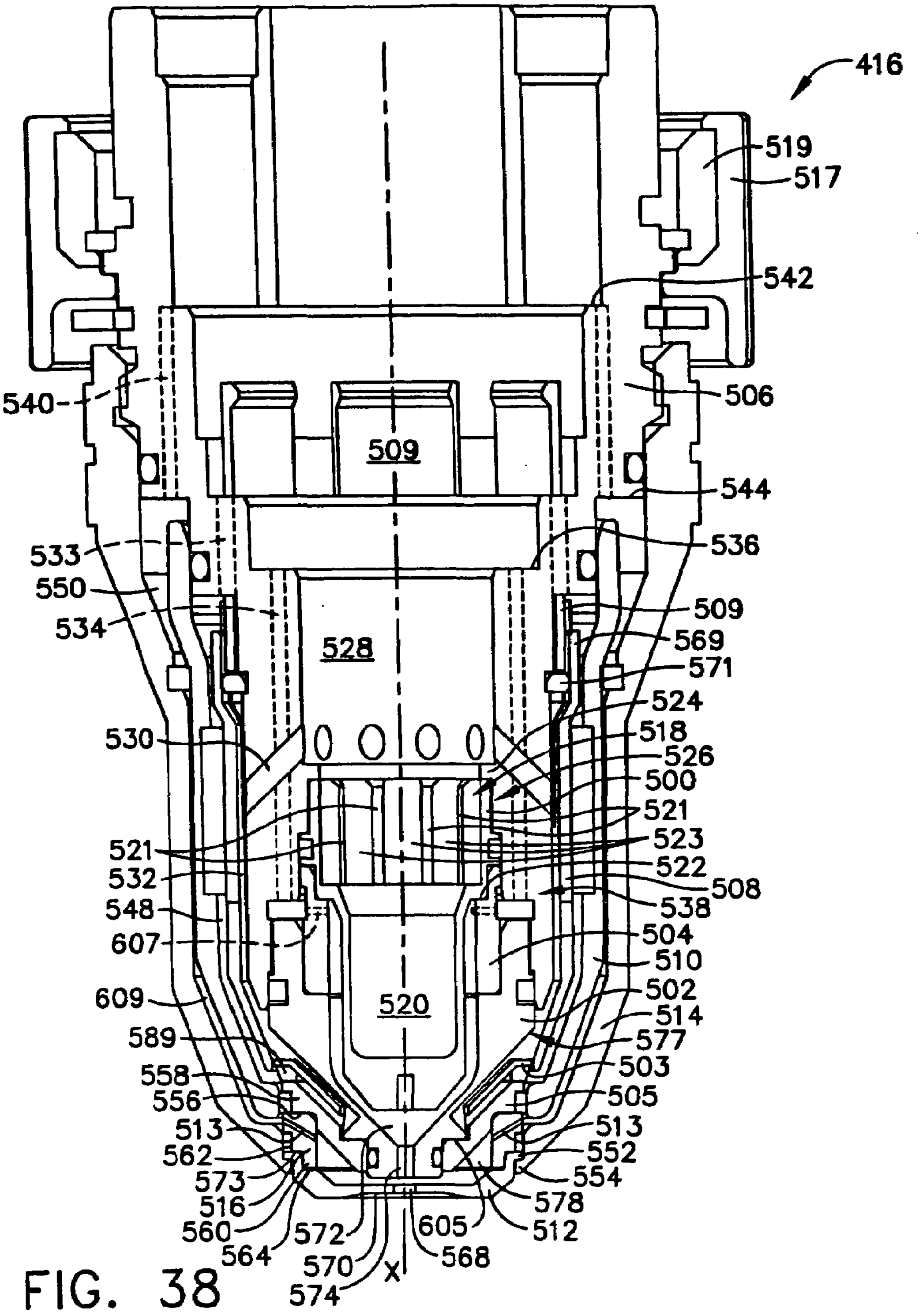
FIG. 38 is a longitudinal cross-sectional view of consumable components of the second plasma arc torch embodiment in accordance with the principles of the present invention.
Figure 39A:
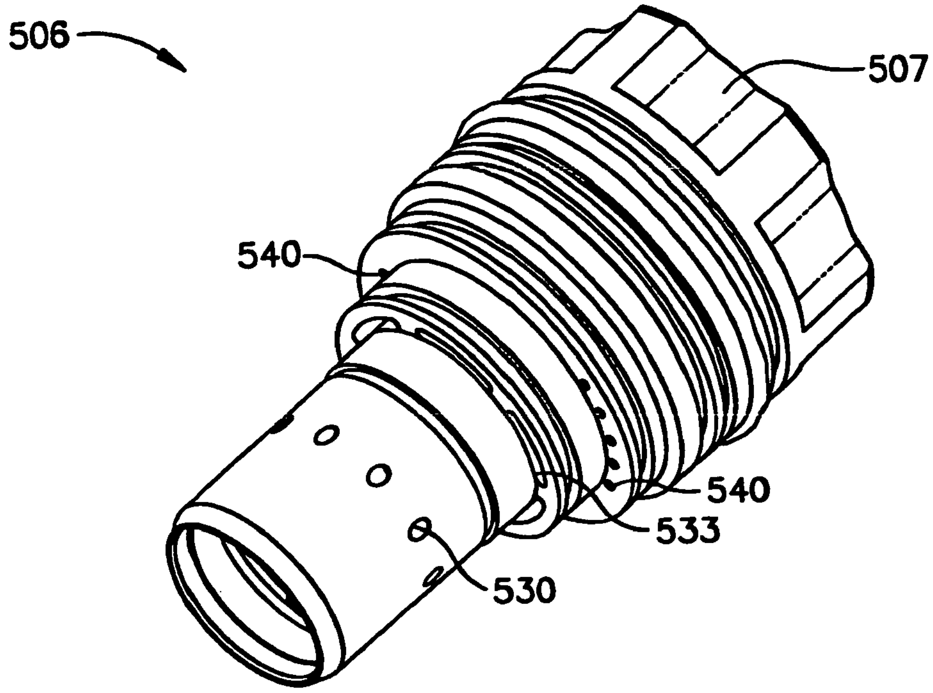
FIG. 39*a* is a perspective view of a cartridge body constructed in accordance with the teachings of the present invention.
Figure 39B:
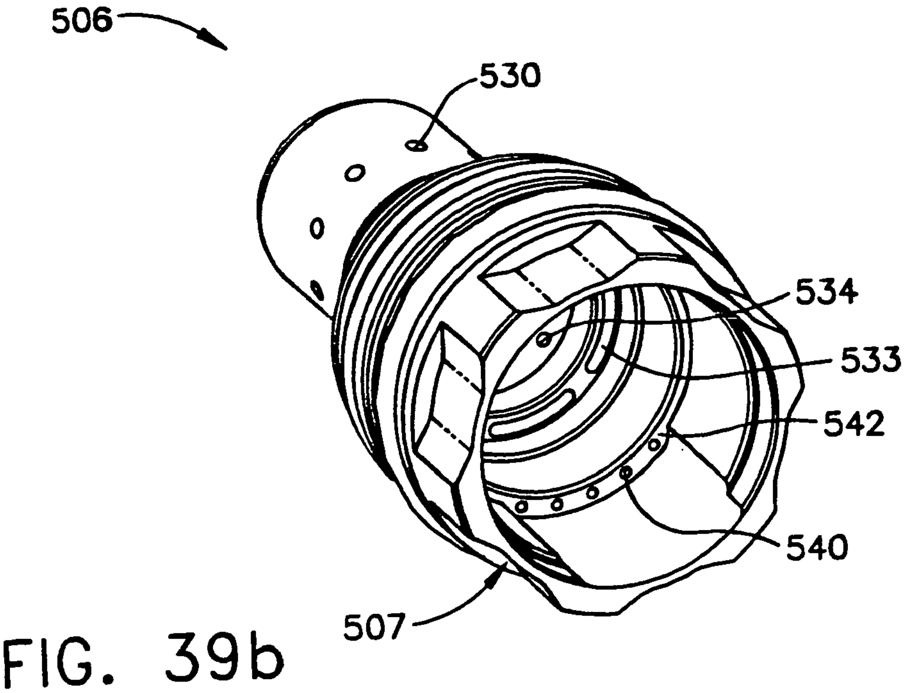
FIG. 39*b* is a proximal perspective view of a cartridge body constructed in accordance with the teachings of the present invention.
Figure 39C:
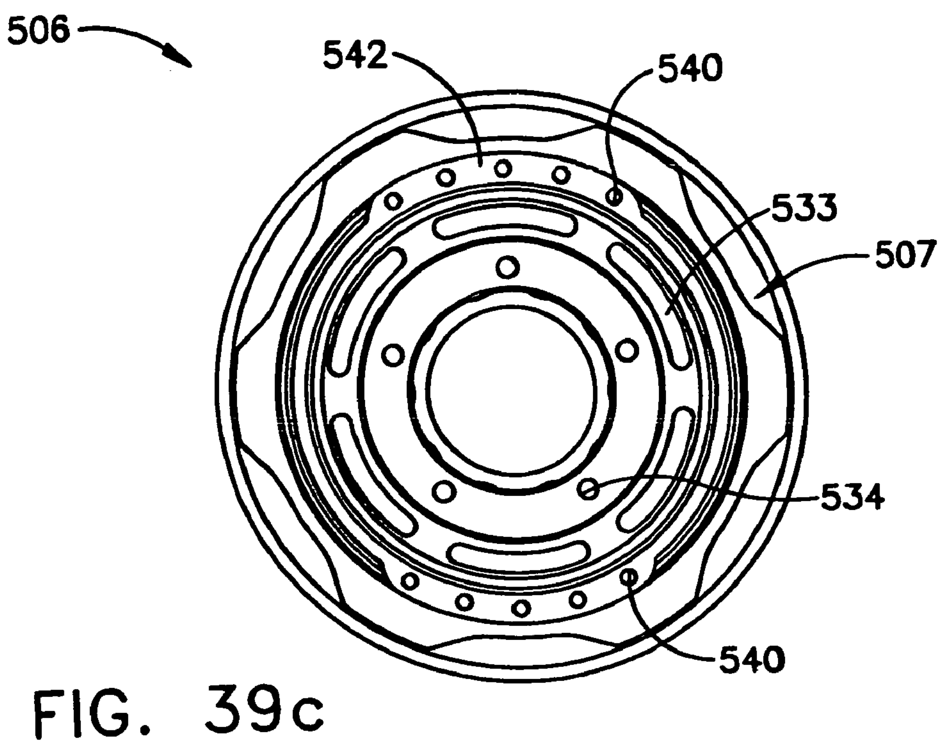
FIG. 39*c* is a top view of a cartridge body constructed in accordance with the teachings of the present invention.
Figure 39D:
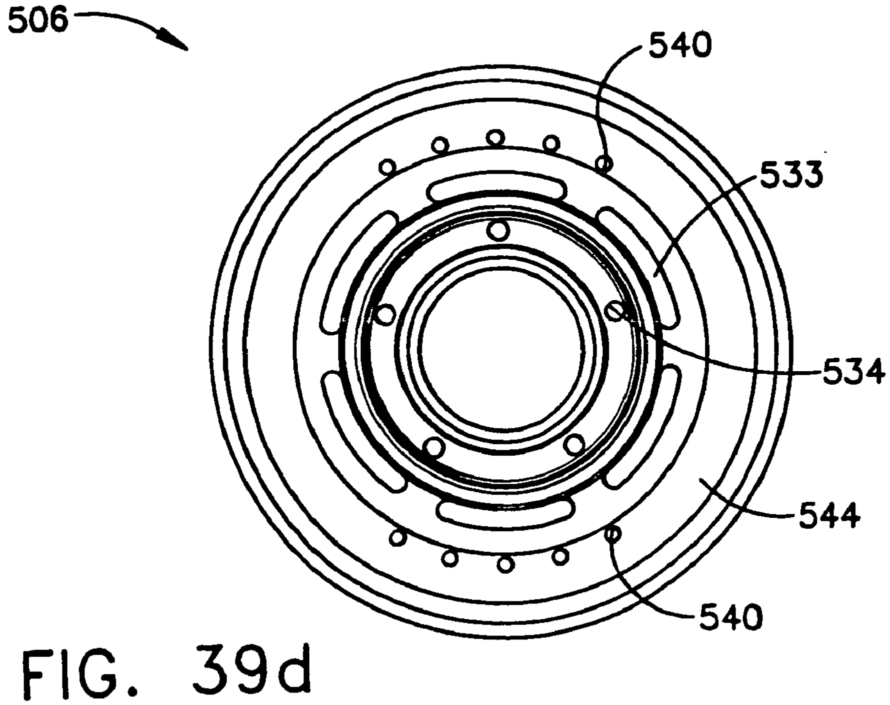
FIG. 39*d* is a bottom view of a cartridge body constructed in accordance with the teachings of the present invention.

Another form of a plasma arc torch according to the present invention is illustrated and indicated by reference numeral 410 as shown in FIGS. 36 through 38. The plasma arc torch 410 comprises a torch head 412 (which is shown in greater detail in FIG. 37) disposed at a proximal end 414 of the plasma arc torch 410 and a plurality of consumable components 416 (shown in greater detail in FIG. 38) secured to the torch head 412 and disposed at a distal end 418 of the plasma arc torch 410 as shown.

Torch Head

Referring more specifically to FIG. 37, the torch head 412 includes an anode body 420 that is in electrical communication with the positive side of a power supply (not shown), and a cathode 422 that is in electrical communication with the negative side of the power supply. The cathode 422 is further surrounded by a central insulator 424 to insulate the cathode 422 from the anode body 420, and similarly, the anode body 420 is surrounded by an outer insulator 426 to insulate the anode body 420 from a housing 428, which encapsulates and protects the torch head 412 and its components from the surrounding environment during operation. The torch head 412 is further adjoined with a coolant supply tube 430, a plasma gas tube 432, a coolant return tube 434, and a secondary gas tube 435 as shown, wherein plasma gas and secondary gas are supplied to and cooling fluid is supplied to and returned from the plasma arc torch 410 during operation as described in greater detail below.

The cathode 422 preferably defines a cylindrical tube having a central bore 436 that is in fluid communication with the coolant supply tube 430 at a proximal portion 438 of the torch head 412. The central bore 436 is also in fluid communication with a cathode cap 440 and a coolant tube 442 at a distal portion 444 of the torch head 412. Generally, the coolant tube 442 provides for the passage of cooling fluid, while the cathode cap 440 protects the end of the cathode 422. The cathode cap 440 further comprises an annular shoulder 448 that engages an internal annular groove 446 within the cathode 422 to secure the cathode cap 440 to the cathode 422. Preferably, the coolant tube 442 is formed of a durable material such as stainless steel, and the cathode cap 440 is insulative and is preferably formed of a material such as Torlon® or other material known in the art that is also capable of operating at relatively high temperatures as previously described.

The central insulator 424 preferably defines a cylindrical tube having an internal bore 460 that houses the cathode 422 as shown. The cathode 422 defines a proximal external shoulder 462 that abuts a proximal internal shoulder 464 of the central insulator 424 to position of the cathode 422 along the central longitudinal axis X of the plasma arc torch. The central insulator 424 is further disposed within the anode body 420 as shown along a central portion 468 and also engages a torch cap 470 that accommodates the coolant supply tube 430, the plasma gas tube 432, and the coolant return tube 434.

Electrical continuity for electric signals such as a pilot return is provided through a contact 472 disposed between the torch cap 470 and the anode body 420. The contact 472 comprises a proximal flange 474 that abuts a recessed shoulder 476 formed in the torch cap 470 and a distal end 478 that engages the anode body 420 as shown. Preferably, the contact 472 is threaded into the anode body 420, however, other attachment methods such as a press fit or soldering may also be used in accordance with the teachings of the present invention.

Alternately, electrical continuity for the pilot return or other electrical signals may be provided directly through an interface between the torch cap 470 and the anode body 420 using detents engaging a shoulder as shown and described in U.S. Pat. No. 6,163,008, which is commonly assigned with the present application and the contents of which are incorporated herein by reference. The detents may be incorporated on the torch cap 470 or the anode body 420 with a corresponding shoulder and cap on the anode body 420 or torch cap 470, respectively. Further, the detents provide a connection that is relatively simple and easy to engage and disengage. Similarly, other connections between components within the plasma arc torch 10 may also employ the detents and shoulder while remaining within the scope of the present invention.

Consumable Components

The consumable components 416, which are shown in greater detail in FIG. 38 and also in FIG. 36, comprise an electrode 500, a tip 502, and a spacer 504 disposed between the electrode 500 and the tip 502 as shown. The spacer 504 provides electrical separation between the cathodic electrode 500 and the anodic tip 502, and further provides certain gas distributing functions as described in greater detail below. A tip guide 503 and a tip seal 505 are disposed at the distal end portion of the tip 502 as shown and provide certain cooling fluid distribution and sealing functions, which are also described in greater detail below.

Further, the consumable components 416 comprise a cartridge body 506 that generally houses and positions the other consumable components 416 and is part of a consumables cartridge, which is described in greater detail below. The cartridge body 506 also distributes plasma gas, secondary gas, and cooling fluid during operation of the plasma arc torch 410, as described in greater detail below. Additionally, the consumable components 416 comprise a distal anode member 508 and a central anode member 509 to form a portion of the anodic side of the power supply by providing electrical continuity to the tip 502. A baffle 510 is also shown disposed between the distal anode member 508 and a shield cap 514, which forms fluid passageways for the flow of a cooling fluid as described in greater detail below. Further, the consumable components 416 comprise a secondary cap 512 for the distribution of the secondary gas and a secondary spacer 516 that separates the secondary cap 512 from the tip 502 and directs the flow of secondary gas. A locking ring 517 is shown disposed around the proximal end portion of the consumable components 416, which is used to secure the consumable components 416 to the torch head 412.

The electrode 500 is centrally disposed within the cartridge body 506 and is in electrical contact with the cathode 422 along an interior portion 518 of the electrode 500 as described in greater detail below. The electrode 500 further defines a distal cavity 520 that is in fluid communication with the coolant tube 442 and an external shoulder 522 that abuts the spacer 504 for proper positioning along the central longitudinal axis X of the plasma arc torch 410. The electrode 500 further comprises at least one passageway for the passage of cooling fluid proximate the electrical contact with the cathode 422. More specifically, the electrode 500 preferably comprises a plurality of ribs 521 and a corresponding plurality of flutes 523 disposed between the ribs 521, wherein the ribs 521 provide electrical contact with the cathode 422 and the flutes 523 provide for the passage of a cooling fluid as previously described in relation to the first plasma arc torch 10 embodiment. Accordingly, the electrode 500 and the cathode 422 define adjacent perimeter surfaces as previously described such that cooling of the electrode 500 is provided proximate, or through an adjacent vicinity of, the electrical contact between the electrode 500 and the cathode 422. Alternately, the electrode 500 and cathode 422 may comprise other embodiments as previously described, wherein at least one fluid passageway is formed proximate the electrical contact for proper cooling.

The cartridge body 506 further comprises an internal annular ring 524 that abuts a proximal end 526 of the electrode 500 for proper positioning of the electrode 500 along the central longitudinal axis X of the plasma arc torch 410. Additionally, the connection between the cartridge body 506 and the cathode 422 may employ the detents and shoulder as previously described while remaining within the scope of the present invention. In addition to positioning the various consumable components 416, the cartridge body 506 also separates anodic members (e.g., central anode member 509) from cathodic members (e.g., electrode 500). Accordingly, the cartridge body 506 is an insulative material such as PEEK® or other similar material commonly known in the art that is further capable of operating at relatively high temperatures.

Referring to FIG. 38 and FIGS. 39*a* through 39*d*, the cartridge body 506 provides for the distribution of cooling fluid, plasma gas, and secondary gas, in addition to positioning the other consumable components 416. For the distribution of cooling fluid, which is described in greater detail below, the cartridge body 506 defines a central chamber 528 and a plurality of passageways 530 that extend through the cartridge body 506 and into an inner cooling chamber 532 formed between the cartridge body 506 and the distal anode member 508. Preferably, the passageways 530 are angled radially outward in the distal direction from the upper chamber 528 to minimize any dielectric creep that may occur between the electrode 500 and the distal anode member 508. Additionally, outer axial passageways 533 (shown dashed) are formed in the cartridge body 506 that provide for a return of the cooling fluid. The outer axial passageways 533 are also positioned along the distal anode member 508 and the central anode member 509 and proximate the electrical interface therebetween. Accordingly, the position of the outer axial passageways 533 provides improved cooling of the distal anode member. 508 and the central anode member 509. Near the distal end of the consumables cartridge 416, an outer fluid passage 548 is formed between the distal anode member 508 and the baffle 510. Accordingly, the outer fluid passage 548 is in communication with the outer axial passageways 533 for the return of cooling fluid which is described in greater detail below.

For the distribution of plasma gas, the cartridge body 506 defines a plurality of distal axial passageways 534 (shown dashed in FIG. 38) that extend from a proximal face 536 of the cartridge body 506 to a distal end 538 thereof, which are in fluid communication with the plasma gas tube 532 (not shown) and passageways formed in the spacer 504 as described in greater detail below. Additionally, a plurality of proximal axial passageways 540 (shown dashed in FIG. 38) are formed through the cartridge body 506 that extend from a recessed proximal face 542 to a distal outer face 544 for the distribution of a secondary gas, which is also described in greater detail below. Moreover, the cartridge body 506 defines a scalloped proximal periphery 507 that provides for ease of fit of the cartridge body 506 within the torch head 412.

Figure 40:
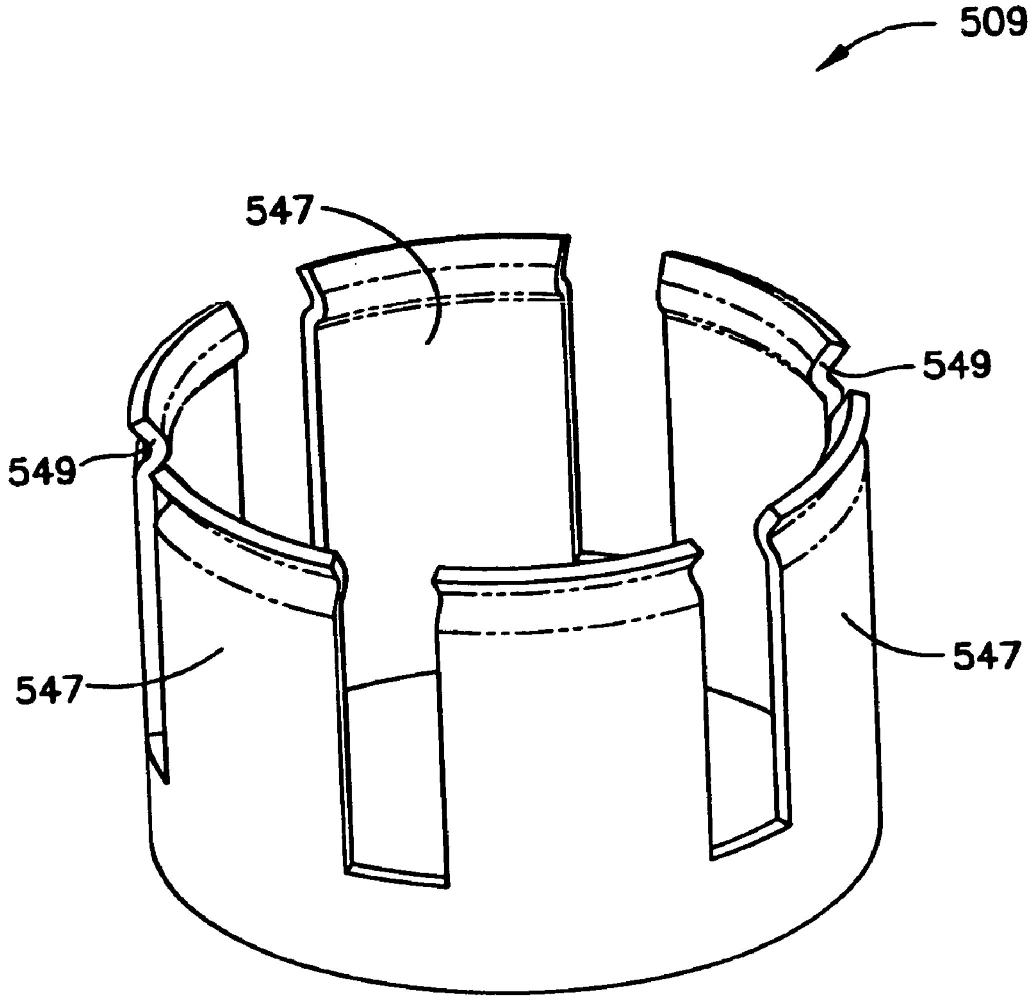
FIG. 40 is a perspective view of a central anode member constructed in accordance with the teachings of the present invention.

As shown in FIGS. 36 and 38, the distal anode member 508 is disposed between the cartridge body 506 and the baffle 510 and is in electrical contact with the tip 502 at a distal portion and with the central anode member 509 at a proximal portion. Further, the central anode member 509 is in electrical contact with a distal end portion 546 of the anode body 420. Preferably, the central anode member 509 comprises a plurality of fingers 547 (best shown in FIG. 40) defining detents 549 at a proximal end thereof to provide secure electrical contact between the central anode member 509 and the anode body 420. As shown, the detents 549 extend over a shoulder 551 formed on a distal sleeve 553 disposed over the distal end portion 546 of the anode body 420. The distal sleeve 553 is preferably formed of an insulative material such as ULTEM® and is press fit over the distal end portion 546 of the anode body 420. The detents 549 are similar to those disclosed in U.S. Pat. No. 6,163,008, which is commonly assigned with the present application and the contents of which are incorporated herein by reference. The detents 549 may be incorporated on the central anode member 509 or the anode body 420 with a corresponding shoulder and cap on the anode body 420 or central anode member 509, respectively. Accordingly, the anode body 420, the distal anode member 508, the central anode member 509, and the tip 502 form the anode, or positive, potential for the plasma arc torch 410.

Figure 41:
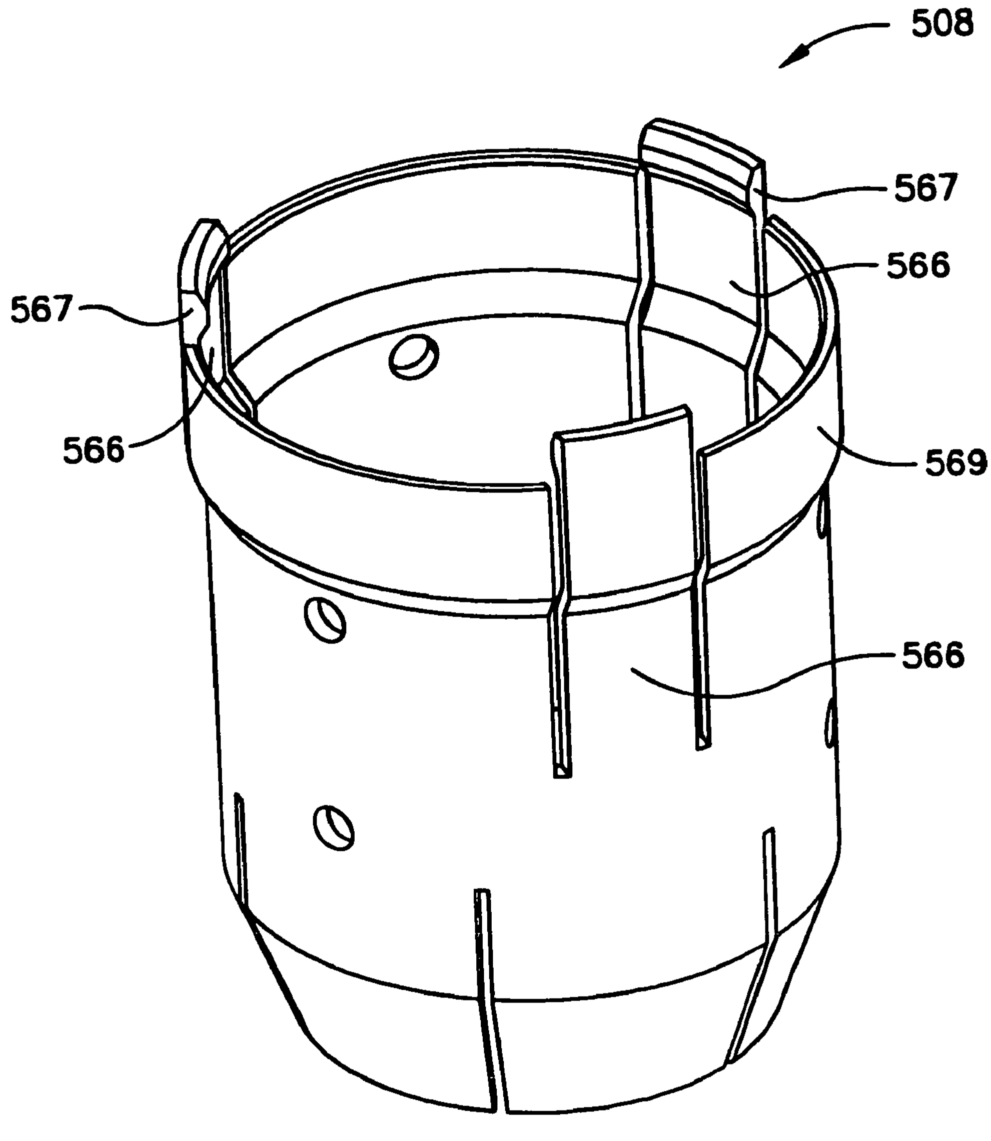
FIG. 41 is a perspective view of a distal anode member constructed in accordance with the teachings of the present invention.

Referring to FIGS. 36, 38, and 41, axial tabs 566 are formed in the distal anode member 508, wherein the axial tabs 566 similarly define detents 567 and are biased inward as shown to provide electrical continuity between the distal anode member 508 and the central anode member 509. The proximal end portion of the distal anode member 508 defines an extended upper wall 569 that extends outwardly as shown to position the axial tabs 566 around the central anode member 509. As further shown, a retention ring 571 is disposed around a central portion of the cartridge body 506 to retain and position the central anode member 509 along the central longitudinal axis X of the plasma arc torch 410. Accordingly, the axial tabs 566 and the extended upper wall 569 extend over the retention ring 571 to make electrical contact with the central anode member 509.

Referring to FIGS. 36 and 38, the shield cap 514 surrounds the baffle 510 as shown, wherein a secondary gas passage 550 is formed therebetween. Generally, the secondary gas flows from the proximal axial passageways 540 formed in the cartridge body 506 into the secondary gas passage 550 and through the secondary cap 512, as described in greater detail below, to stabilize the plasma stream exiting the secondary cap 512 in operation. The shield cap 514 further positions the secondary cap 512, wherein the secondary cap 512 defines an annular shoulder 552 that engages an internal shoulder 554 of the shield cap 514.

The secondary spacer 516 spaces and insulates the secondary cap 512 from the tip 502 and also distributes secondary gas to stabilize the plasma stream during operation. Preferably, the secondary spacer 516 comprises a proximal face 556 that abuts an annular shoulder 558 of the tip seal 505 and a distal face 560 and shoulder 562 that abut an internal shoulder 564 and proximal face 573, respectively, of the secondary cap 512. As further shown, the secondary spacer 516 forms a secondary gas chamber 578 between the tip seal 505 and the secondary cap 512, wherein the secondary gas is distributed to stabilize the plasma stream, as described in greater detail below. Accordingly, the secondary spacer 516 defines secondary gas passageways 513 as previously described that direct and preferably swirl the flow of secondary gas into the secondary gas chamber 578. The secondary cap 512 further comprises a central exit orifice 568 through which the plasma stream exits and a recessed face 570 that contributes to controlling the plasma stream.

Figure 42:
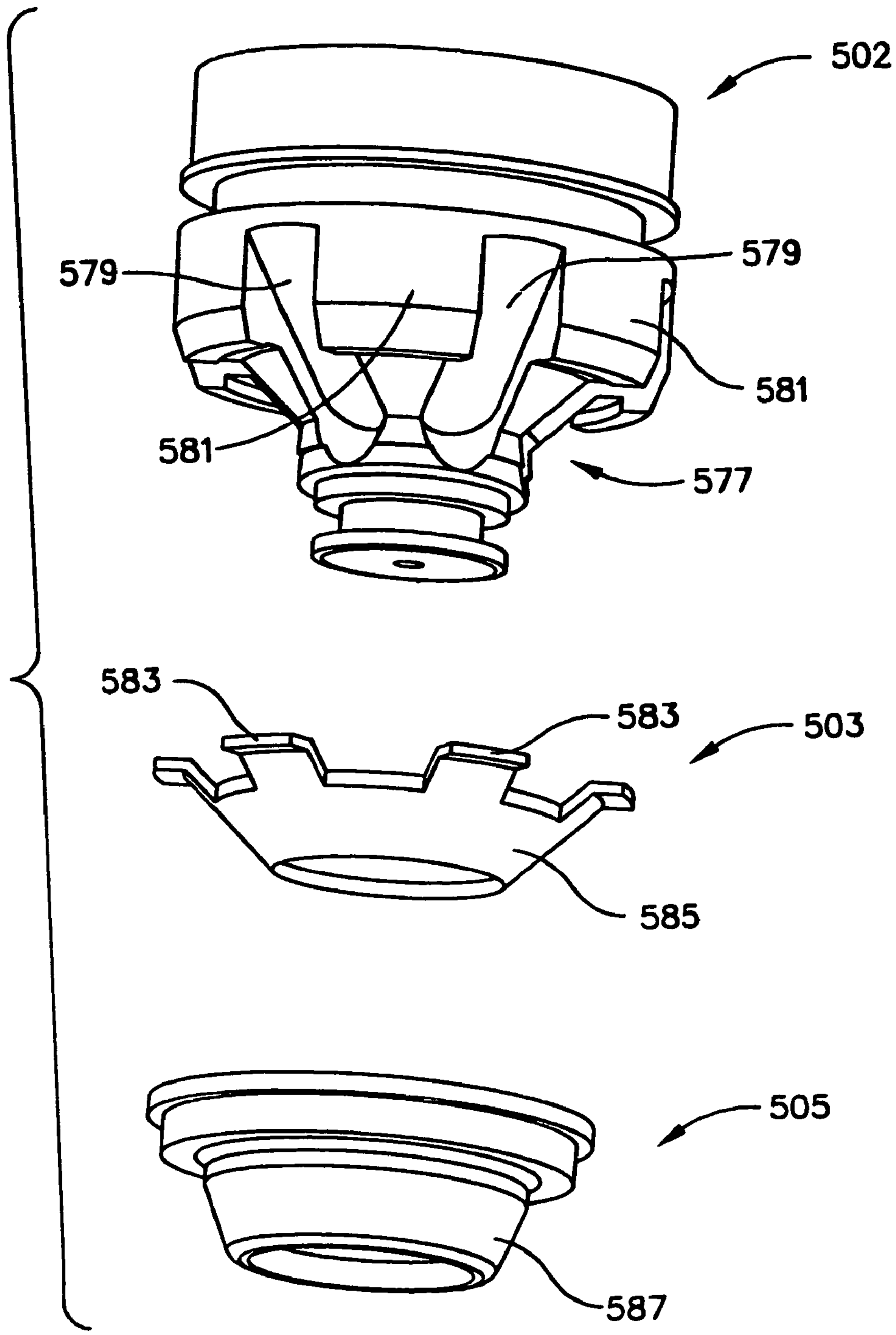
FIG. 42 is an exploded perspective view of a tip, a tip guide, and a tip seal constructed in accordance with the teachings of the present invention.

As shown in FIGS. 38 and 42, the tip guide 503 and tip seal 505 are disposed at the distal end portion of the tip 502. The tip 502 comprises a conical end portion 577 that defines a plurality of flutes 579 and raised ridges 581, as previously described in other tip embodiments, wherein the raised ridges 581 contact the distal end portion of the distal anode member 508 for electrical contact and the flutes 579 provide fluid passageways for the passage of cooling fluid during operation as described in greater detail below. Accordingly, a distal fluid passageway 580 is formed between the tip 502 and the tip guide 503 and also between the tip guide 503 and the tip seal 503, wherein the tip guide 503 guides the cooling fluid distally past the tip 502 and then proximally for recirculation of the cooling fluid that is described in greater detail below.

As best shown in FIG. 42, the tip guide 503 defines radial tabs 583 that are positioned within the flutes 579 to properly guide the cooling fluid during operation. The tip guide 503 also comprises a conical end wall 585 that is shaped to conform to the conical end portion 577 of the tip 502. As further shown, the tip seal 505 also defines a conical end portion 587 to conform to the tip guide 503, which results in the formation of the distal fluid passageway 580. Preferably, the tip guide 503 is a brass material, and the tip seal 505 and the tip 502 are a tellurium copper material.

Figure 43:
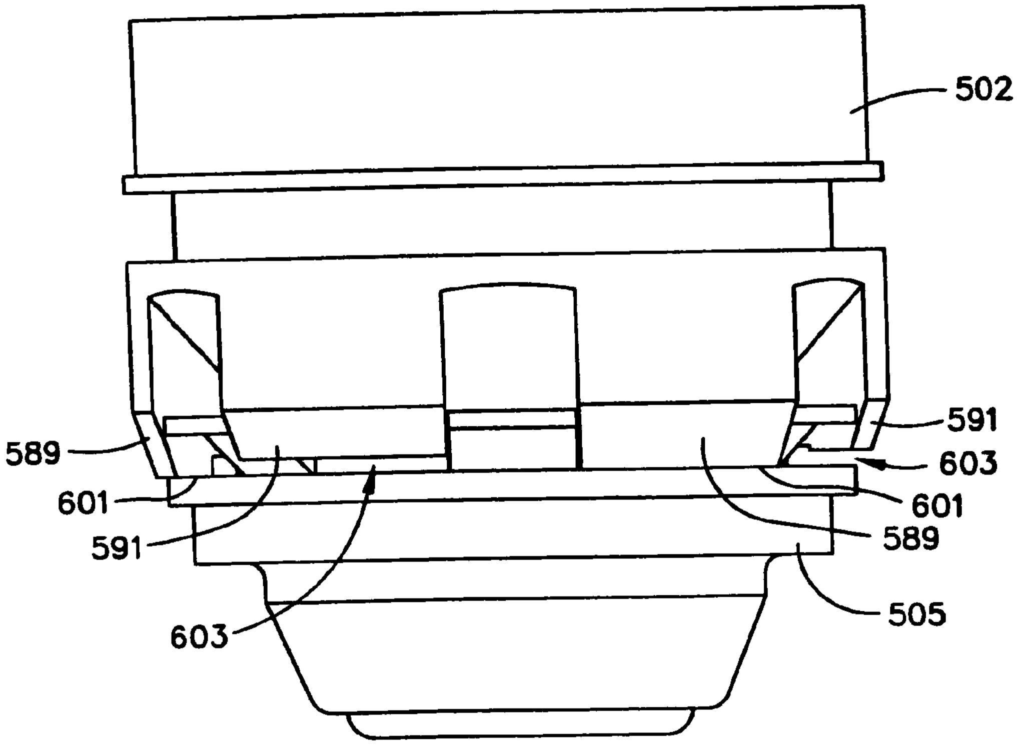
FIG. 43 is a side view of a tip assembly constructed in accordance with the teachings of the present invention.

Referring now to FIG. 38 and FIG. 43, the tip 502 further comprises feet 589 and offset feet 591, wherein the feet 589 extend distally beyond the offset feet 591 as shown. When assembled to the tip seal 505, the feet 589 engage an upper annular face 601 of the tip seal 505 and a gap 603 is produced between the offset feet 591 and the upper annular face 601 of the tip seal 505. Accordingly, the gap 603 provides additional space for the flow of cooling fluid that is being returned for recirculation. As further shown, the tip defines a distal face 605 that engages an internal annular shoulder 605 of the tip seal 505 to further position the tip 502 relative to the tip seal 505.

As shown in FIG. 38, the tip 502 is electrically separated from the electrode 500 by the spacer 504, which results in a plasma chamber 572 being formed between the electrode 500 and the tip 502. The spacer 504 defines swirl passageways 607 (shown dashed) that swirl the plasma gas flowing from the distal axial passageways 534 into the plasma chamber 572. The tip 102 further comprises a central exit orifice 574, through which a plasma stream exits during operation of the plasma arc torch 410 as the plasma gas is ionized within the plasma chamber 572, which is described in greater detail below.

As further shown, the locking ring 517 secures the consumable components 416 to the torch head 412 when the plasma arc torch 410 is fully assembled. The locking ring 517 is preferably secured to the torch head 412 through a threaded connection, wherein the locking ring 517 comprises a threaded insert 519. Preferably, the threaded insert 519 is brass and the locking ring 517 is a thermoset material that is overmolded onto the threaded insert 519. Alternately, the consumable components 416 may be secured to the torch head 412 using a dual pitch locking connector as shown and described in copending application Ser. No. 10/035,534 filed Nov. 9, 2001, which is commonly assigned with the present application and the contents of which are incorporated herein by reference.

Cooling Fluid Flow

Figure 44:
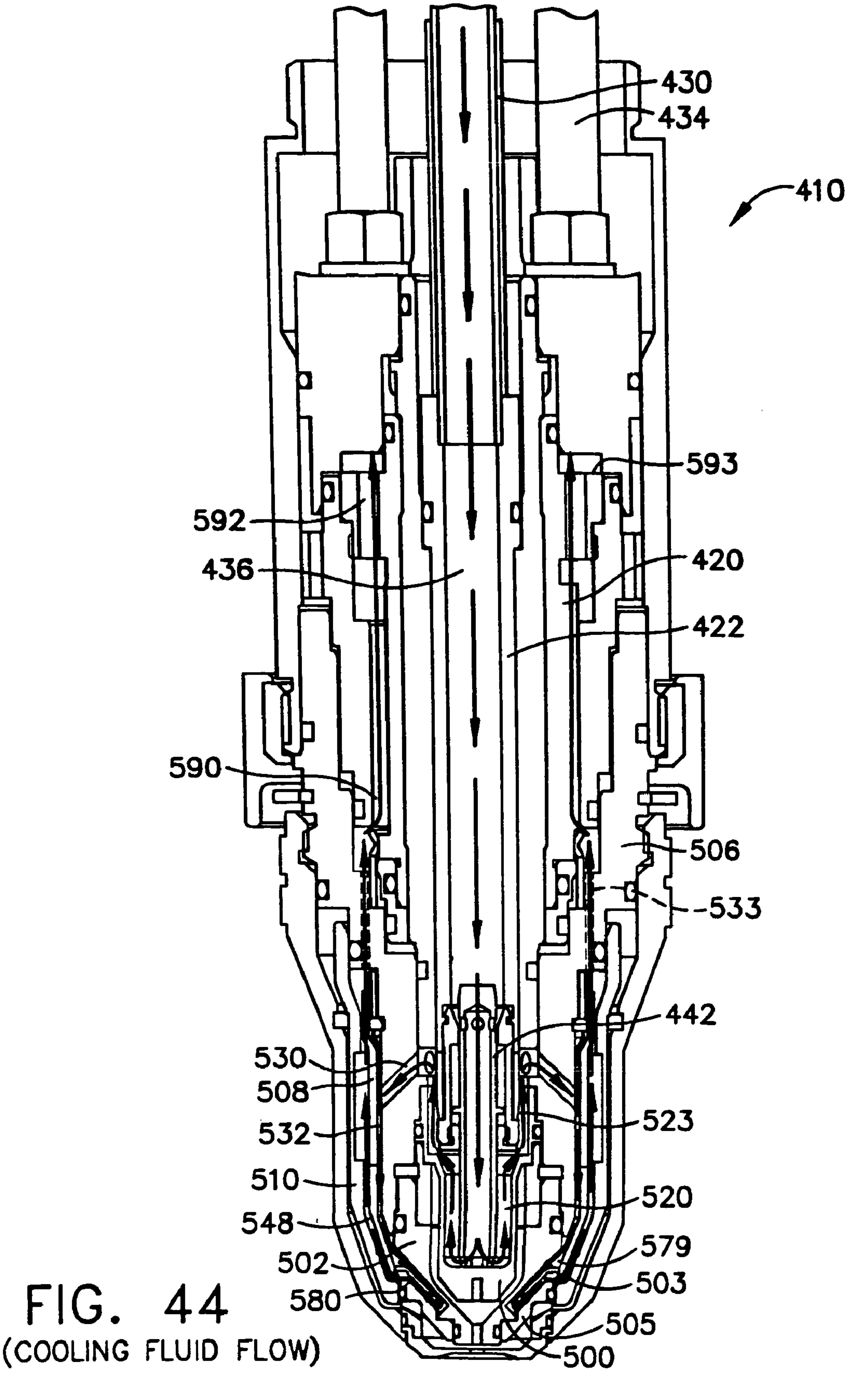
FIG. 44 is a longitudinal cross-sectional view of a plasma arc torch illustrating the cooling fluid flow in accordance with the principles of the present invention.

Referring to FIG. 44, in operation, the cooling fluid flows from the coolant supply tube 430, distally through the central bore 436 of the cathode 422, through the coolant tube 442, and into the distal cavity 520 of the electrode 500. The cooling fluid then flows proximally through the proximal cavity 518 formed between the flutes 523 of the electrode 500 and the cathode 422 to provide cooling to the electrode 500 and the cathode 422 that are operated at relatively high currents and temperatures. The cooling fluid continues to flow proximally to the passageways 530 in the cartridge body 506, wherein the cooling fluid then flows through the passageways 530 and into the inner cooling chamber 532. The cooling fluid then flows past the tip 502, which also operates at relatively high temperatures, in order to provide cooling to the tip 502. More specifically, the cooling fluid flows through the distal fluid passageway 580 formed by the tip guide 503 between the tip 502 and the tip seal 505. The cooling fluid first flows distally through the flutes 579 of the tip 502 and then reverses direction around the distal end of the tip guide 503 to then flow proximally through the distal fluid passageway 580 between the tip guide 503 and the tip seal 505. The cooling fluid then flows proximally through the outer fluid passage 548 formed between the distal anode member 508 and the baffle 510 and through the outer axial passageways 533 (shown dashed) in the cartridge body 506. The cooling fluid then flows proximally through recessed walls 590 and axial passageways 592 formed in the anode body 420. Once the cooling fluid reaches a proximal shoulder 593 of the anode body 420, the fluid flows through the coolant return tube 434 and is recirculated for distribution back through the coolant supply tube 430.

As a result, the cooling fluid flow is "coaxial" as previously described for improved cooling and operation of the plasma arc torch 410. Therefore, the cooling fluid flow is distributed circumferentially about the central longitudinal axis X of the plasma arc torch 410 and is flowing in the same direction at any radial location from the central longitudinal axis X to produce the coaxial flow.

Plasma Gas Flow

Figure 45:
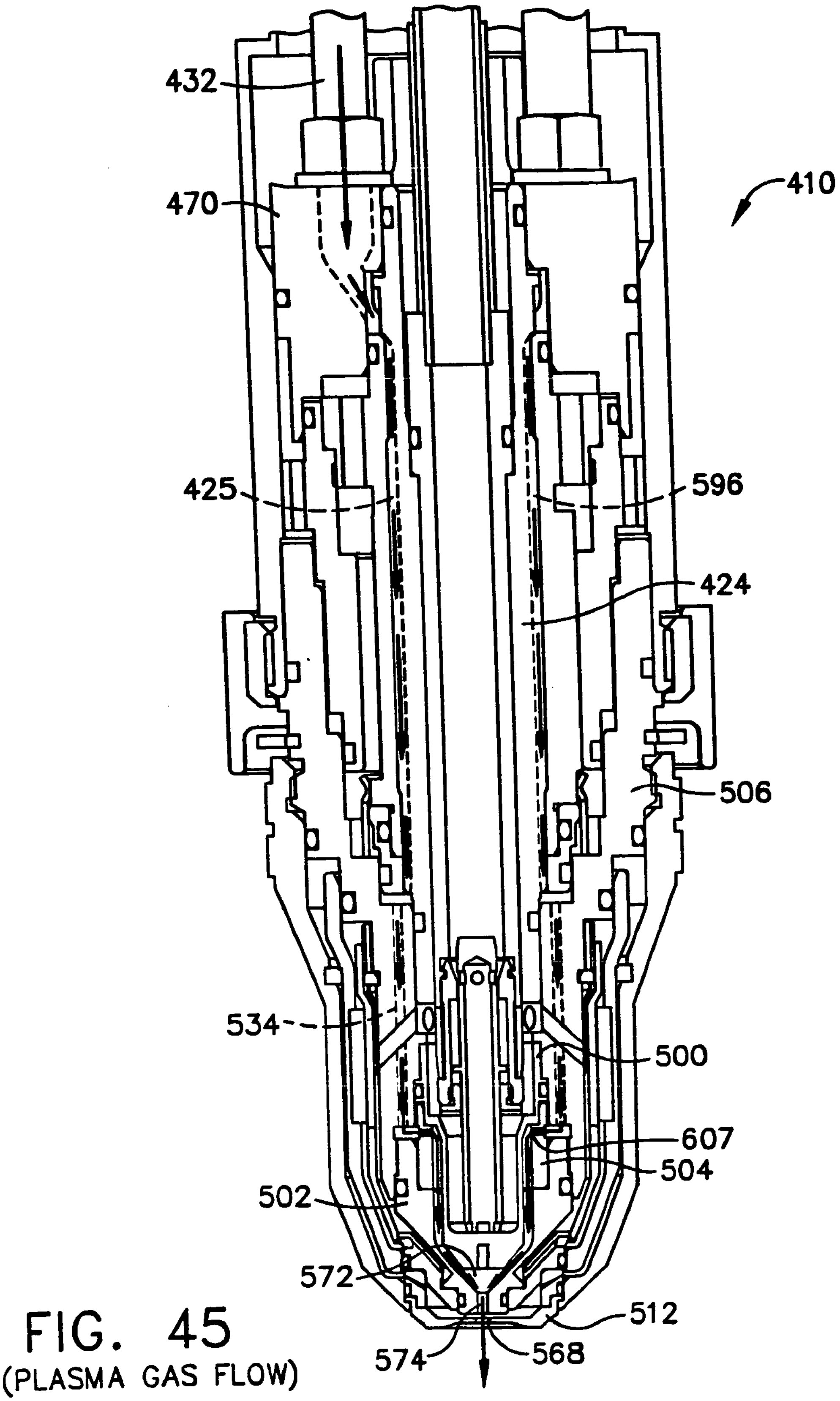
FIG. 45 is a longitudinal cross-sectional view of a plasma arc torch illustrating the plasma gas flow in accordance with the principles of the present invention.
Figure 46:
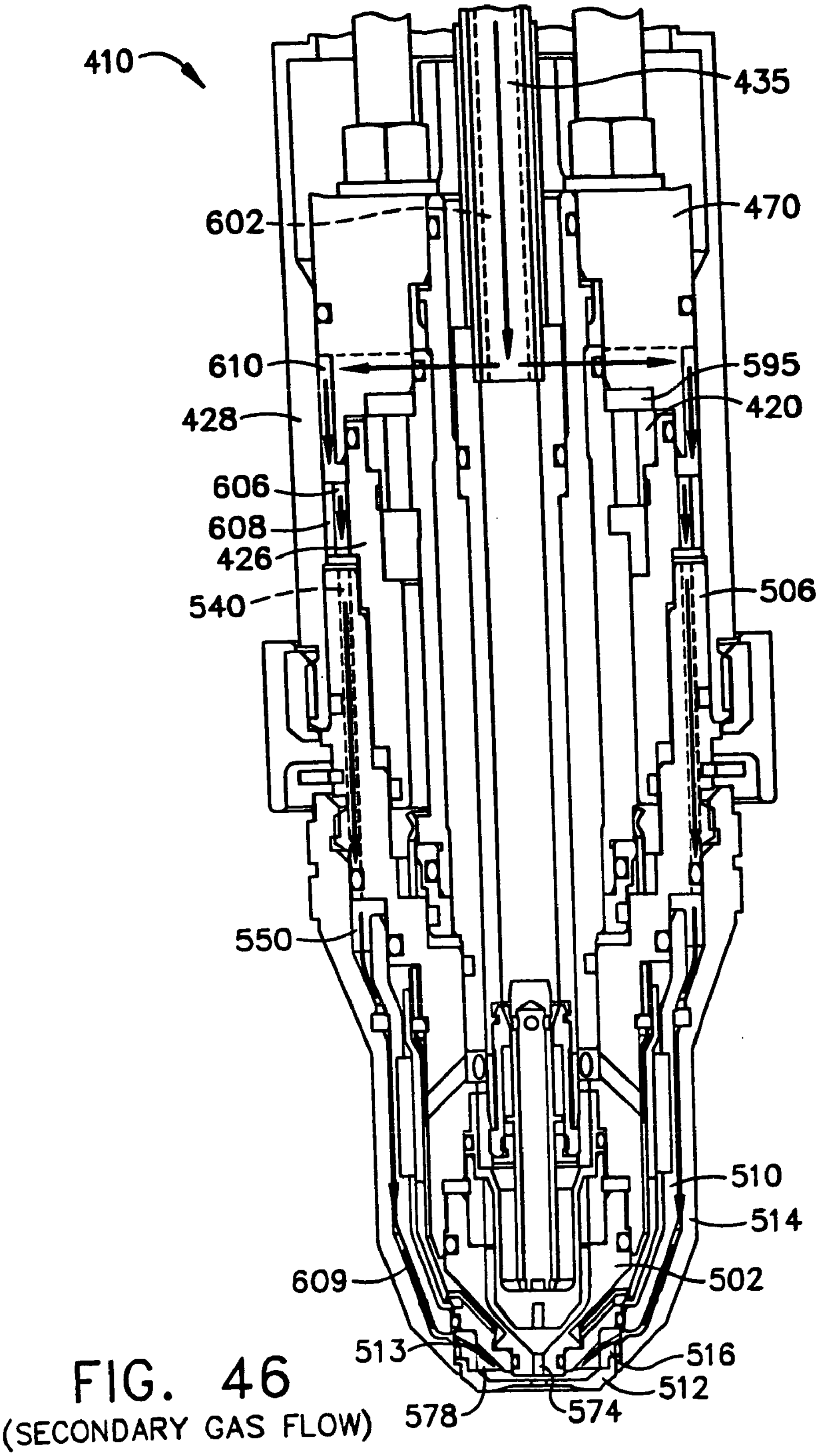
FIG. 46 is a longitudinal cross-sectional view of a plasma arc torch illustrating the secondary gas flow in accordance with the principles of the present invention.

Referring to FIG. 45, the plasma gas generally flows distally from the plasma gas tube 432, through the torch cap 470, and into a central cavity 596 formed in the anode body 420. The plasma gas then flows distally through recessed annular walls 425 (shown dashed) of the central insulator 424 and into the distal axial passageways 534 (shown dashed) formed in the cartridge body 506. The plasma gas then flows through the swirl passageways 607 (shown dashed) formed in the spacer 504 between the electrode 500 and the tip 502. The plasma gas then enters the plasma chamber 572 to form a plasma stream as the plasma gas is ionized by the pilot arc, and the plasma stream exits the central exit orifice 574 of the tip 502 and the central exit orifice 568 of the secondary cap 512. Additionally, the plasma gas flow is coaxial, as previously described, wherein the plasma gas is distributed circumferentially about the central longitudinal axis of the torch and is flowing in the same direction at any radial location from the central longitudinal axis.

Secondary Gas Flow

Referring to FIGS. 36 through 38, the secondary gas generally flows distally from the secondary gas tube 435 (shown dashed) and through an axial passage 602 (shown dashed) formed through the torch cap 470. The secondary gas then flows radially outward through an annular chamber 595 (shown dashed) between the torch cap 470 and the anode body 420 and continues to flow distally into an outer chamber 610 formed between the torch cap 470 and the housing 428. The secondary gas then flows through the axial passageways 606 formed through an annular extension 608 of the outer insulator 426, and into the proximal axial passageways 540 (shown dashed) of the cartridge body 506. The secondary gas then enters the secondary gas passage 550 and flows distally between the baffle 510 and the shield cap 514, through the distal secondary gas passage 609, and through the secondary gas passageways 513 formed in the secondary spacer 516. The secondary gas then enters the secondary gas chamber 578 between the tip seal 505 and the secondary cap 512 to stabilize the plasma stream that exits from the central exit orifice 574 of the tip 502. Additionally, the secondary gas flow is coaxial, as previously described, wherein the secondary gas is distributed circumferentially about the central longitudinal axis of the torch and is flowing in the same direction at any radial location from the central longitudinal axis.

Operation

In operation, with reference to FIG. 36 and FIGS. 44–46, the cathode or negative potential is carried by the cathode 422 and the electrode 500, and the anode or positive potential is carried by the anode body 420, the central anode member 509, the distal anode member 508, and the tip 502, such that when electric power is applied to the plasma arc torch 410, a pilot arc is generated in the gap formed between the electrode 500 and the tip 502, within the plasma chamber 572. As the plasma gas enters the plasma chamber 572, the plasma gas is ionized by the pilot arc, which cause a plasma stream to form within the plasma chamber 572 and to flow distally through the central exit orifice 574 of the tip 502. Additionally, the secondary gas flows into the secondary gas chamber 578 and stabilizes the plasma stream upon exiting the central exit orifice 574 of the tip 502. As a result, a highly uniform and stable plasma stream exits the central exit orifice 568 of the secondary cap 512 for high current, high tolerance cutting operations.

The plasma arc torch 410 also comprises a plurality of o-rings and corresponding o-ring slots as shown in FIGS. 36 through 38, which are not numbered herein for purposes of clarity. The o-rings generally seal the fluid passageways, namely, the passageways for cooling fluid, plasma gas, and secondary gas during operation of the plasma arc torch, which should be understood by one having ordinary skill in the art.

Consumables Cartridge

Figure 47A:
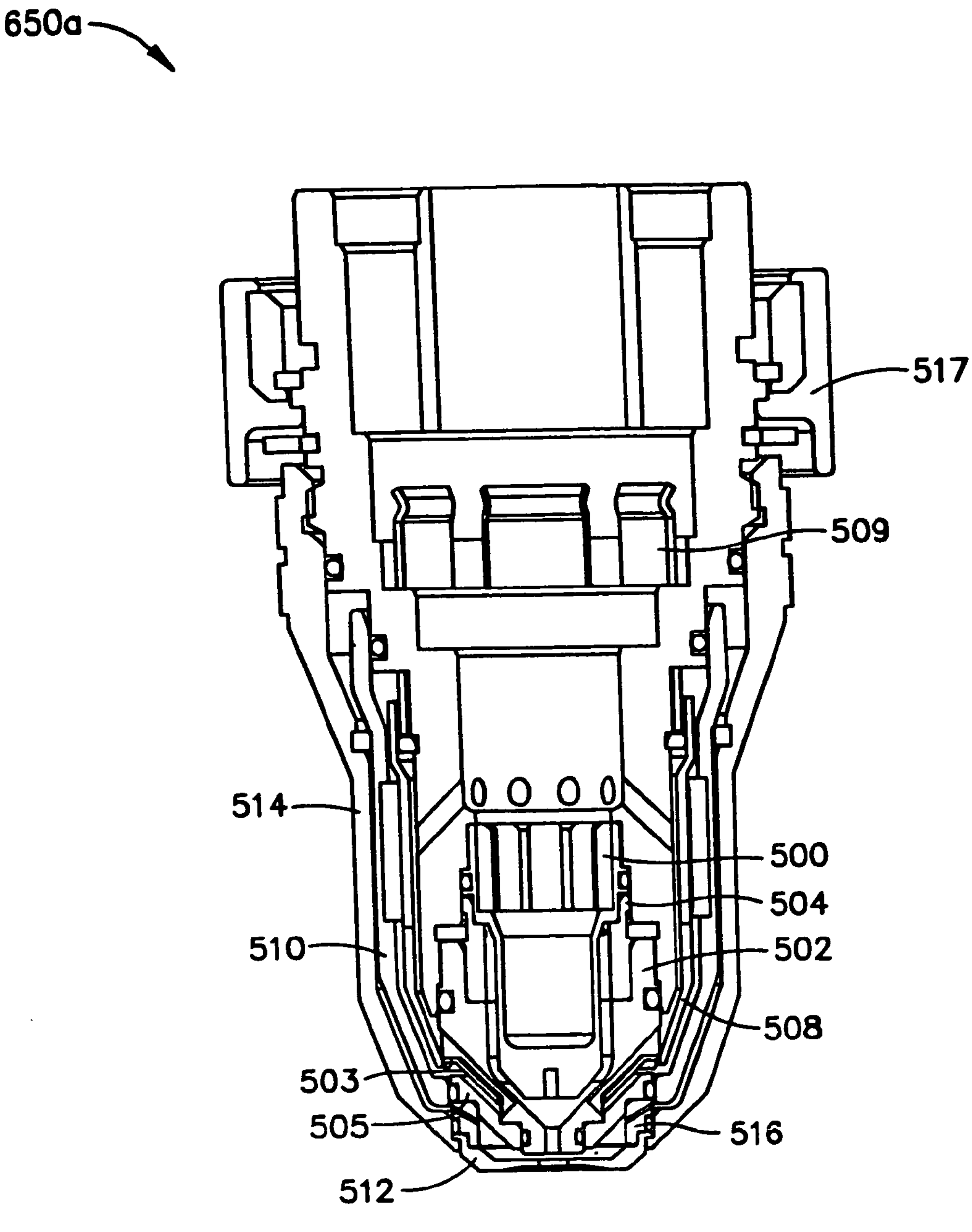
FIG. 47*a* is a longitudinal cross-sectional view of a consumables cartridge constructed in accordance with the teachings of the present invention.

Referring to FIGS. 47*a* through 47*f*, the present invention provides a consumables cartridge 650 that generally comprises the cartridge body 506 and at least one other consumable component. For example, as shown in FIG. 47*a*, the consumables cartridge 650*a* comprises the central anode member 509, the electrode 500, the tip 502, the spacer 504, the distal anode member 508, the shield cap 514, the baffle 510, the tip guide 503, the tip seal 505, the secondary cap 512, the secondary spacer 516, and the locking ring 517, along with the series of o-rings as shown. With the use of the consumables cartridge 650, the entire cartridge 650 is replaced when one or more consumable components require replacement to provide for a quick and efficient replacement of consumable components rather than replacing individual consumable components one at a time.

Figure 47B:
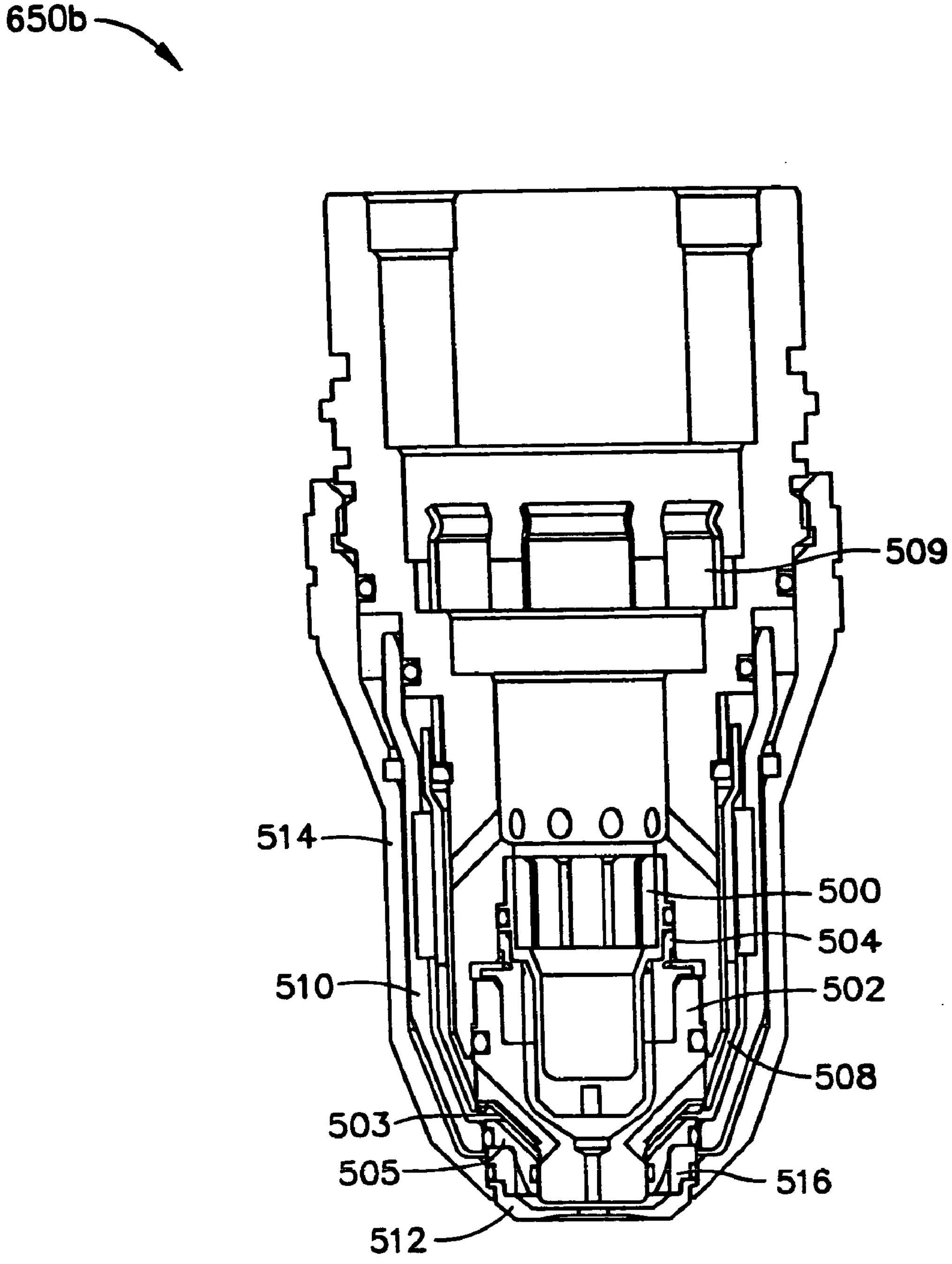
FIG. 47*b* is a longitudinal cross-sectional view of a second embodiment of a consumables cartridge constructed in accordance with the teachings of the present invention.
Figure 47C:
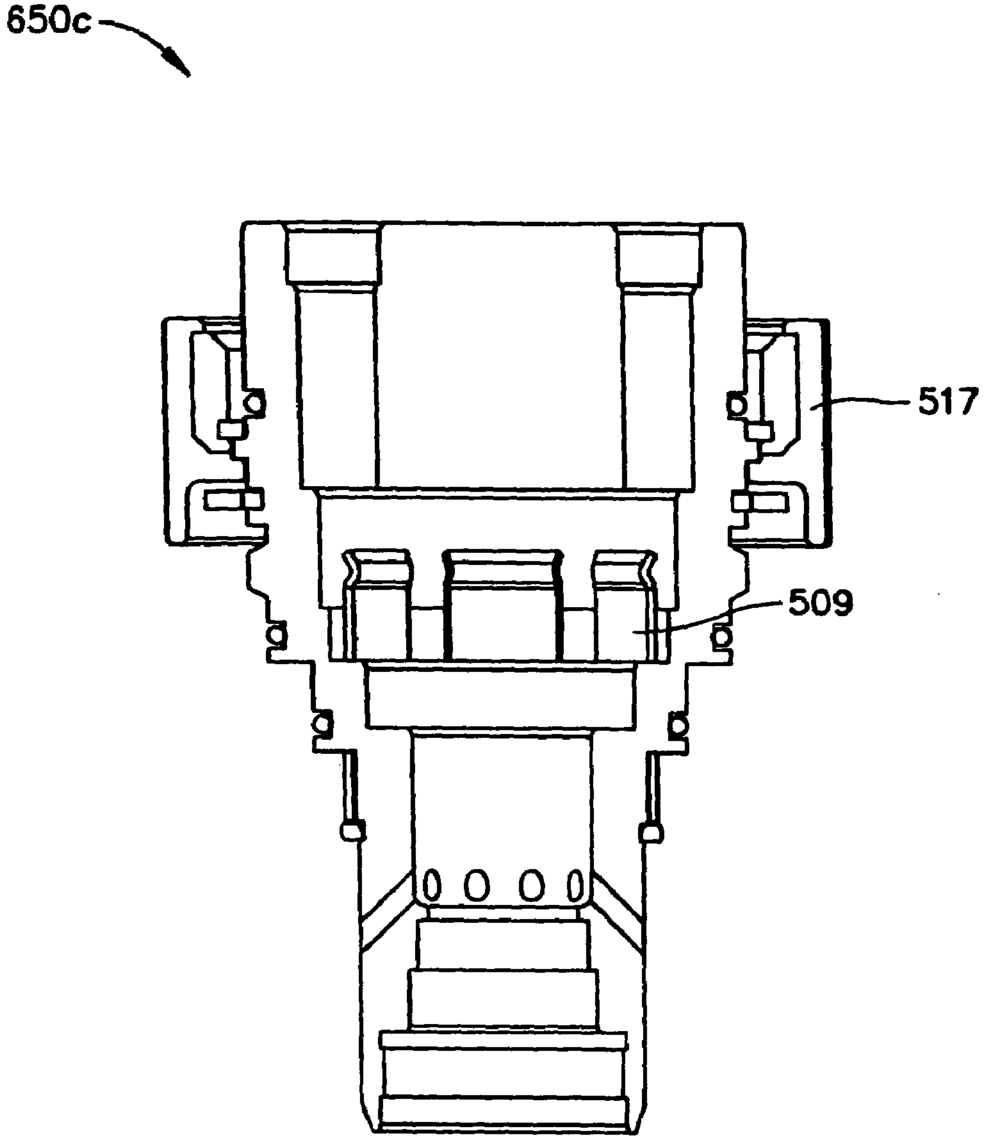
FIG. 47*c* is a longitudinal cross-sectional view of a third embodiment of a consumables cartridge constructed in accordance with the teachings of the present invention.
Figure 47D:
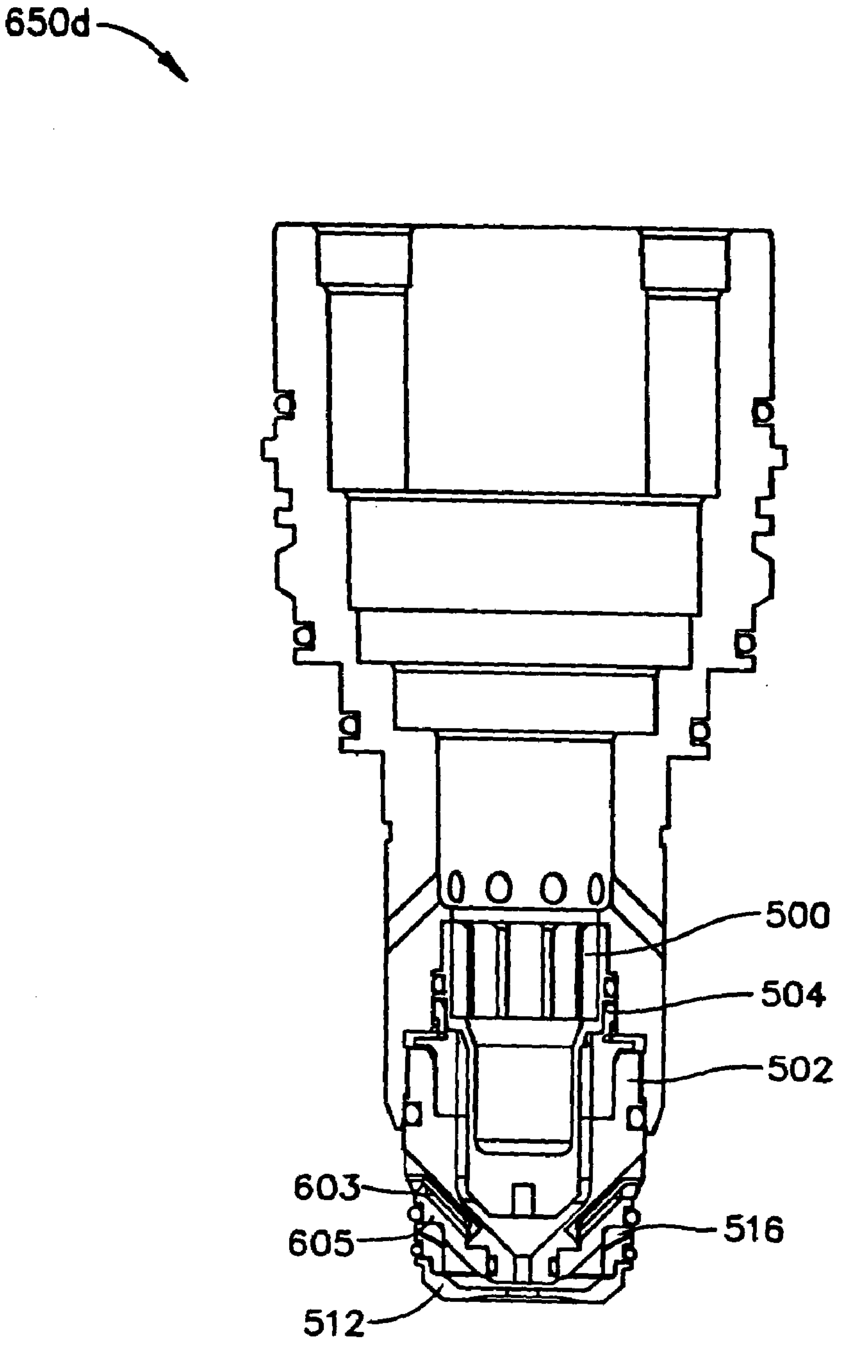
FIG. 47*d* is a longitudinal cross-sectional view of a fourth embodiment of a consumables cartridge constructed in accordance with the teachings of the present invention.

As shown in FIG. 47*b*, the consumables cartridge 650*b* comprises the central anode member 509, the electrode 500, the tip 502, the spacer 504, the distal anode member 508, the shield cap 514, the baffle 510, the tip guide 503, the tip seal 505, the secondary cap 512, and the secondary spacer 516. The consumables cartridge 650*c* in FIG. 47*c* comprises the central anode member 508 and the locking ring 517. The consumables cartridge 650*d* illustrated in FIG. 47*d* comprises the electrode 500, the tip 502, the spacer 504, the tip guide 503, the tip seal 505, the secondary cap 512, and the secondary spacer 516.

Figure 47E:
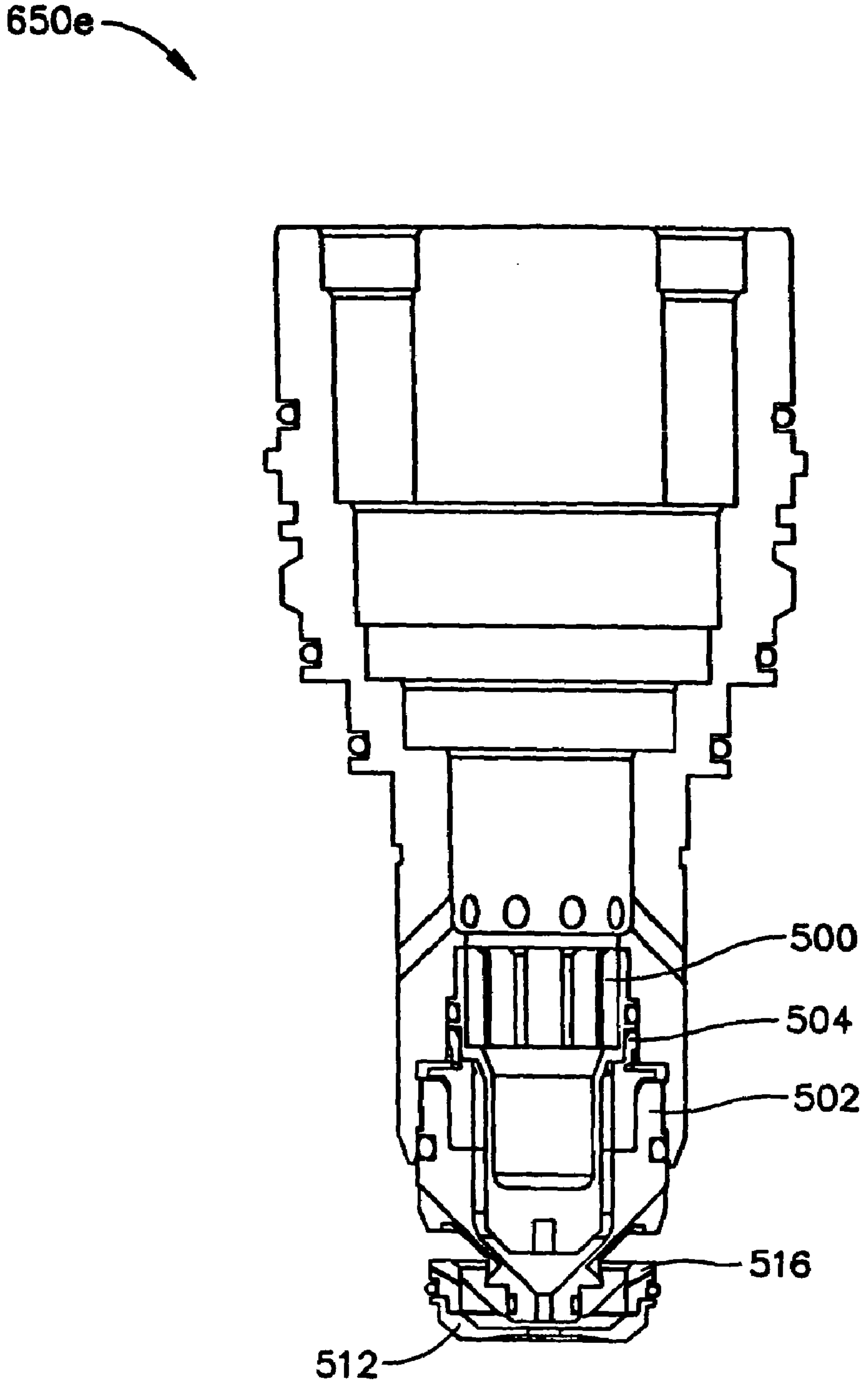
FIG. 47*e* is a longitudinal cross-sectional view of a fifth embodiment of a consumables cartridge constructed in accordance with the teachings of the present invention.
Figure 47F:
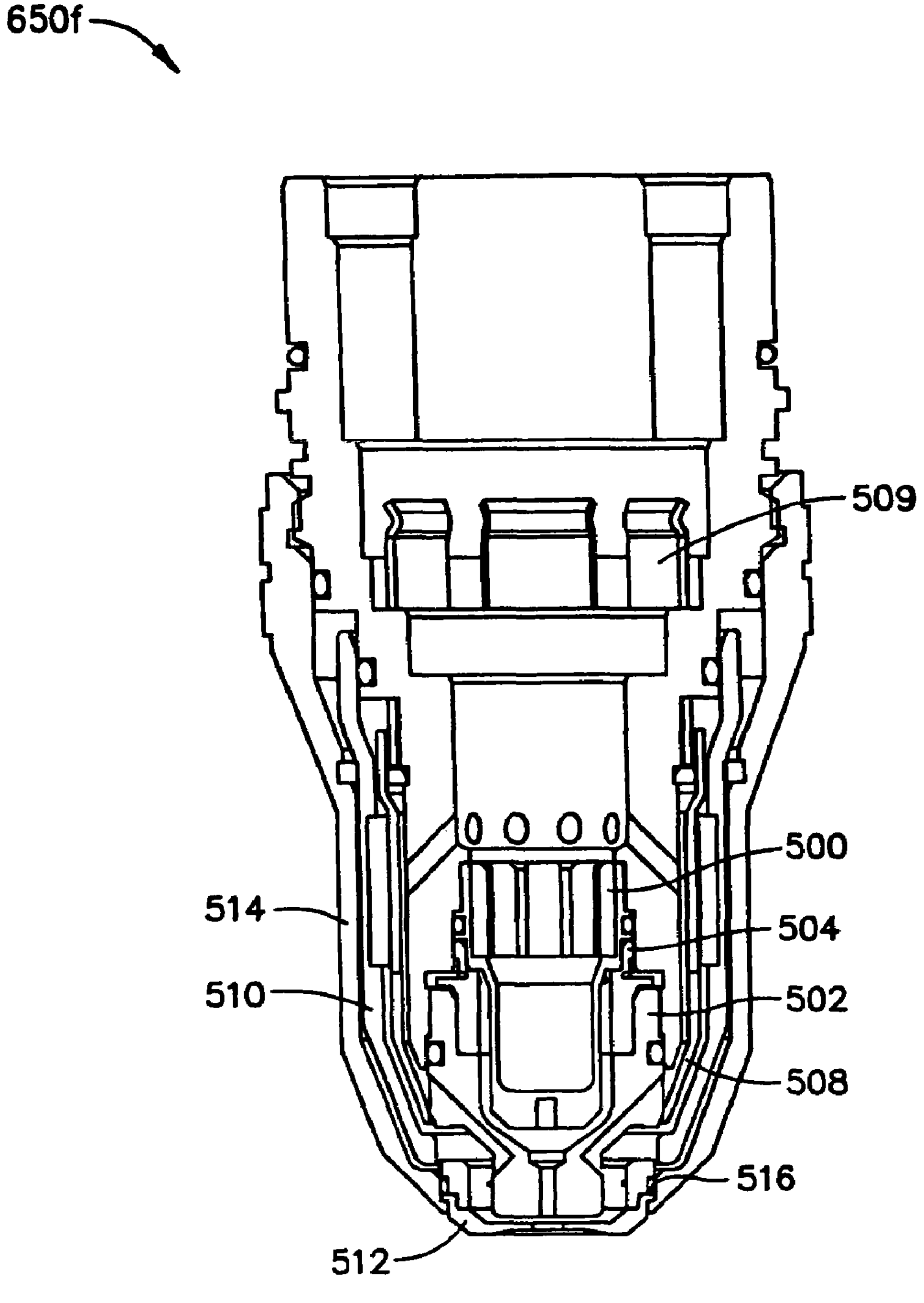
FIG. 47*f* is a longitudinal cross-sectional view of a sixth embodiment of a consumables cartridge constructed in accordance with the teachings of the present invention.

Referring to FIG. 47*e*, the consumables cartridge 650*e* comprises the electrode 500, the tip 502, the spacer 504, the secondary cap 512, and the secondary spacer 516. Alternately, the consumables cartridge 650*f* in FIG. 47*f* comprises the central anode member 509, the electrode 500, the tip 502, the spacer 504, the distal anode member 508, the shield cap 514, the baffle 510, the secondary cap 512, and the secondary spacer 516. Other combinations of consumables components may also be employed according to the teachings of the present invention and the specific embodiments illustrated herein should not be construed as limiting the scope of the present invention. Moreover, o-rings may be included as shown in some of the consumables cartridges 650 for sealing during operation of the plasma arc torch.

Assemblies

Figure 48A:
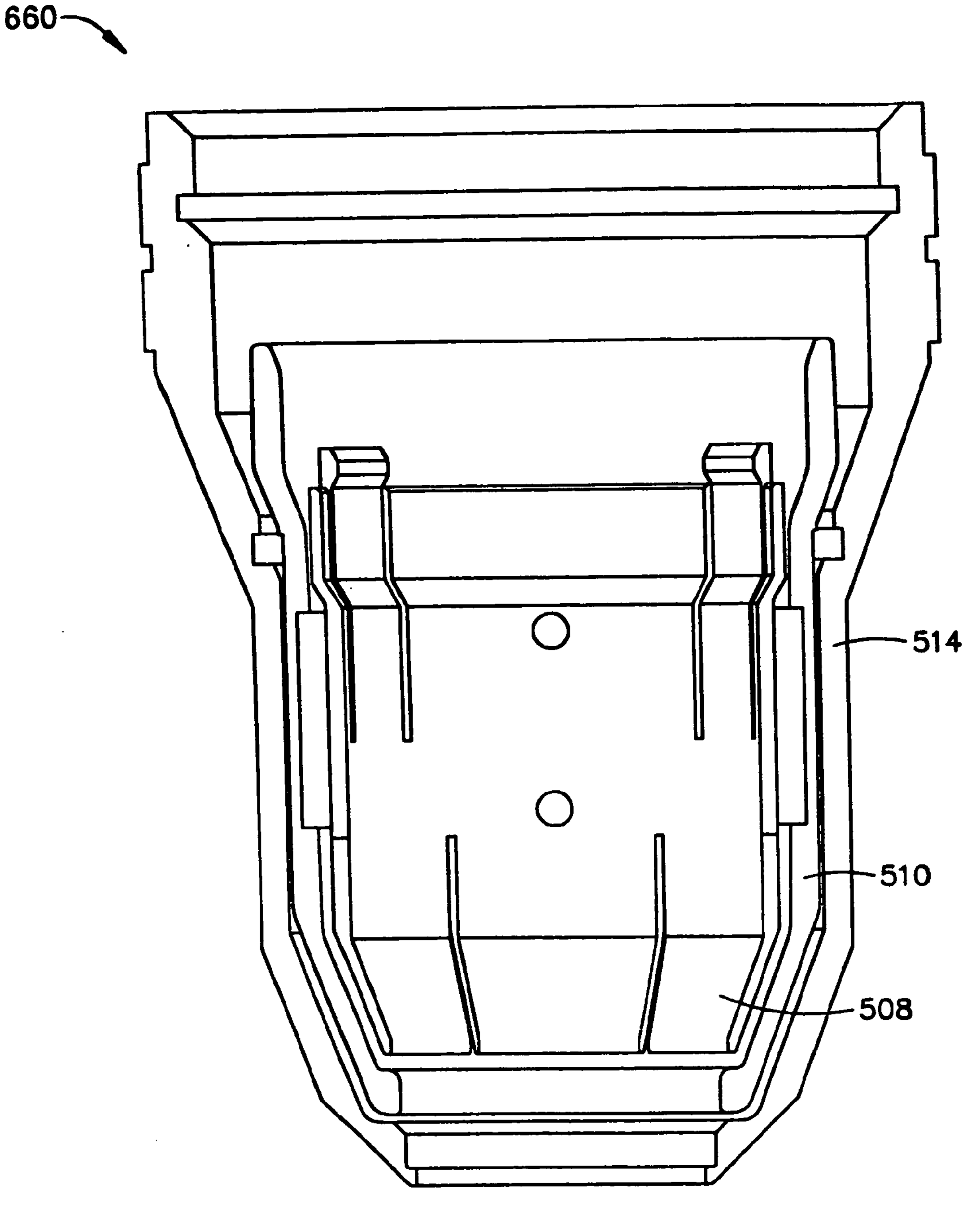
FIG. 48*a* is a longitudinal cross-sectional view of a consumables assembly constructed in accordance with the teachings of the present invention.
Figure 48B:
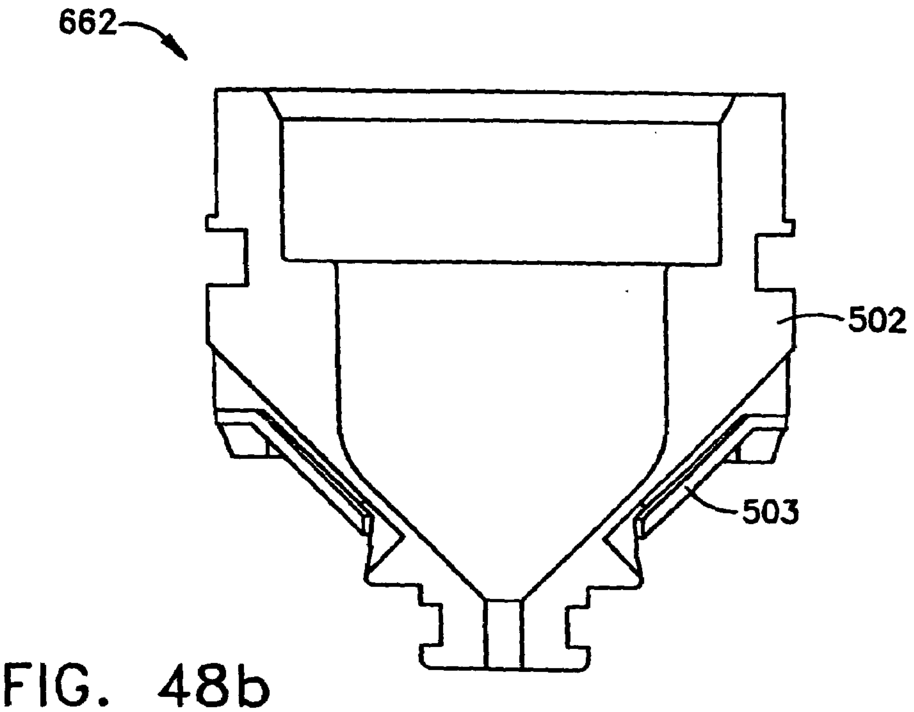
FIG. 48*b* is a longitudinal cross-sectional view of a second embodiment of a consumables assembly in accordance with the principles of the present invention.
Figure 48C:
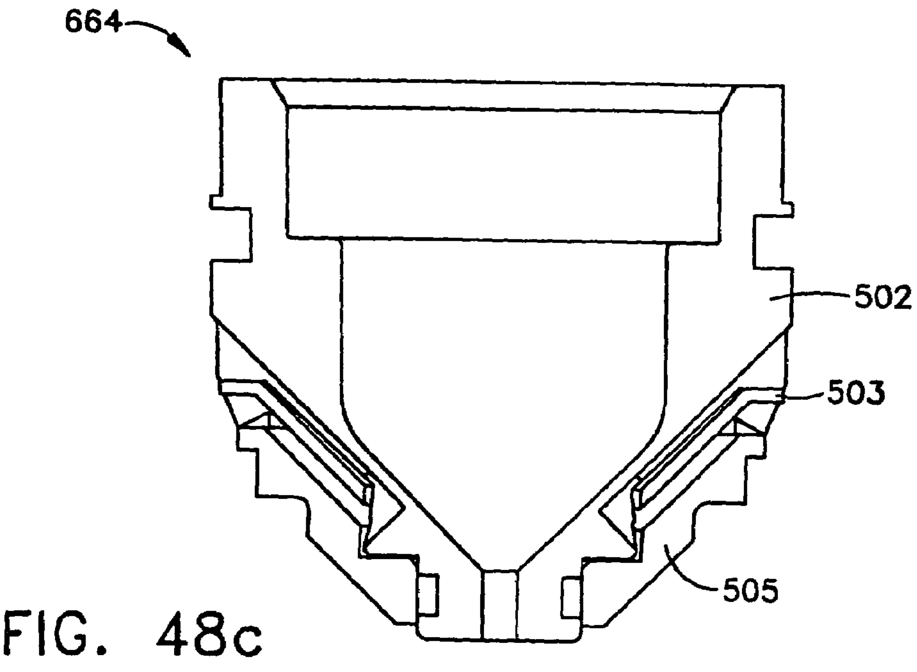
FIG. 48*c* is a longitudinal cross-sectional view of a third embodiment of a consumables assembly in accordance with the principles of the present invention.

Referring to FIGS. 48*a* through 48*g*, specific assemblies of consumable components are preferably provided by the present invention for ease of assembly and support of the plasma arc torch 410. For example, an assembly of the shield cap 514, the baffle 510, and the distal anode shield 508 is shown in FIG. 48*a* as a shield cap assembly 660. Preferably, the shield cap assembly 660 is provided to an end user as a completed assembly, wherein the shield cap 514, the baffle 510, and the distal anode shield 508 are preferably secured to one another through an interference fit. Additionally, FIG. 48*b* illustrates a tip assembly 662, which comprises the tip 502 and the tip guide 503. Another tip assembly 664 is shown in FIG. 48*c*, which comprises the tip 502, the tip guide 503, and the tip seal 505.

Figure 48D:
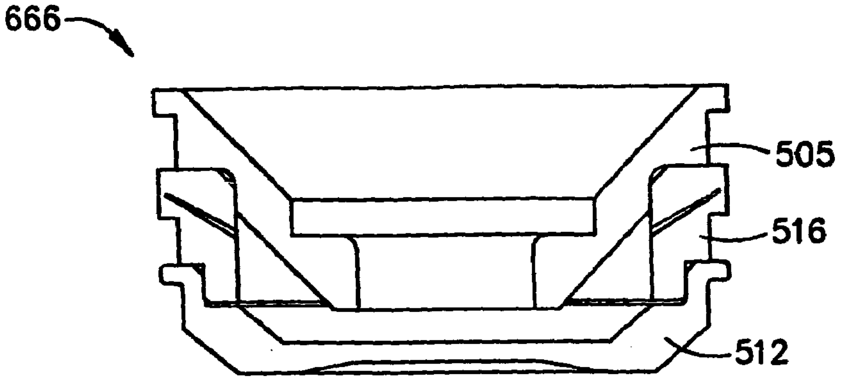
FIG. 48*d* is a longitudinal cross-sectional view of a fourth embodiment of a consumables assembly in accordance with the principles of the present invention.
Figure 48E:
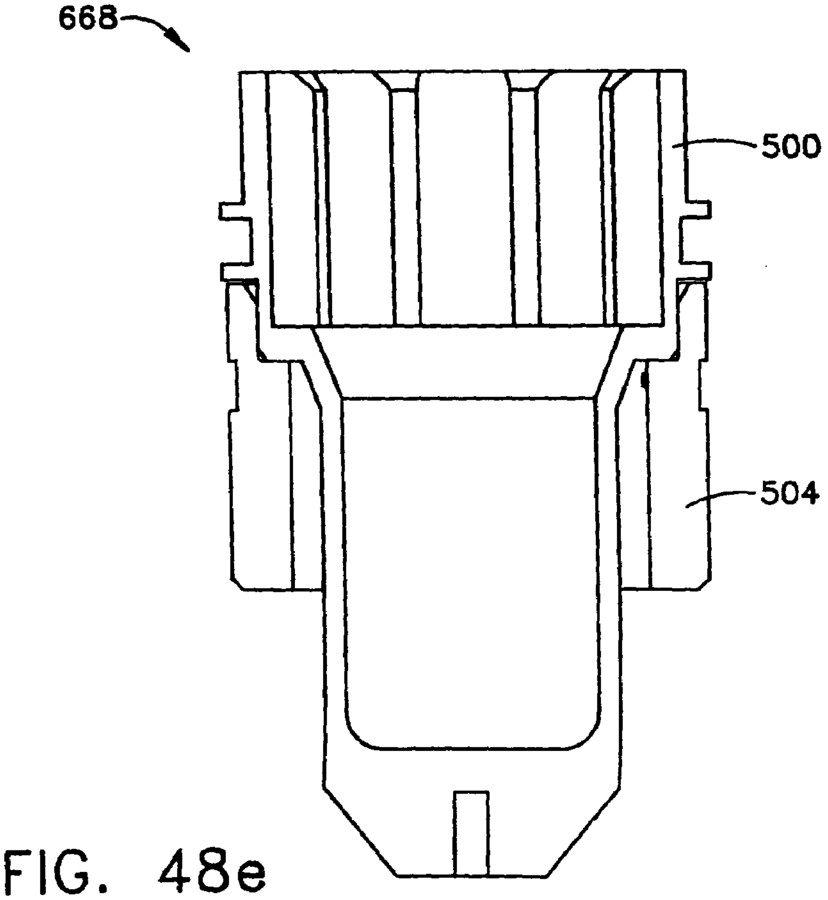
FIG. 48*e* is a longitudinal cross-sectional view of a fifth embodiment of a consumables assembly in accordance with the principles of the present invention.
Figure 48F:
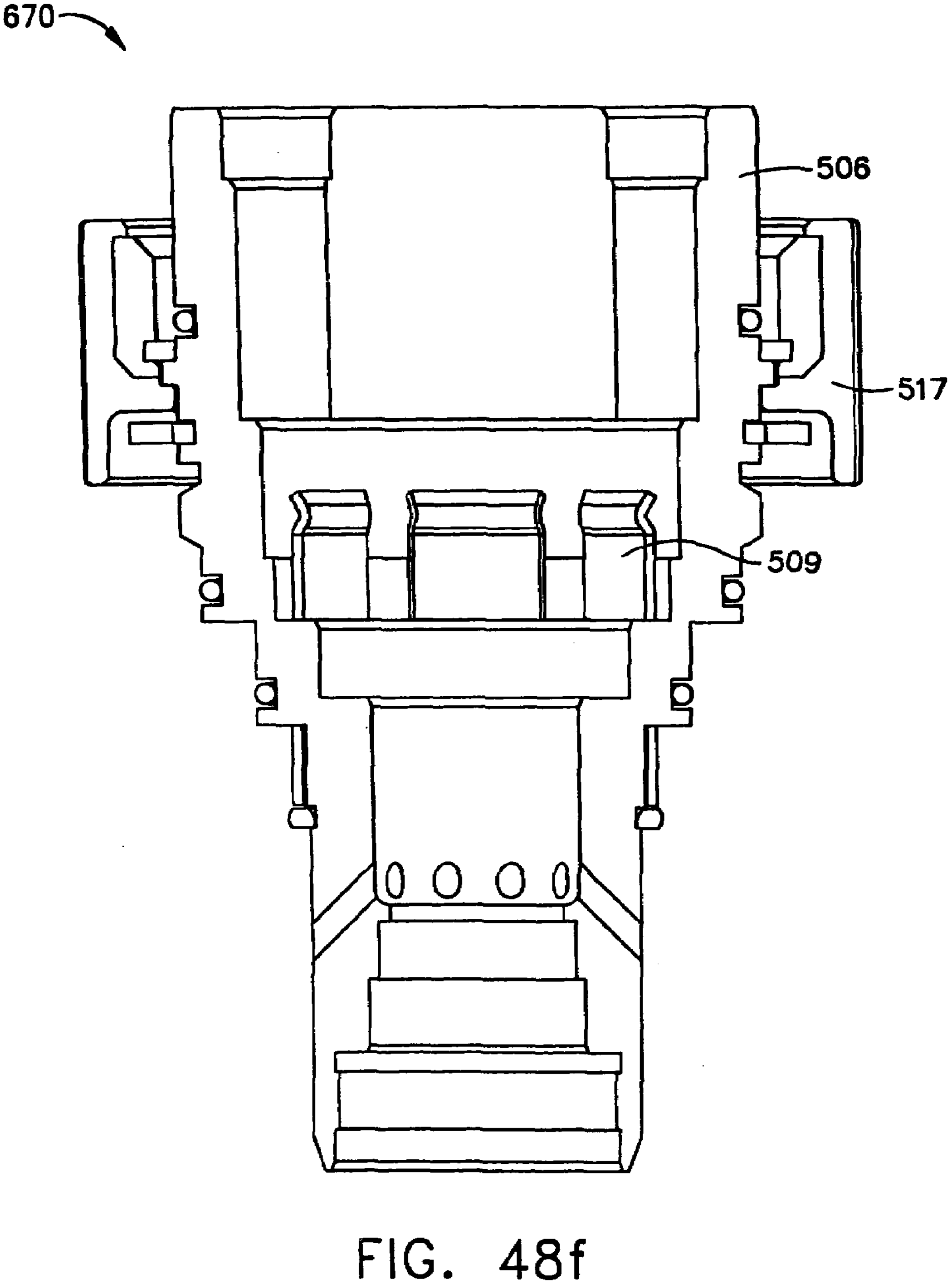
FIG. 48*f* is a longitudinal cross-sectional view of a sixth embodiment of a consumables assembly in accordance with the principles of the present invention.
Figure 48G:
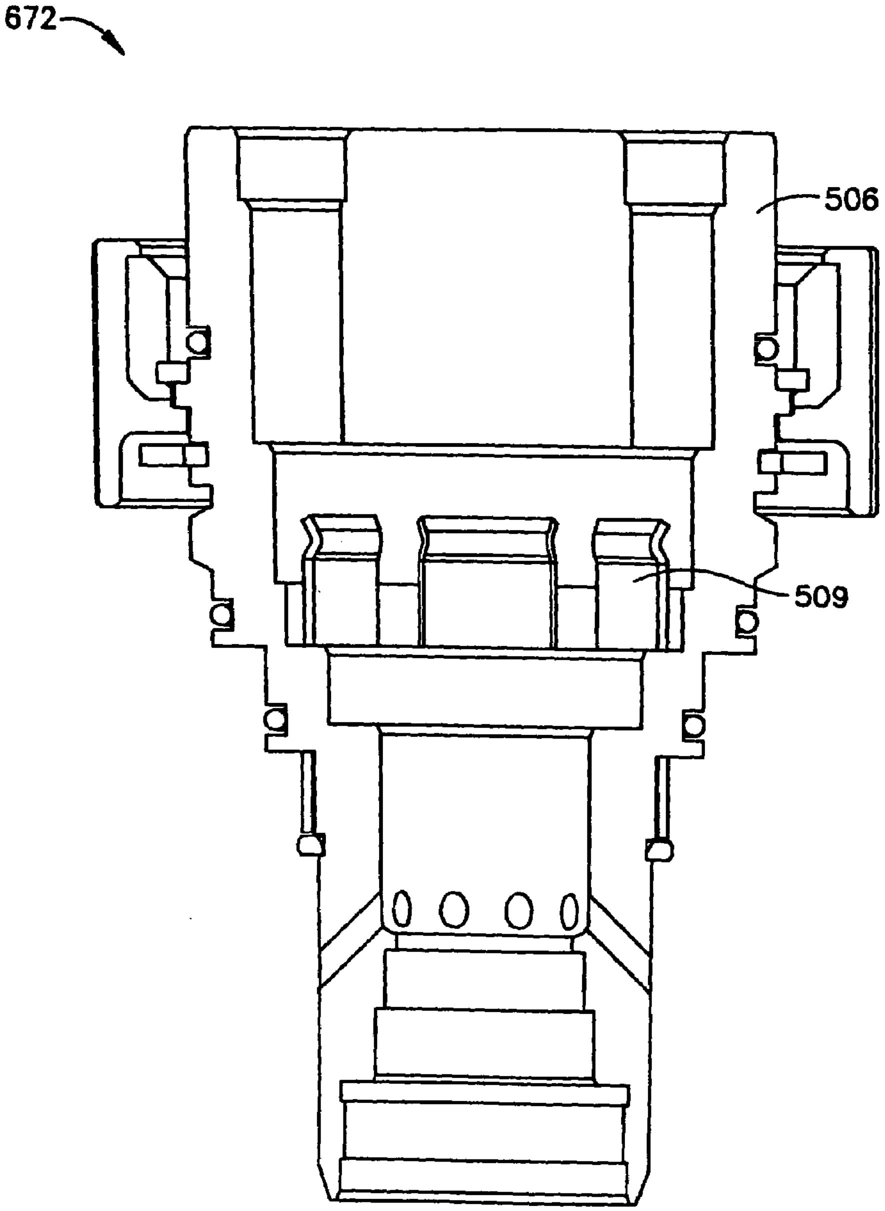
FIG. 48*g* is a longitudinal cross-sectional view of a seventh embodiment of a consumables assembly in accordance with the principles of the present invention.

Referring to FIG. 48*d*, a secondary spacer assembly 666 is illustrated that includes the tip guide 505, the secondary spacer 516, and the secondary cap 512. An electrode assembly 668 is shown in FIG. 48*e* and comprises the electrode 500 and the spacer 504. Further, one cartridge assembly 670 is shown in FIG. 48*f* and comprises the cartridge body 506, the central anode member 509, and the locking ring 517. Another cartridge assembly 672 is shown in FIG. 48*g* and comprises the cartridge body 506 and the central anode member 509. Other combinations of assemblies may also be employed according to the teachings of the present invention and the specific embodiments illustrated herein should not be construed as limiting the scope of the present invention. Moreover, o-rings may be included as shown in some of the assemblies for sealing during operation of the plasma arc torch.

As used herein, the consumables cartridges and assemblies should be construed to include all possible combinations of embodiments of consumable components described herein. Accordingly, the consumables cartridges and assemblies disclosed herein should not be construed as being limited to the consumable components disclosed as a part of the specific plasma arc torch 410.

Torch Head Connections

Figure 49:
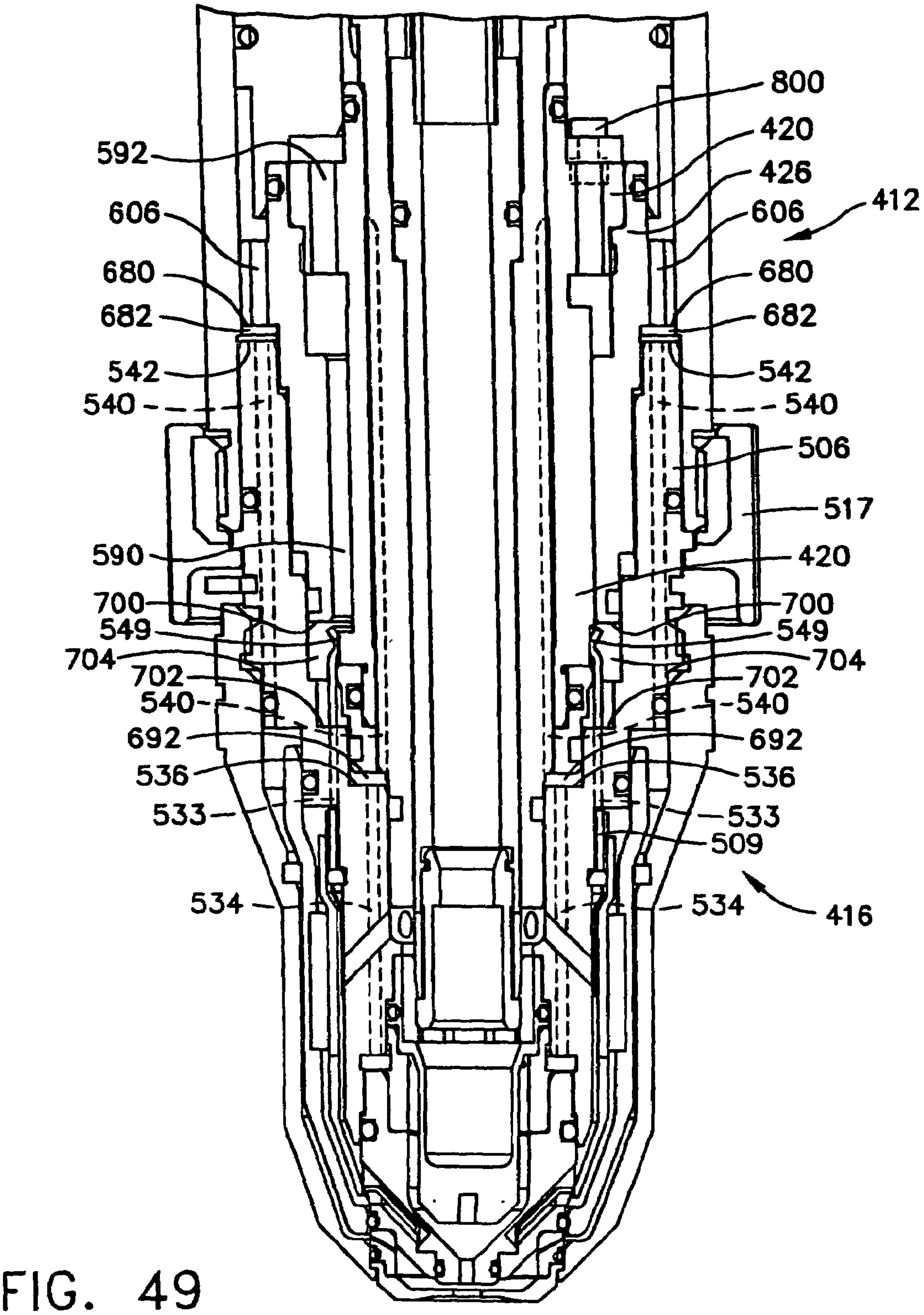
FIG. 49 is an exploded longitudinal cross-sectional view of torch head connections constructed in accordance with the teachings of the present invention.

Referring now to FIG. 49, the consumable components 416 are secured to the torch head 412 using the locking ring 517 and a threaded connection as previously described. When fully assembled, a distal face 680 of the outer insulator 426 is disposed adjacent the recessed proximal face 542 of the cartridge body 506. Accordingly, an annular chamber 682 is formed between the distal face 680 of the outer insulator 426 and the recessed proximal face 542 of the cartridge body. Therefore, the secondary gas that flows through the axial passageways 606 of the outer insulator 426 is distributed around the annular chamber 682 for passage through the proximal axial passageways 540 (shown dashed) of the cartridge body 506. As a result, the secondary gas flows between the torch head 412 and the consumable components 416 independent of rotational alignment of the consumable components 416 with respect to the torch head 412.

Similarly, the recessed annular walls 425 of the central insulator 424 are disposed adjacent the proximal face 536 of the cartridge body 506. Accordingly, an annular chamber 692 is formed between the recessed annular walls 425 of the central insulator 424 and the proximal face 536 of the cartridge body 506. Therefore, the plasma gas that flows through the recessed annular walls 425 of the central insulator 424 is distributed around the annular chamber 692 for passage through the distal axial passageways 534 (shown dashed) formed in the cartridge body 506. As a result, the secondary gas flows between the torch head 412 and the consumable components 416 independent of rotational alignment of the consumable components 416 with respect to the torch head 412.

Similar to the secondary gas and plasma gas flows, the torch head connection independent of rotational alignment is also provided with the cooling fluid flow return. As shown, an outer distal face 700 of the anode body 420 is disposed adjacent an outer proximal face 702 of the cartridge body 506. Accordingly, an annular chamber 704 is formed between the outer distal face 700 of the anode body 420 and the outer proximal face 702 of the cartridge body 506. Therefore, the cooling fluid that flows through outer axial passageways 533 (shown dashed) in the cartridge body 506 is distributed around the annular chamber 704 for passage through the recessed walls 590 (shown dashed) and axial passageways 592 (shown dashed) formed in the anode body 420. As a result, the cooling fluid flows between the consumable components 416 and the torch head 412 independent of rotational alignment of the consumable components 416 with respect to the torch head 412.

Accordingly, a proximal element (e.g., anode body 420, outer insulator 426) and a distal element (e.g., cartridge body 506) are configured to define at least one chamber when the proximal and distal elements are engaged. The chamber is in fluid communication with at least one fluid passage through the proximal element and at least one fluid passage in the distal element to make a fluid connection between the fluid passages independent of the rotational alignment of the proximal and distal elements.

Additionally, a pilot return 800 is disposed at a proximal end portion of the plasma arc torch 410 and is in face contact with the anode body 420 such that an electrical connection is also made independent of rotational alignment of the consumable components 416. Further, the electrical connection between the central anode member 509 and the anode body 420 is also made independent of rotational alignment with the use of the detents 549 on the central anode member 509. Accordingly, both electrical connections and fluid connections are provided by the present invention that are independent of rotational alignment.

It should be understood that the torch head connection described herein may also be employed with other plasma arc torch embodiments described herein. Additionally, the torch head connections as previously described such as the stepped cartridge design (FIGS. 30, 31), the face seal design (FIGS. 32*a,b*), the straight cartridge design (FIGS. 33*a,b*), or the ball lock mechanism (FIGS. 34*a,b*) may also be employed with the various plasma arc torch embodiments disclosed herein while remaining within the scope of the present invention. Accordingly, the torch head connections should not be construed as being limited to any specific plasma arc torch embodiment such as the plasma arc torch 410.

Additionally, each of the consumable component embodiments described herein (e.g., electrodes 100*a* throughlook, tips 102*a* through 102*c*, among others) should not be limited in application to the specific plasma arc torch embodiment in which they are described. For example, any of the electrode embodiments may be employed in the alternate plasma arc torch 410 while remaining within the scope of the present invention. Accordingly, each of the embodiments of the present invention may be employed on any plasma arc torch disclosed herein while remaining within the scope of the present invention.

Alternate Plasma Arc Torch Embodiment

Figure 50:
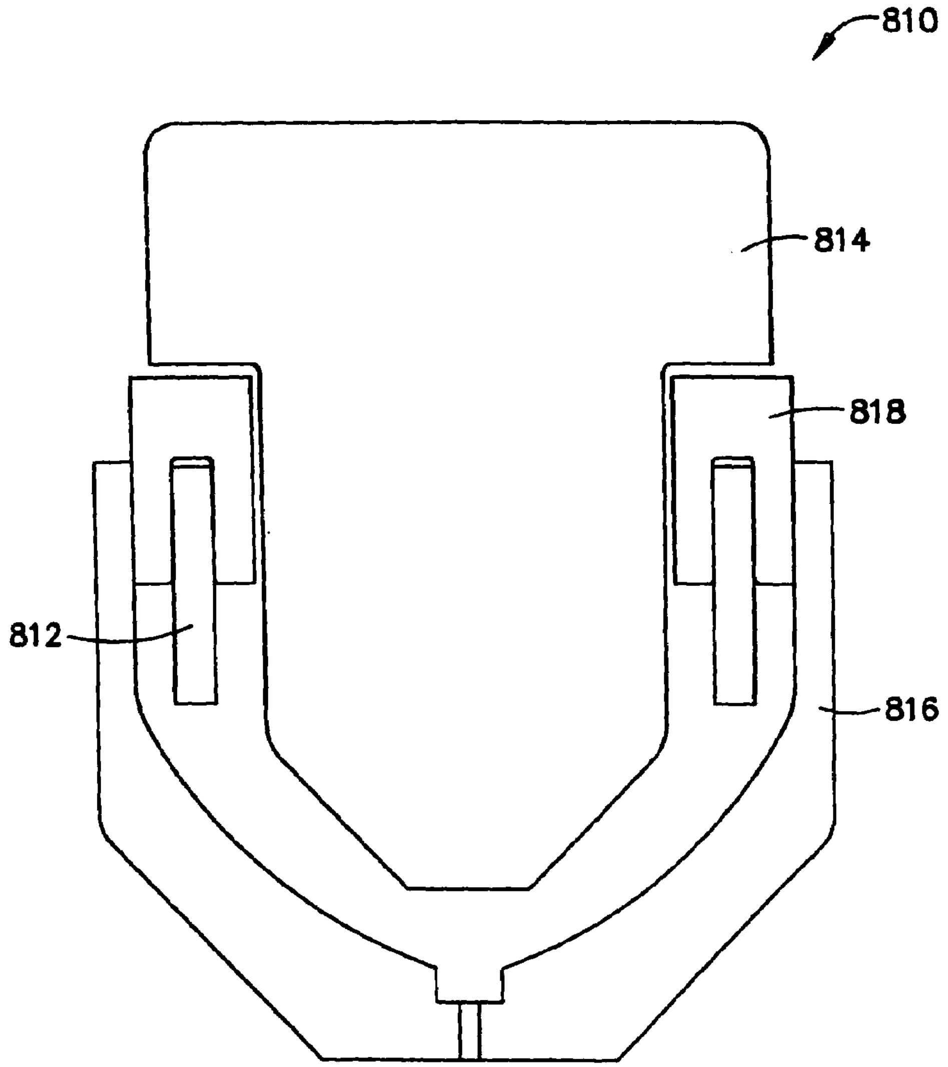
FIG. 50 is a longitudinal cross-sectional view of another plasma arc torch embodiment constructed in accordance with the teachings of the present invention.

Yet another form of a plasma arc torch according to the present invention is illustrated and indicated by reference numeral 810 as shown in FIG. 50. (Only certain consumable components of the plasma arc torch 810 are illustrated for purposes of clarity). The operation of the plasma arc torch 810 is substantially similar to those previously described with the coaxial flow, distribution of plasma and secondary gases, various consumable component embodiments, and the use of a consumables cartridge, assemblies, and torch head connections. However, the plasma arc torch 810 also comprises a dielectric spacer 812 between the electrode 814 and the tip 816 as shown. The dielectric spacer 812 is disposed within the spacer 818 that spaces and insulates the electrode 814 from the tip 816 as previously described. Accordingly, the dielectric spacer 812 increases the dielectric between the cathodic electrode 814 and the anodic tip 816 so that the pilot arc is not generated near the proximal end of the tip 816 between the electrode 814 and the tip 816 as indicated by numeral 820. Rather, the pilot arc is formed near the distal end portion of the electrode 814 as indicated by numeral 822. Preferably, the dielectric spacer 812 is formed of a Fluorosint® material.

Figure 51:
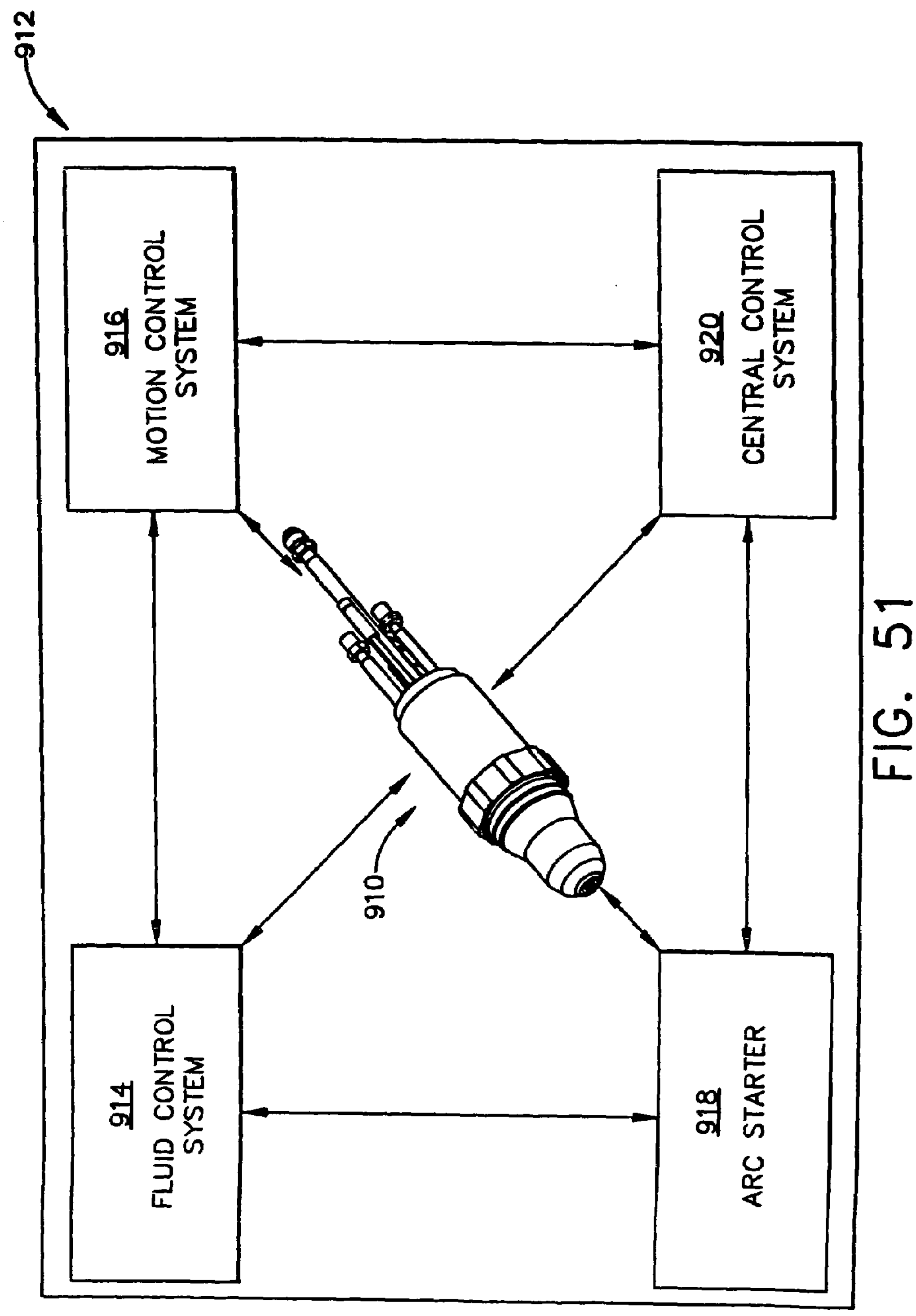
FIG. 51 is a schematic view illustrating a plasma arc torch employed within a plasma arc torch cutting system in accordance with the various embodiments of the present invention.

The description of the invention is merely exemplary in nature and, thus, variations that do not depart from the substance of the invention are intended to be within the scope of the invention. For example, as shown in FIG. 51, the various embodiments of the invention as disclosed herein may be employed in a plasma arc torch 910 within a plasma arc torch cutting system 912 that includes a fluid control system 914, a motion control system 916, an arc starter 918, and/or a central control system 920 while remaining within the scope of the present invention. Such variations are not to be regarded as a departure from the spirit and scope of the invention.

What is claimed is:

1. An electrode configured for electrical contact and passage of a fluid between the electrode and an adjacent cathodic element of a plasma arc torch, the electrode comprising:

a proximal end portion and a distal end portion;

a perimeter surface disposed at the proximal end portion and adjacent a perimeter surface of the cathodic element; and a distal end portion defining a textured outer surface, wherein the adjacent perimeter surfaces provide the electrical contact and the passage of the fluid.

2. The electrode according to claim 1, wherein the electrode further comprises at least one passageway configured for passage of the cooling fluid proximate the electrical contact.

3. The electrode according to claim 2 wherein the passageway further comprises at least one flute formed on the electrode.

4. The electrode according to claim 3 wherein the passageway further comprises at least one helical flute formed on the electrode.

5. The electrode according to claim 1 wherein the electrode further comprises at least one rib and at least one flute disposed adjacent the at least one rib, the rib and the flute disposed along the perimeter surface of the electrode.

6. The electrode according to claim 1 wherein the electrode further comprises a plurality of ribs disposed adjacent a plurality of flutes, the ribs and the flutes disposed along the perimeter surface of the electrode.

7. The electrode according to claim 1 wherein the electrode further comprises a detent for connection to an adjacent component of the plasma arc torch.

8. The electrode according to claim 1 wherein the electrode further comprises at least one spot recess disposed proximate the electrical contact for passage of the fluid.

9. An electrode configured for electrical contact with a cathodic element of a plasma arc torch, the electrode comprising:

a proximal end portion and a distal end portion;

at least one passageway and a perimeter surface disposed at the proximal end portion and adjacent a perimeter surface of the cathodic element; and a distal end portion defining a textured outer surface comprising a plurality of ridges, wherein a cooling fluid passes through the passageway for cooling proximate the electrical contact and the adjacent perimeter surfaces provide the electrical contact and passage of the cooling fluid.

10. The electrode according to claim 9 wherein the passageway further comprises at least one flute formed on the electrode.

11. The electrode according to claim 9 wherein the passageway further comprises at least one helical flute formed on the electrode.

12. An electrode configured for electrical contact and passage of a fluid between the electrode and an adjacent cathodic element of a plasma arc torch, the electrode comprising:

a proximal end portion and a distal end portion;

a perimeter surface disposed at the proximal end portion and adjacent a perimeter surface of the cathodic element; and a distal end portion defining a distal extension, wherein the adjacent perimeter surfaces provide the electrical contact and the passage of the fluid.

13. The electrode according to claim 12, wherein the electrode further comprises at least one passageway configured for passage of the cooling fluid proximate the electrical contact.

14. The electrode according to claim 13 wherein the passageway further comprises at least one flute formed on the electrode.

15. The electrode according to claim 14 wherein the passageway further comprises at least one helical flute formed on the electrode.

16. The electrode according to claim 12 wherein the electrode further comprises at least one rib and at least one flute disposed adjacent the at least one rib, the rib and the flute disposed along the perimeter surface of the electrode.

17. The electrode according to claim 12 wherein the electrode further comprises a plurality of ribs disposed adjacent a plurality of flutes, the ribs and the flutes disposed along the perimeter surface of the electrode.

18. The electrode according to claim 12 wherein the electrode further comprises a detent for connection to an adjacent component of the plasma arc torch.

19. The electrode according to claim 12 wherein the electrode further comprises at least one spot recess disposed proximate the electrical contact for passage of the fluid.

20. An electrode configured for electrical contact with a cathodic element of a plasma arc torch, the electrode comprising:

a proximal end portion and a distal end portion;

at least one passageway and a perimeter surface disposed at the proximal end portion and adjacent a perimeter surface of the cathodic element; and a distal end portion defining a distal extension, wherein a cooling fluid passes through the passageway for cooling proximate the electrical contact and the adjacent perimeter surfaces provide the electrical contact.

21. The electrode according to claim 20 wherein the passageway further comprises at least one flute formed on the electrode.

22. The electrode according to claim 20 wherein the passageway further comprises at least one helical flute formed on the electrode.

* * * * *